(12) United States Patent
Peterson et al.

(10) Patent No.: US 11,912,204 B2
(45) Date of Patent: Feb. 27, 2024

(54) LOW-PROFILE ACTUATOR FOR EXTENDABLE CAMERA

(71) Applicant: Magna Mirrors of America, Inc., Holland, MI (US)

(72) Inventors: Kenneth C. Peterson, Ada, MI (US); Anthony J. LaCross, Hastings, MI (US); Mitchell J. Wesley, Grand Rapids, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 114 days.

(21) Appl. No.: 17/661,753

(22) Filed: May 3, 2022

(65) Prior Publication Data

US 2022/0258672 A1    Aug. 18, 2022

Related U.S. Application Data

(63) Continuation-in-part of application No. PCT/US2021/070765, filed on Jun. 24, 2021.

(60) Provisional application No. 63/202,633, filed on Jun. 18, 2021, provisional application No. 63/201,527, filed on May 4, 2021, provisional application No. 62/706,640, filed on Aug. 31, 2020, provisional application No. 62/705,371, filed on Jun. 24, 2020.

(51) Int. Cl.
    *B60R 1/28*    (2022.01)

(52) U.S. Cl.
    CPC .......... *B60R 1/28* (2022.01); *B60R 2300/101* (2013.01); *B60R 2300/105* (2013.01); *B60R 2300/602* (2013.01)

(58) Field of Classification Search
    CPC ........ B60R 2300/101; B60R 2300/105; B60R 2300/602
    See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,760,962 A | 6/1998 | Schofield et al. | |
| 5,796,094 A | 8/1998 | Schofield et al. | |

(Continued)

FOREIGN PATENT DOCUMENTS

| | | |
|---|---|---|
| CN | 102712287 B | 4/2015 |
| CN | 110562142 A | 12/2019 |

(Continued)

*Primary Examiner* — Sunghyoun Park
(74) *Attorney, Agent, or Firm* — HONIGMAN LLP

(57) ABSTRACT

A vehicular imaging system includes a camera device disposed at an exterior portion of a vehicle. The camera device includes a pivotable arm that accommodates a camera. The pivotable arm is pivotally mounted at a mounting base at the vehicle and is pivotable between at least a drive position and a folded position. An actuator includes a pivot post structure attached to the mounting base and an output gear disposed at the pivot post structure, the actuator operable to pivot the pivotable arm about the output gear. The actuator includes a primary detent that is engaged to maintain the pivotable arm at the drive position when the pivotable arm is pivoted to the drive position. The actuator includes a secondary detent that is disengaged when the pivotable arm is manually pivoted between the folded position and the drive position.

34 Claims, 46 Drawing Sheets

(56) References Cited

U.S. PATENT DOCUMENTS

| | | |
|---|---|---|
| 6,097,023 A | 8/2000 | Schofield et al. |
| 7,777,611 B2 | 8/2010 | Desai |
| 7,887,202 B1 | 2/2011 | Peterson |
| 7,965,336 B2 | 6/2011 | Bingle et al. |
| 9,041,806 B2 | 5/2015 | Baur et al. |
| 9,126,525 B2 | 9/2015 | Lynam et al. |
| 9,487,142 B2 | 11/2016 | Sobecki et al. |
| 9,676,336 B2 | 6/2017 | Peterson et al. |
| 9,762,880 B2 | 9/2017 | Pflug |
| 9,900,522 B2 | 2/2018 | Lu |
| 10,046,706 B2 | 8/2018 | Larson et al. |
| 10,071,687 B2 | 9/2018 | Ihlenburg et al. |
| 10,166,924 B2 | 1/2019 | Baur |
| 10,171,796 B2 | 1/2019 | Sekiguchi et al. |
| 10,343,621 B2 | 7/2019 | Brouwer et al. |
| 10,421,404 B2 | 9/2019 | Larson et al. |
| 10,442,360 B2 | 10/2019 | LaCross et al. |
| 10,836,327 B2 | 11/2020 | Da Deppo et al. |
| 11,242,008 B2 | 2/2022 | Blank et al. |
| 11,465,561 B2 | 10/2022 | Peterson et al. |
| 11,708,035 B2 | 7/2023 | LaCross |
| 2012/0162427 A1 | 6/2012 | Lynam |
| 2012/0315027 A1 | 12/2012 | Schutz |
| 2014/0285666 A1 | 9/2014 | O'Connell et al. |
| 2015/0022664 A1 | 1/2015 | Pflug et al. |
| 2015/0097953 A1 | 4/2015 | Stambaugh |
| 2015/0183380 A1 | 7/2015 | Da Deppo et al. |
| 2015/0304612 A1 | 10/2015 | Richards et al. |
| 2016/0096486 A1 | 4/2016 | Dziurda et al. |
| 2017/0104907 A1 | 4/2017 | Rajhansa et al. |
| 2017/0134661 A1* | 5/2017 | Chietein ................ B60R 1/002 |
| 2017/0264797 A1* | 9/2017 | Trinh .................. A61B 5/0077 |
| 2017/0280111 A1* | 9/2017 | Henion .................. B60R 11/04 |
| 2017/0355312 A1 | 12/2017 | Habibi et al. |
| 2018/0134217 A1 | 5/2018 | Peterson et al. |
| 2019/0047475 A1 | 2/2019 | Uken et al. |
| 2019/0118717 A1 | 4/2019 | Blank et al. |
| 2019/0146297 A1 | 5/2019 | Lynam et al. |
| 2019/0258131 A9 | 8/2019 | Lynam et al. |
| 2020/0025596 A1 | 1/2020 | Parsons |
| 2020/0114762 A1* | 4/2020 | Shigefuji .................. B60R 1/00 |
| 2020/0223364 A1 | 7/2020 | Peterson et al. |
| 2020/0238910 A1 | 7/2020 | Wilson et al. |
| 2020/0298762 A1 | 9/2020 | Ichimura et al. |
| 2020/0377022 A1 | 12/2020 | LaCross et al. |
| 2020/0398767 A1 | 12/2020 | Park et al. |
| 2021/0024000 A1* | 1/2021 | Peterson ................ G08G 1/167 |
| 2021/0094473 A1 | 4/2021 | Gali et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0261053 A1 | 8/2021 | Peterson et al. |
| 2021/0323473 A1 | 10/2021 | Peterson et al. |
| 2022/0032858 A1 | 2/2022 | LaCross |
| 2022/0258670 A1 | 8/2022 | Hanchett et al. |
| 2022/0258672 A1 | 8/2022 | Peterson et al. |
| 2023/0211740 A1 | 7/2023 | LaCross et al. |

FOREIGN PATENT DOCUMENTS

| | | |
|---|---|---|
| EP | 3043202 A1 | 7/2016 |
| KR | 20180056674 A | 5/2018 |
| WO | 2018094163 A1 | 5/2018 |
| WO | 2021263280 A1 | 12/2021 |
| WO | 2022150826 A1 | 7/2022 |

* cited by examiner

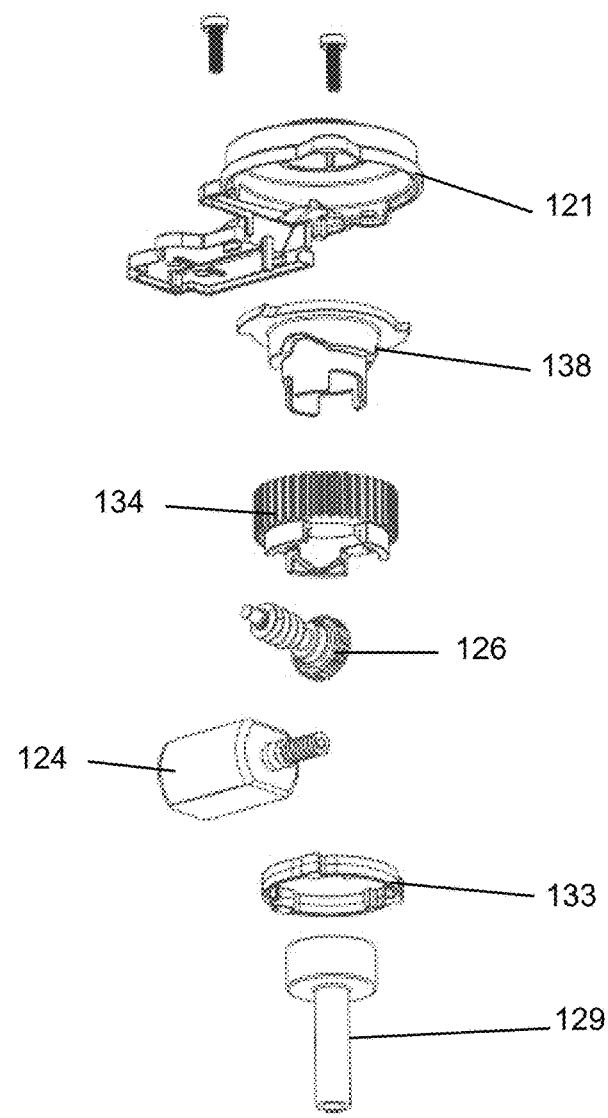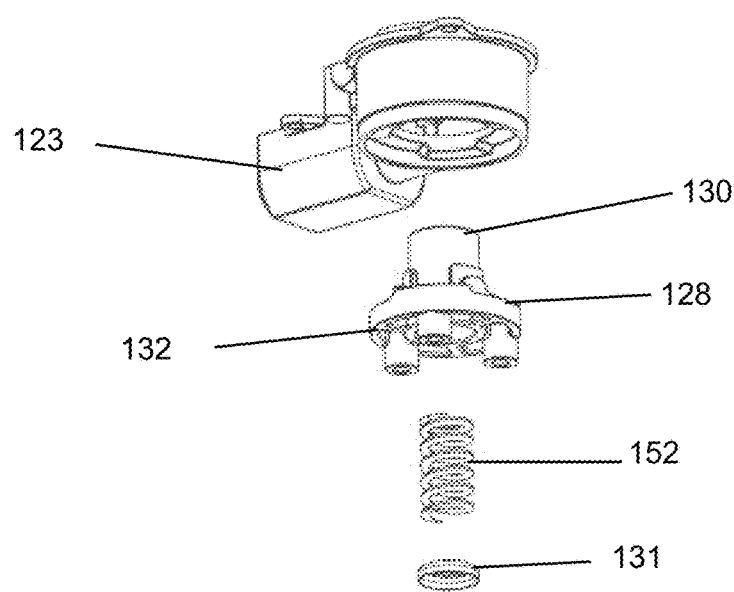
FIG. 25

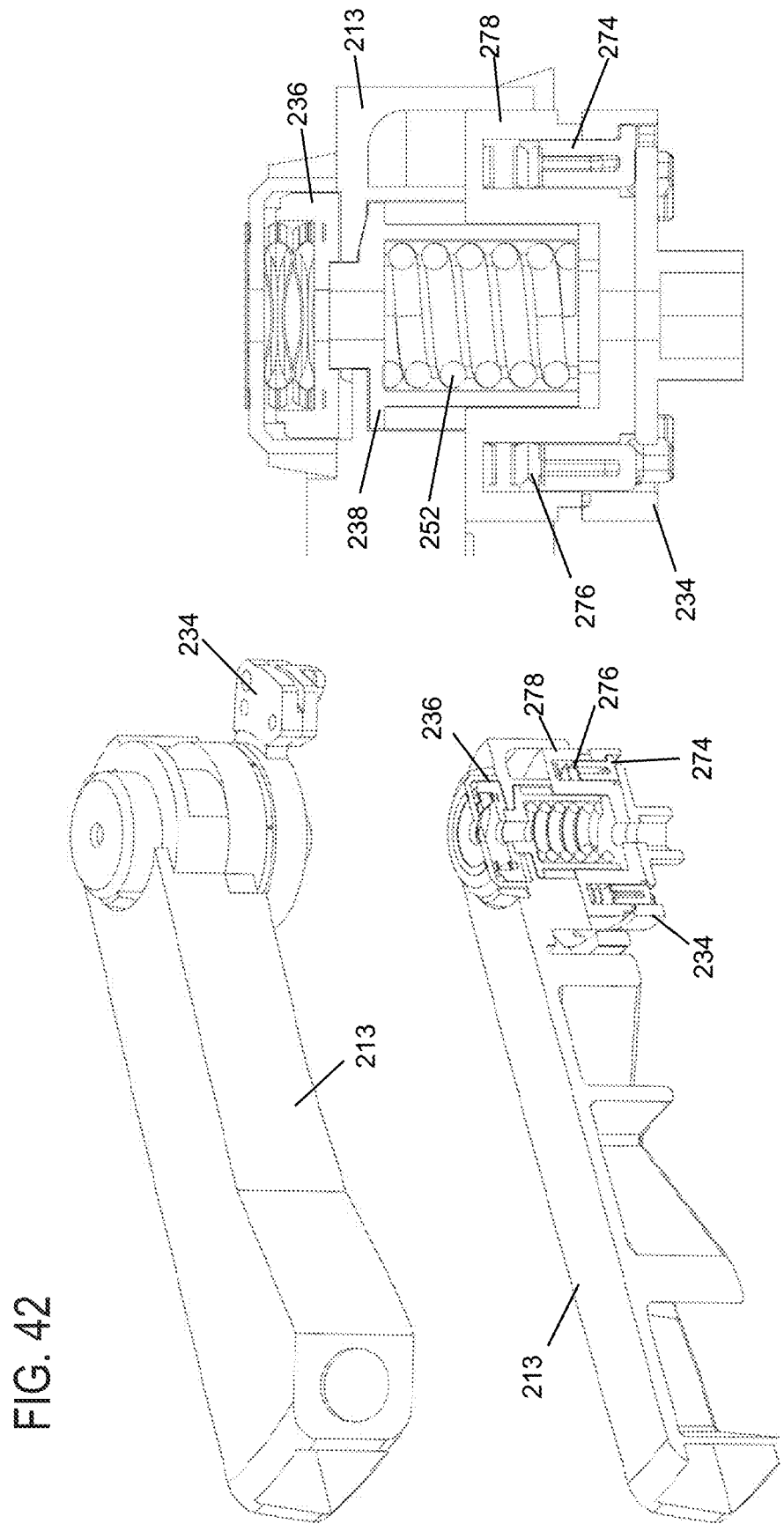

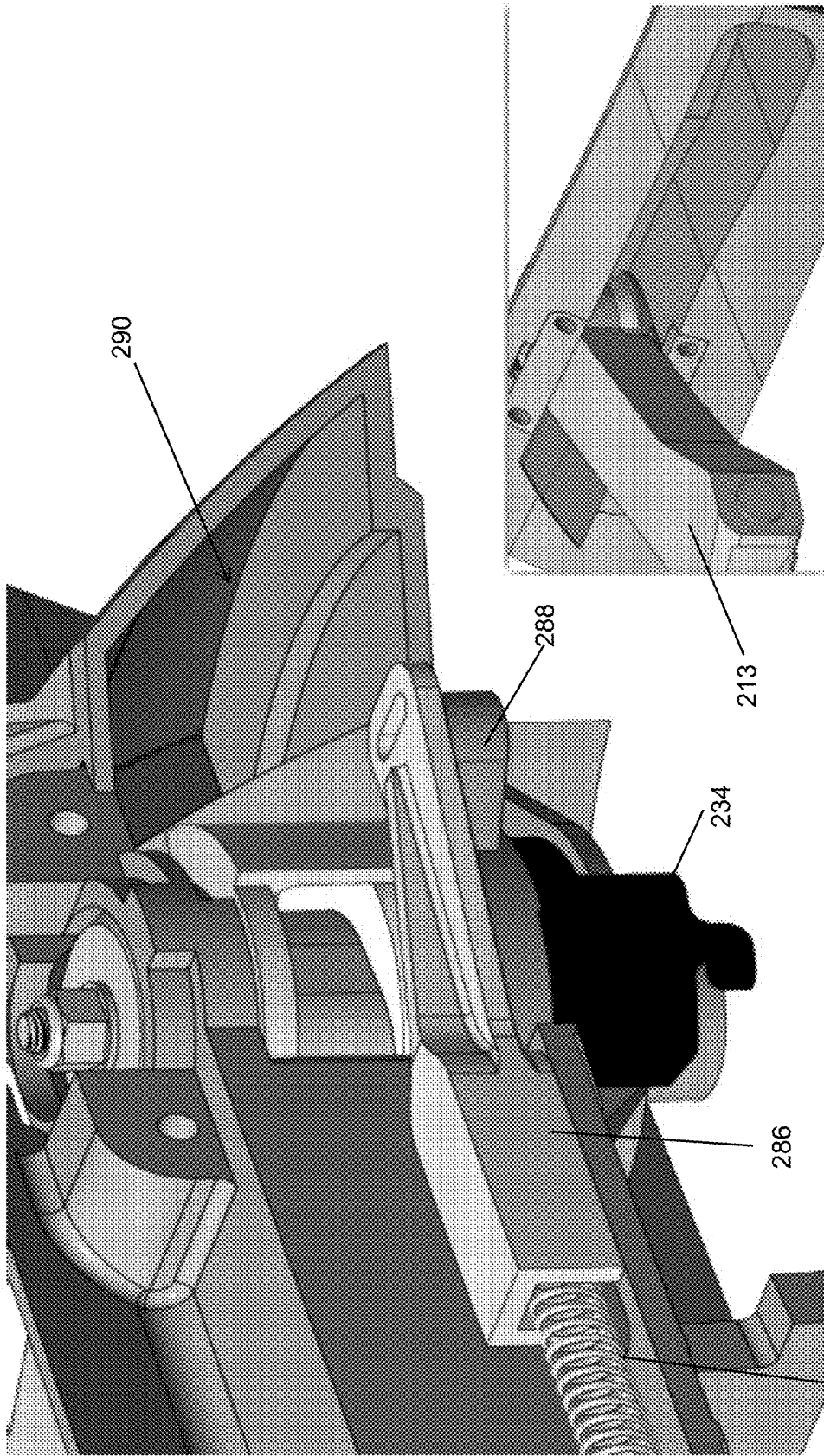
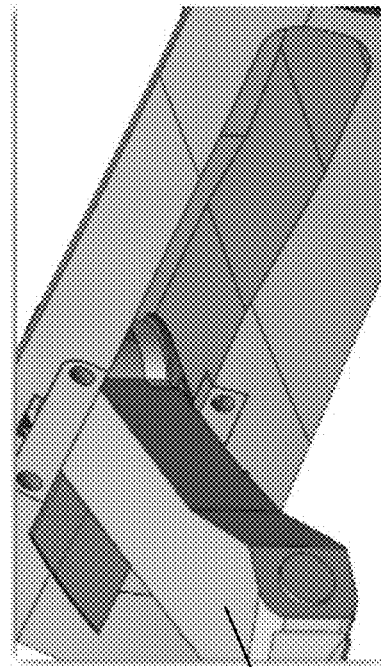
FIG. 58A
FIG. 58B

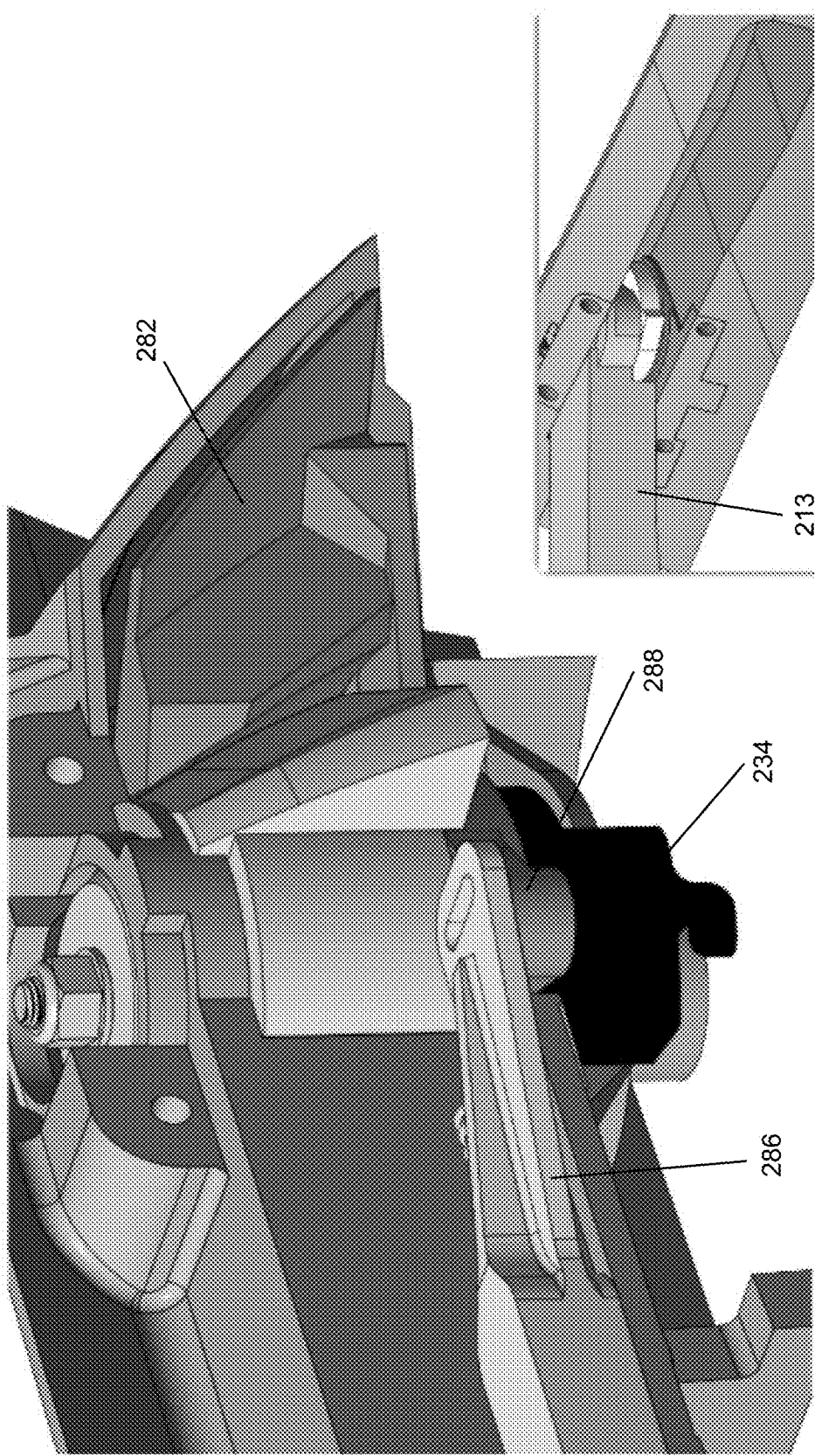

LOW-PROFILE ACTUATOR FOR EXTENDABLE CAMERA

CROSS REFERENCE TO RELATED APPLICATIONS

The present application claims the filing benefits of U.S. provisional application Ser. No. 63/202,633, filed Jun. 18, 2021, and U.S. provisional application Ser. No. 63/201,527, filed May 4, 2021, which are hereby incorporated herein by reference in their entireties. The present application also is a continuation-in-part of International Application No. PCT/US2021/070765, filed Jun. 24, 2021, which claims the filing benefits of U.S. provisional application Ser. No. 63/202,633, filed Jun. 18, 2021, U.S. provisional application Ser. No. 62/706,640, filed Aug. 31, 2020, and U.S. provisional application Ser. No. 62/705,371, filed Jun. 24, 2020, which are hereby incorporated herein by reference in their entireties.

FIELD OF THE INVENTION

The present invention relates generally to vehicular vision systems that display video images derived from video image data captured by one or more cameras of the vehicle.

BACKGROUND OF THE INVENTION

It is known to provide an automotive exterior rearview mirror assembly that includes a foldable mirror assembly, such as a powerfold mirror where the mirror head is pivotable via an actuator between a drive or use position and a folded or park position. It is also known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images captured by exterior viewing cameras, such as described in U.S. Pat. No. 5,670,935, which is hereby incorporated herein by reference in its entirety.

SUMMARY OF THE INVENTION

A pivotable wing or pivotable arm assembly (that supports a wing-mounted camera of a camera monitoring system) includes a powerfold actuator to pivot the pivotable arm or wing and wing-mounted camera of the camera monitoring system between a drive or use position and a folded or park position responsive to a user input.

The actuator provides a low profile package for powerfold action of the wing-mounted camera with a double detent design for lift and turn action of the camera wing during pivoting of the camera wing between at least a folded and a drive position, either via the motor of the actuator assembly or via manual rotation. The actuator includes an upper detent interface that locks or fixes an output gear relative to the post base structure and a lower detent interface that enables the lift and turn action of the housing of the actuator. The upper detent interface may be provided by the engagement of an upper detent surface of a middle detent element and a lower detent surface of an upper detent element and is biased into engagement via an internal or integrated biasing element (such as a wave spring) pressing upward on the middle detent element to engage the middle detent element with an upper detent surface of the pivot post base structure provided by the upper detent element. The internal biasing element may be positioned between the output gear and the middle detent element along the post base structure to urge the middle detent element upward along the post base structure to bias the upper detent interface into engagement and to urge the output gear downward along the post base structure to bias the lower detent interface into engagement. At least a portion of the middle detent element and the entirety of the biasing element may be disposed within a cavity of the output gear to provide a low profile detent assembly of the actuator.

Optionally, the internal biasing element may include a coil spring disposed in the post base structure. In such an example, a pivot tube may include a base portion that extends above the post base structure and a retaining element at a distal end of the pivot tube that retains the biasing member between an inner upper surface of the post base structure and the retaining element. The biasing force of the biasing member pulls the pivot tube downward along the post base structure, pulling the base portion of the pivot tube toward the upper end of the post base structure and biasing an upper detent element downward into engagement with the upper detent interface and biasing the output gear downward into engagement with the lower detent interface.

Optionally, the camera wing may be pivotable between the folded and drive positions via operation of a powerfold actuator that includes a detent assembly attached at the wing and a cable drive actuator that is operable to pivot the detent assembly to pivot the wing. The cable drive actuator may be disposed remote from the detent assembly and may pull and release tension in a cable to pivot the wing between positions. The detent assembly includes a primary detent that is engaged when the cable drive actuator is operated to pivot the wing between the folded position and the drive position and a secondary detent that is engaged to maintain the wing at the drive position when the wing is manually pivoted to the drive position. The detent assembly may also include a locking component that is engaged when the wing is manually pivoted between the folded position and the drive position and the primary detent is not engaged.

Optionally, the camera wing may be manually pivotable beyond the drive position to a forward fold position. When the wing is pivoted from the drive position toward the forward fold position, the wing may be at least partially received in a forward cavity at the exterior portion of the vehicle. A forward flap assembly may seal the forward cavity when the wing is between the folded position and the drive position and accommodate the pivotal movement of the wing into the forward cavity when the wing is pivoted toward the forward fold position. The forward flap assembly may bias the wing from the forward fold position toward the drive position.

These and other objects, advantages, purposes and features of the present invention will become apparent upon review of the following specification in conjunction with the drawings.

BRIEF DESCRIPTION OF THE DRAWINGS

FIGS. 24 and 25 are exploded views of another actuator;

FIG. 42 is a perspective view of the camera wing and detent assembly of FIG. 34;

FIG. 43 is a perspective and sectional view of the camera wing and detent assembly;

FIG. 44 is a sectional view of the detent assembly;

FIG. 58A is a perspective view of the camera wing of FIG. 53, shown in its extended position as extended via actuation of the cable pull actuator;

FIG. 58B is a perspective view of the camera wing of FIG. 53, shown in its extended position;

FIG. 59A is a perspective view of the camera wing of FIG. 53, shown in its forward fold position when manually pivoted from the extended state; and FIG. 59B is a perspective view of the camera wing of FIG. 53, shown in its forward fold position.

DESCRIPTION OF THE PREFERRED EMBODIMENTS

Figure 1:
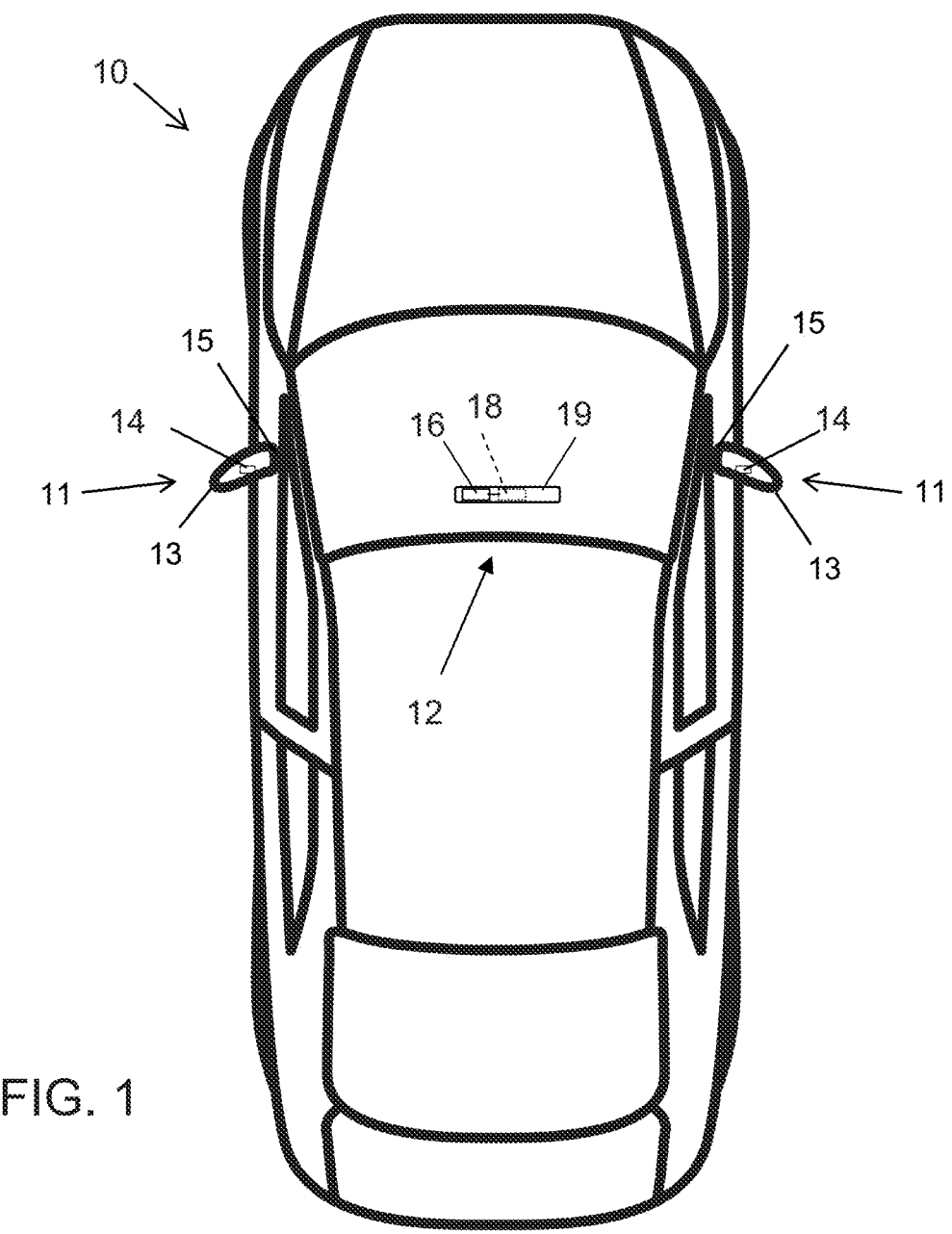
FIG. 1 is a plan view of a vehicle having a vision system and wing-mounted camera devices.
Figure 2:
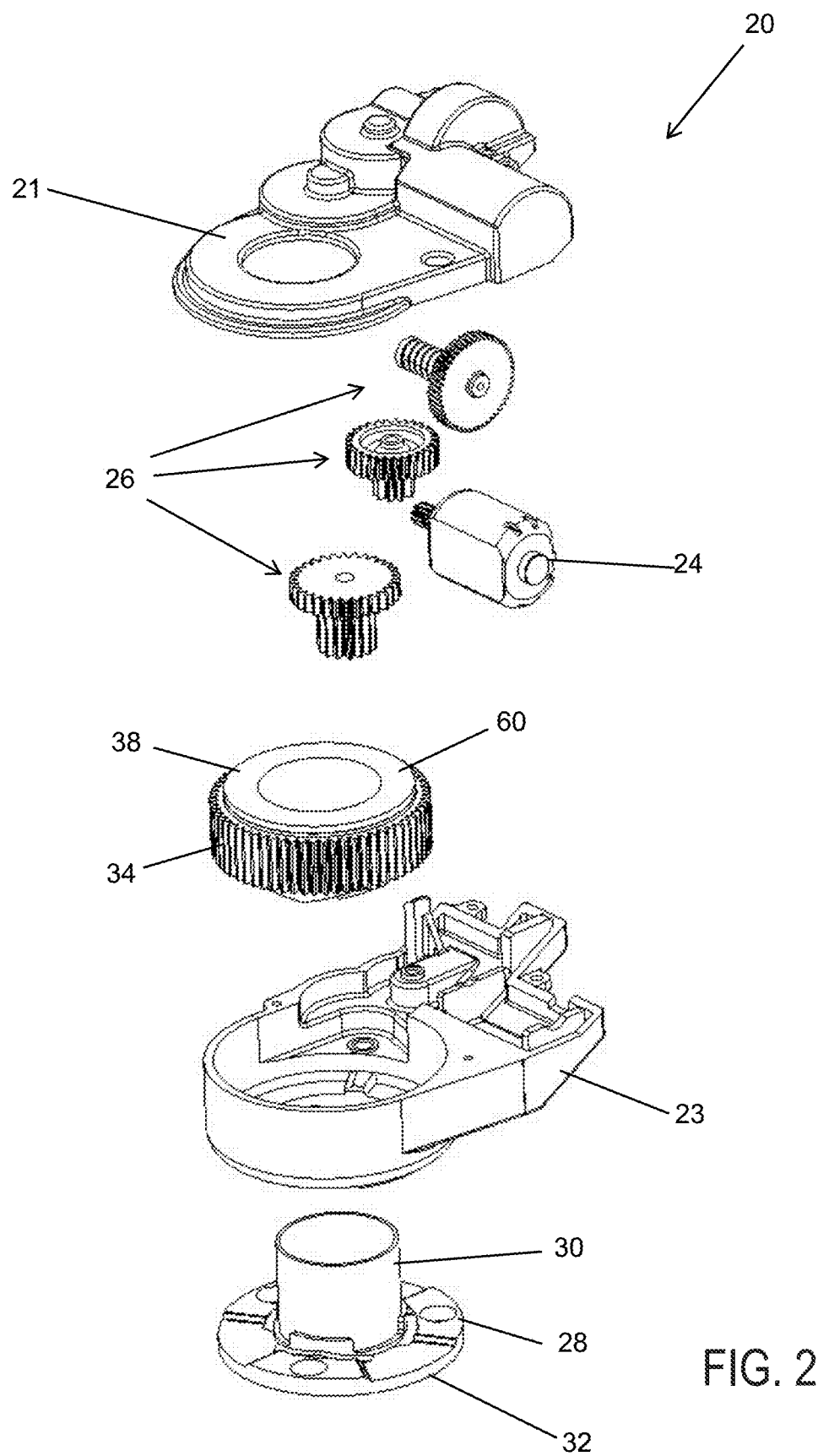
FIG. 2 is an exploded perspective view of an actuator of the wing-mounted camera device.
Figure 3:
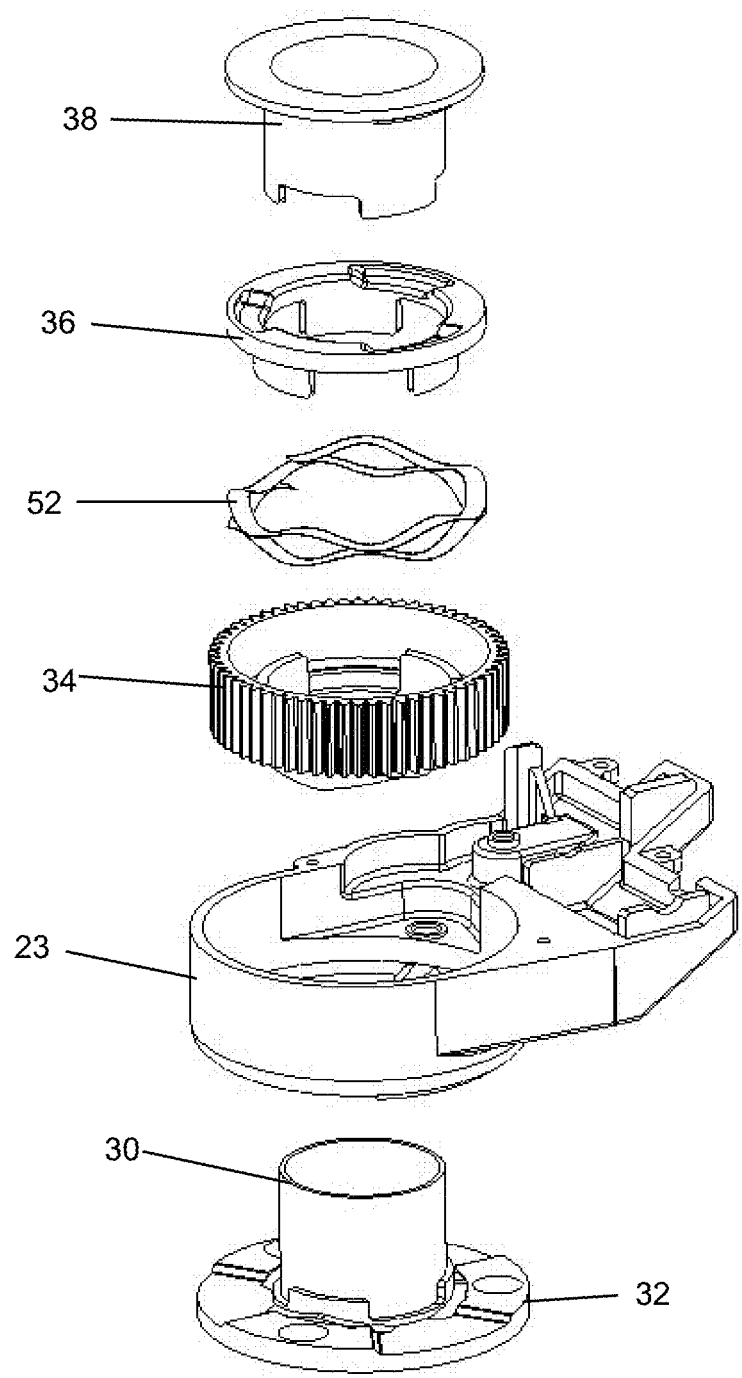
FIG. 3 is an exploded perspective view of the output gear, lower housing, and base post structure of the actuator of FIG. 2.

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and to provide an output to one or more display devices for displaying video images representative of the captured image data. For example, the vision system may provide a rearview display (such as derived from image data captured by one or more rearward viewing cameras at the vehicle) or a top down or bird's eye or surround view display or the like.

Referring now to the drawings and the illustrative embodiments depicted therein, a vehicle 10 includes an imaging system or vision system 12 that includes multiple exterior viewing cameras, including wing-mounted pivotable camera devices or modules 11 at each side of the vehicle (FIG. 1), such as at or in place of traditional exterior rearview mirror camera locations. The wing-mounted cameras 14 may be disposed on pivotable arms or camera wings 13 pivotable relative to a mounting base or arm 15 between a use or drive position and a park or folded position where at the drive position, the pivotable arm or camera wing 13 is extended from the side of the vehicle so that the camera 14 may view sideward and rearward of the vehicle to capture image data representative of a view sideward and rearward of the vehicle. At the park position, the camera wing 13 is pivoted in toward (and partially into) the respective side of the vehicle (and may be optionally received within a recess at the respective side of the vehicle). The wing-mounted camera device 11 is pivotable between the drive and park positions via operation of an actuator 20 that may be operated responsive to a user input. The wing-mounted camera device may also be manually pivotable between the drive and park positions. The camera wing and wing-mounted camera may have features similar to those described in International Publication No. WO 2021/263280, which is hereby incorporated herein by reference in its entirety.

As will be described further below, the actuator is operable to pivot the wing between at least the drive and park positions and includes a biasing element such as a coil spring or wave spring accommodated substantially or entirely within an output gear to provide a self-contained and low-profile, compact double detent actuator that is disposed in thin or low profile wing structures and that enables lift and turn pivoting of the wing. The actuator includes an output gear and when the wing is pivoted between the drive and park positions via the actuator, the housing of the actuator travels around the output gear fixed relative to a base of the actuator. When the wing is manually pivoted between positions, the output gear is fixed relative to the wing and thus rotates about a post portion of the base as the wing pivots. The actuator further includes the internal spring that is accommodated substantially or entirely within a cavity of the output gear of the actuator and that provides a biasing force on the output gear and a middle detent element (that provides a portion of the upper detent interface of the actuator). Additionally, at least a portion of the middle detent element is received or accommodated within the cavity of the output gear.

The system 12 may also include other cameras, such as surround view cameras (including a rearward viewing or rear backup camera, a forward viewing camera at the front of the vehicle and side surround view cameras at respective sides of the vehicle). The side-mounted camera modules 11 may be part of a camera monitoring system (CMS), which may provide a rearward viewing camera that has a different field of view than the rear backup camera, with the camera 13 (when the module is extended) capturing image data of the respective scene exterior of the vehicle and in the field of view of the respective camera, with each camera having a lens for focusing images at or onto an imaging array or imaging plane or imager of the camera. The system 12 may display video images derived from image data captured by the cameras at a video display screen 18 in the vehicle for viewing by the driver of the vehicle while the driver is operating the vehicle 10.

The vision system 12 includes a control or electronic control unit (ECU) 16 having electronic circuitry and associated software, with the electronic circuitry including a data processor or image processor that is operable to process image data captured by the cameras, whereby the ECU 16 may detect or determine presence of objects or the like and/or the system 12 may provide video images to the display device 18 of the interior rearview mirror assembly 19 of the vehicle for viewing by the driver of the vehicle and/or to a display device at the center console or stack of the vehicle (and optionally to CMS displays at or near the driver and passenger side A-pillars of the vehicle, such as described in U.S. Publication Nos. US-2018-0134217 and/or US-2014-0285666, which are hereby incorporated herein by reference in their entireties). The data transfer or signal communication from the cameras to the ECU may comprise any suitable data or communication link, such as a vehicle network bus or CAN (Controller Area Network) bus or LIN (Local Interconnect Network) bus or I2C bus or the like of the equipped vehicle.

The rearward viewing cameras of the CMS cameras may function to provide rearward video images for a dual-mode interior rearview video mirror that can switch from a traditional reflection mode to a panoramic live-video display mode. The system and cameras and display device may utilize aspects of the systems described in U.S. Pat. Nos. 11,242,008; 10,442,360; 10,421,404; 10,166,924; 10,046,706; 9,676,336 and/or 9,487,142, and/or U.S. Publication Nos. US-2021-0162926; US-2021-0155167; US-2021-0094473; US-2020-0377022; US-2019-0258131; US-2019-0146297; US-2019-0118717; US-2019-0047475 and/or US-2017-0355312, and/or International PCT Application No. PCT/US2022/070062, filed Jan. 6, 2022, which are all hereby incorporated herein by reference in their entireties.

The wing-mounted pivotable camera device 11 includes a wing 13 pivotally mounted at a base portion 15 (such as a mounting base or mounting arm), the pivotable wing accommodating a camera 14 operable to capture image data. The wing or camera wing 13 is pivotable between a use or drive position (where the wing is extended from the side of the vehicle so that the camera is extended and/or spaced from the side of the vehicle and has a field of view at least sideward and rearward of the vehicle along the respective side of the vehicle at which the device is mounted) and a park or folded position (where the wing is folded in toward the respective side of the vehicle and the camera is unable to view along the side of the vehicle). As shown in FIG. 1, one wing-mounted pivotable camera device 11 is disposed at each side of the vehicle 10 to provide sideward and rearward views along each side of the equipped vehicle. The base portion or mounting arm 15 is disposed at the side of the vehicle 10 with the camera wing 13 pivotally attached thereat and the device 11 is a powerfold assembly that includes the actuator 20 operable to pivot the camera wing 13 relative to the mounting arm or base 15. Additionally, the wing-mounted pivotable camera device 11 may comprise a breakaway device (where the camera wing 13 may be manually pivoted relative to the mounting arm or base 15). Although the actuator described herein is described in reference to a wing-mounted camera, it should be understood that the actuator may be compatible with exterior rearview mirror assemblies as well as other rotatable mounting structures and exterior mounted components.

The actuator 20 operates, responsive to a user input, to pivot the wing 13 between a plurality of detent positions, including the use or drive position (where the wing 13 is extended laterally from the side of the vehicle 10 and the camera 14 views generally rearward along the side of the vehicle) and the folded or park position (where the wing 13 is pivoted to be generally along the side of the vehicle 10 and optionally recessed within the side of the vehicle at which the wing is mounted). The wing 13 is also pivotable manually to either the use or folded position. Optionally, the wing 13 may be pivotable beyond the drive position to a fully forward or open position. A seal may be disposed along the interface between the wing 13 and the mounting arm or base 15. The actuator may utilize aspects of the actuators described in U.S. Pat. Nos. 7,887,202 and/or 9,487,142, and/or U.S. Publication Nos. US-2021-0261053 and/or US-2020-0223364, which are all hereby incorporated herein by reference in their entireties.

The powerfold actuator 20 has a self-contained compact, pivot, double detent design and is capable of having an all-plastic gear train (discussed further below) with spur gear reduction for added strength and reduced wear, which may provide a flexible gear train that allows for more freedom in packaging design and gear ratio tuning and reduced thrust on motor shaft to improve longevity and reduce motor "click." The double detent design enables lifting or raising of the wing 13 (which is attached to the housing of the actuator) when the mounting structure is rotated to reduce stress on the seal disposed between the wing 13 and the mounting arm or base 15 and allows the actuator 20 to return to a nominal state after the mounting structure is manually rotated.

With reference to FIGS. 2-23, the actuator 20 comprises a housing 22 that accommodates an electrically operable motor 24, a gear train 26, and a detent assembly disposed at a base post structure 28 that has a pivot tube or post 30 and base 32 integrated together with the pivot post providing or defining a pivot axis for the wing 13. The post 30 extends from the base 32 and an output gear 34 is disposed along the post 30 at the bottom of the post (i.e., at or near the base 32), with the post 30 extending through a central axis of the output gear 24. An actuator housing or lower housing 23 is rotatably disposed at the post 30 and houses the motor 24 and is non-rotatably disposed or attached at the camera wing 13. The post 30 extends from the base 32 and through the output gear 34 and lower housing 23 and through a middle detent element 36 and at least a portion of an upper detent element 38. An upper housing portion 21 attaches to the lower housing 23 and encloses the base post, motor, detent elements, output gear and gear train. The base 28 is fixed at the mounting arm 15 (such as via bolts) and the housing is fixed relative to the wing 13 so that when the actuator is operated, the housing (and therefore the wing) pivots relative to the base or mounting arm 15. The actuator 20 also enables manual pivoting of the wing 13 relative to the mounting arm 15 via the detent assembly (collectively the output gear, upper detent element or part, middle detent element or part, and a biasing element or wave spring 52) and its engagement with the housing so that, if the wing 13 is manually rotated, the actuator 20 may return or reset to a nominal position prior to subsequent motor driven operation of the actuator.

Figure 5:
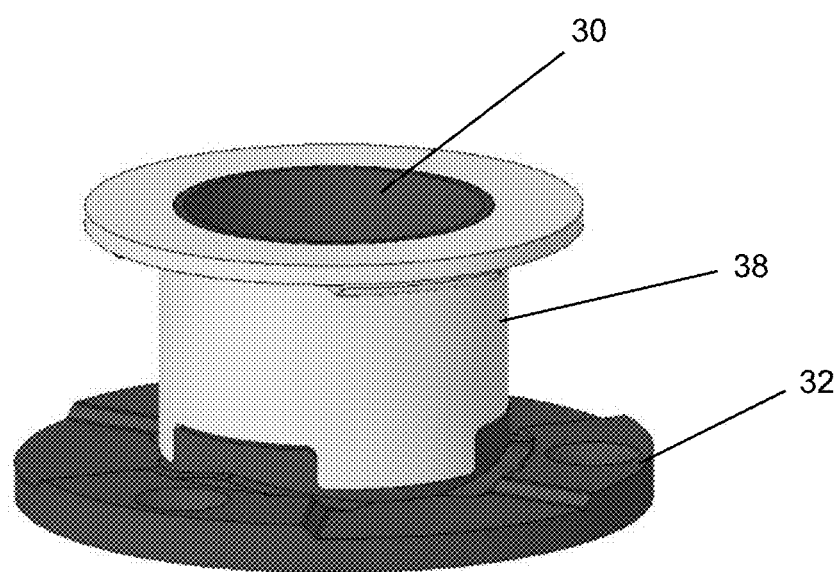
FIG. 5 is a perspective view of the post base structure disposed at an upper detent element.

The upper detent 38 is non-rotatably keyed with the base structure 28 such that the upper detent 38 is non-rotatable relative to the post (FIG. 5). Thus, both the base structure 28 and the upper detent 38 are fixed and cannot move relative to one another and the base, pivot post and upper detent can be riveted or otherwise fastened together. The middle detent 36 is keyed with the output gear 34 such that the middle detent 36 and output gear 34 rotate together and at least a portion of the middle detent 36 is accommodated or received within a cavity of the output gear 34. The middle detent 36 and output gear 34 may independently travel vertically or longitudinally along the pivot post 30 and are biased or urged apart by the wave spring 52 disposed between the middle detent 36 and output gear 34 and accommodated or disposed entirely within the cavity of the output gear 34.

The actuator 20 has two detent interfaces that become active (i.e., engage to affect operation of the actuator 20) at different times. The upper detent interface is between an upper surface of the middle detent element 36 and a lower surface of the upper detent element 38. The lower detent interface is between a lower surface of the lower housing 23 and the top or upper surface of the base 32. A third interface may be referred to as the ramp interface, which is between a lower surface or ramp structure of the output gear 34 and the top or upper surface of the base portion 32 of the base post structure 28. As described below, the upper detent interface, the lower detent interface, and the ramp interface enable the detent elements, output gear, and lower housing to engage and disengage with one another so that the housing 22 and wing 13 may lift and pivot relative to the mounting arm 15 between the drive and fold positions (and optionally an open position) either as driven by the motor 24 of the actuator 20 or as manually pivoted by a user.

Figure 4:
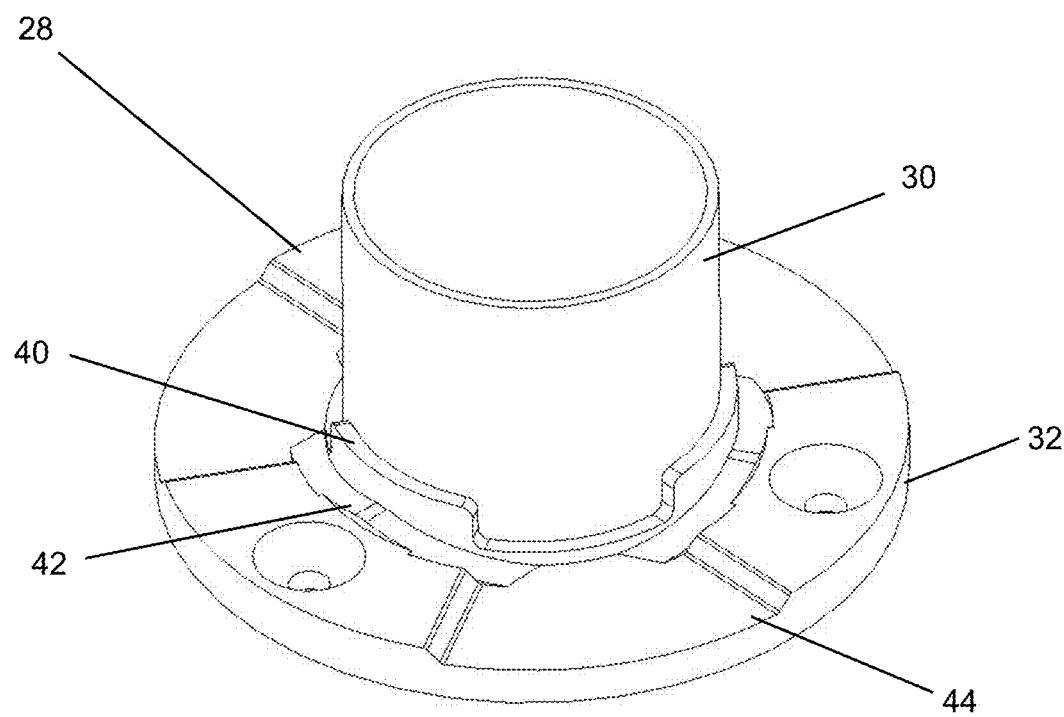
FIG. 4 is a perspective view of the post base structure of the actuator.

The base post structure 28 with base portion 32 and pivot post 30 is fixed to the mounting arm 15 with the pivot post 30 providing the pivot axis for the wing 13 and actuator 20. The base portion 32 includes a bottom surface (that may engage a surface of the mounting arm or base when mounted thereat) and the top surface opposite the bottom surface that engages the bottom surface of the lower housing 23. As shown in FIGS. 4 and 5, the base post structure 28 is keyed with the upper detent part 38 via a series of protrusions 40 circumscribing the pivot post 30 to fix the upper detent part 38 relative to the base 28 and prevent the upper detent 38 from rotating about the pivot post 30. Circumscribing the outer radius of the post protrusions 40 is a ring of lift ramps 42 configured to engage corresponding ramp structure of the output gear 34 (collectively forming the ramp interface). The lift ramps 42 guide vertical (upward and downward) movement of the output gear 34 along the pivot post 30 as the output gear rotates about the pivot post 30. Disposed radially outward from the lift ramps 42 is a grouping of detents 44 (referred to as base detents) at the upper end or surface of the base portion 32. Base detents 44 are configured to engage corresponding detents 25 at the lower end or surface of the lower housing 23 so that, when the base detents 44 are aligned with the detents 25 of the lower housing 23 (i.e., the detents are nested with one another, such as in FIG. 16), the housing 22 (and thus camera wing) is in a lowered state, and when the detents are not aligned (i.e., rotated so as to engage one another, such as in FIG. 17), the housing 22 (and thus camera wing) is in a raised state. The detents are aligned or nested when a raised portion of one detent engages a lowered portion of another detent. Thus, the housing 22 is in a lowered state when the camera wing is in a final (drive or park) position and the housing is in a raised state when the wing is being pivoted between the final positions.

Figure 6:
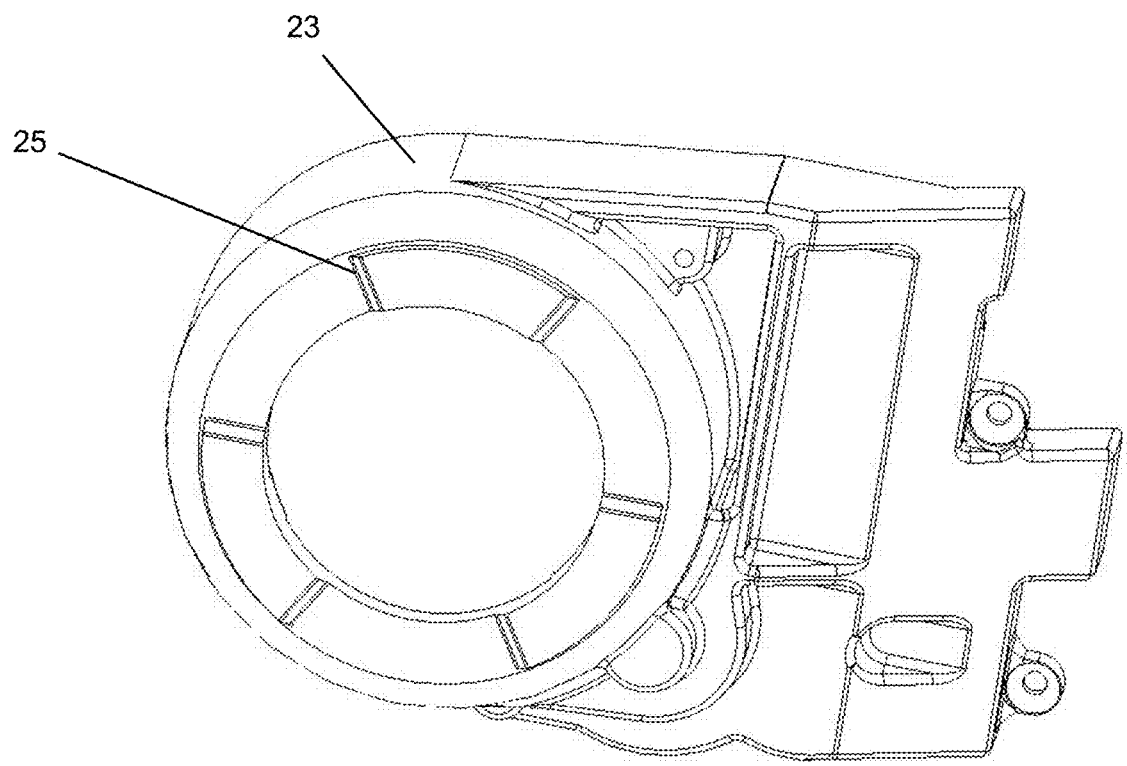
FIGS. 6 and 7 are perspective views of the lower housing of the actuator.

The bottom surface of the lower housing 23 (such as seen in FIG. 6) includes the detents 25 (referred to as housing detents) that are configured to engage the base detents 44 of the base portion, thus forming the primary or lower detent interface. When the lower housing 23 is rotated (as described further below), the raised portion of the housing detents 25 lift out of the corresponding lowered portion of the base detents 44 (as guided by the slanted or sloped surfaces of the detents) and move along the raised portion of the base detents 44 to maintain the housing at the lifted position as the housing rotates to its next position (such as from the drive position to the park position). The lower housing 23 also has an upper or inner surface 27 configured to engage a bottom surface of the output gear 34.

Figure 7:
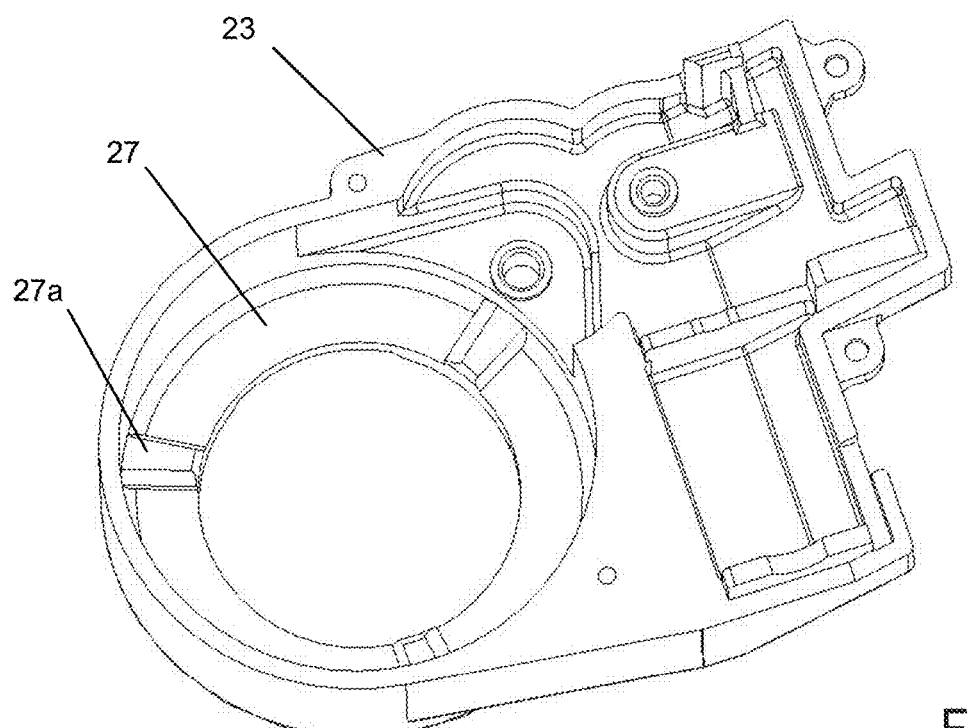

As shown in FIG. 7, the lower housing 23 includes the cavity in which the motors, gear train, output gear and detent elements are accommodated so that the entire apparatus may be a reduced or lower profile assembly. The upper or inner surface 27 of the lower housing cavity engages a lower surface of the output gear 34 and includes protrusions or stops 27a to engage corresponding structure on the bottom surface of the output gear 34. The stop protrusions 27a provide a resistant element so that as the camera wing 13 pivots between the drive and park positions, the stops 27a may engage the corresponding structure on the bottom surface of the output gear 34 to preclude further movement of the housing relative to the output gear 34 and stall the motor. That is, the position of the stops 27a correspond to the position of the wing 13 at the drive and park positions so that the motor is stalled and the housing and wing may cease pivoting when the motor is electrically operated to pivot the camera wing to the drive or park position.

The output gear 34 is disposed at the pivot post and is selectively pivotable (as described below) about the pivot post 30 based on engagement of the upper detent interface.

Figure 8:
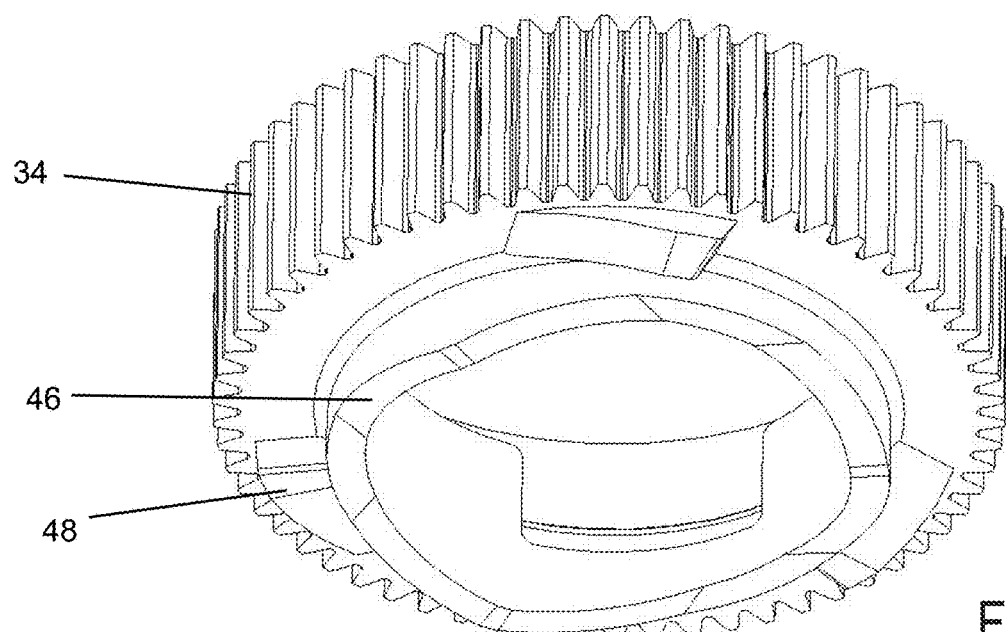
FIGS. 8 and 9 are perspective view of the output gear of the actuator.
Figure 10:
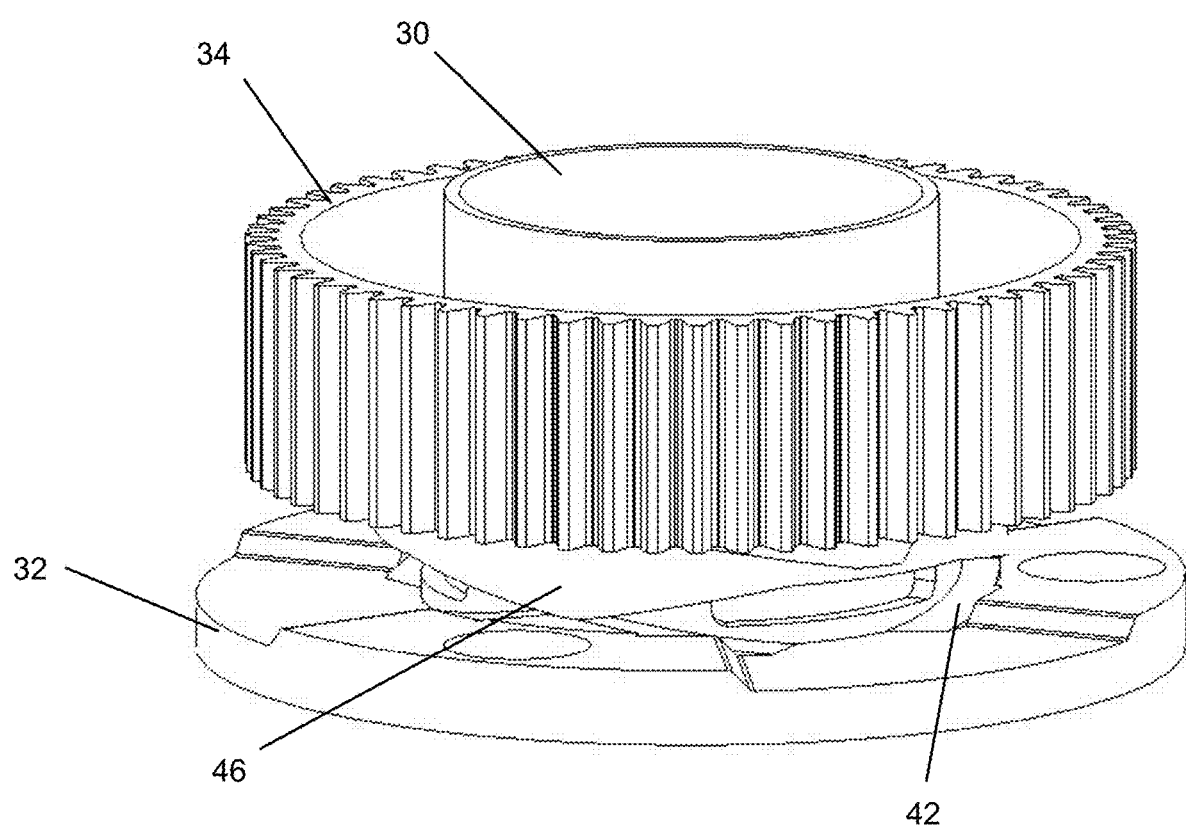
FIG. 10 is a perspective view of the output gear disposed at the post base structure.
Figure 11:
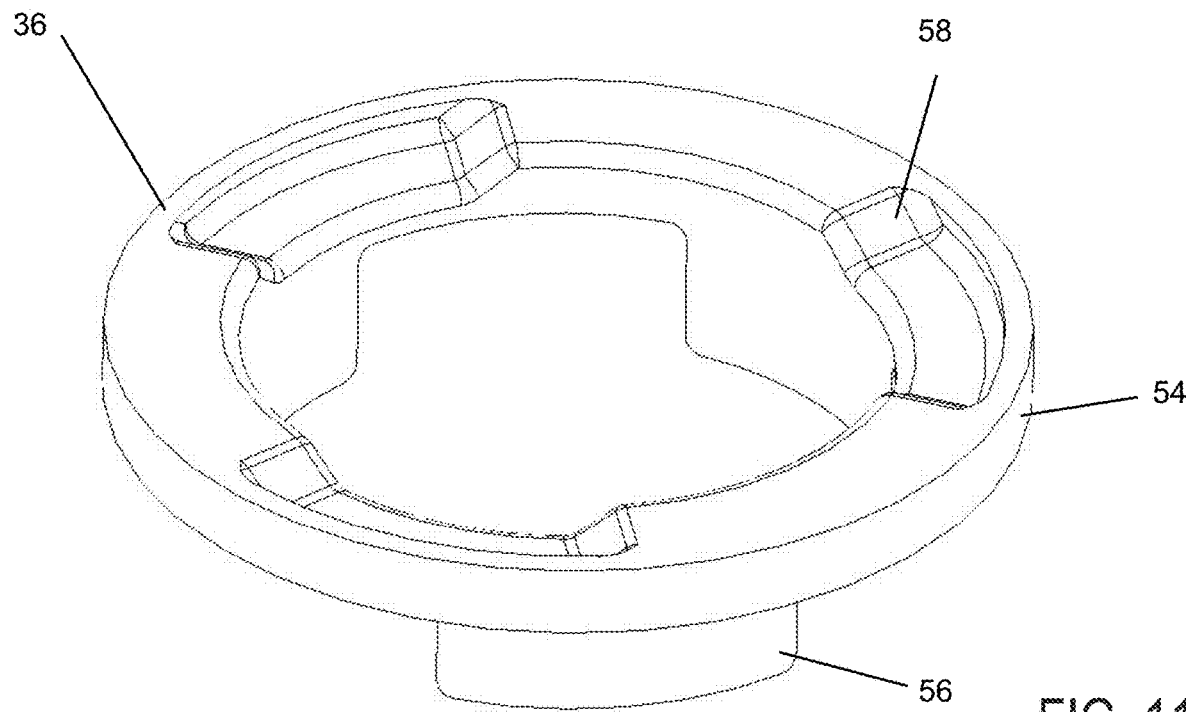
FIGS. 11 and 12 are perspective views of a middle detent element of the actuator.
Figure 12:
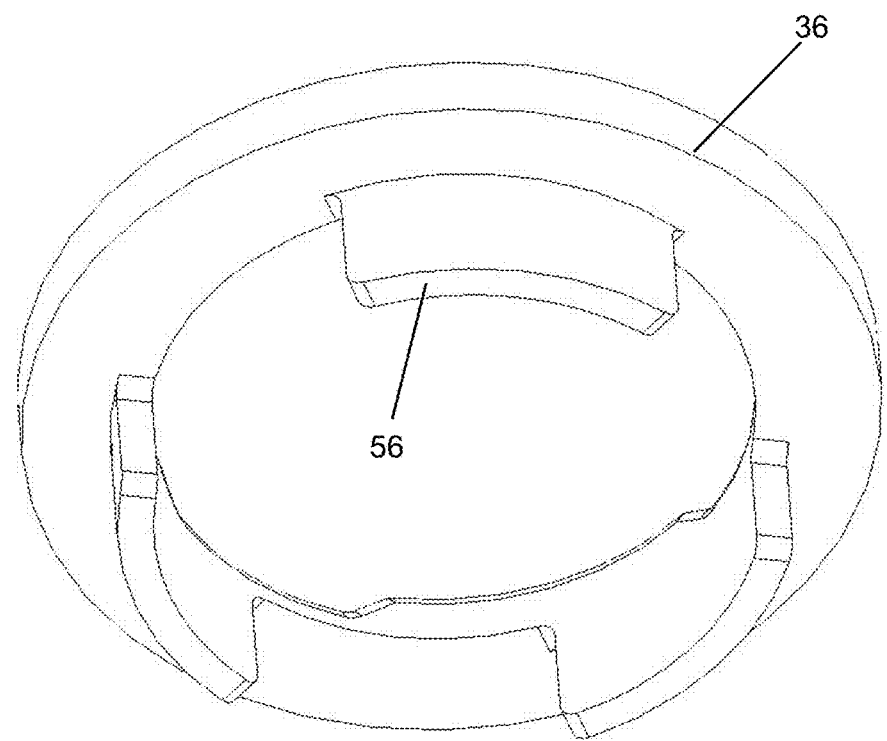
Figure 13:
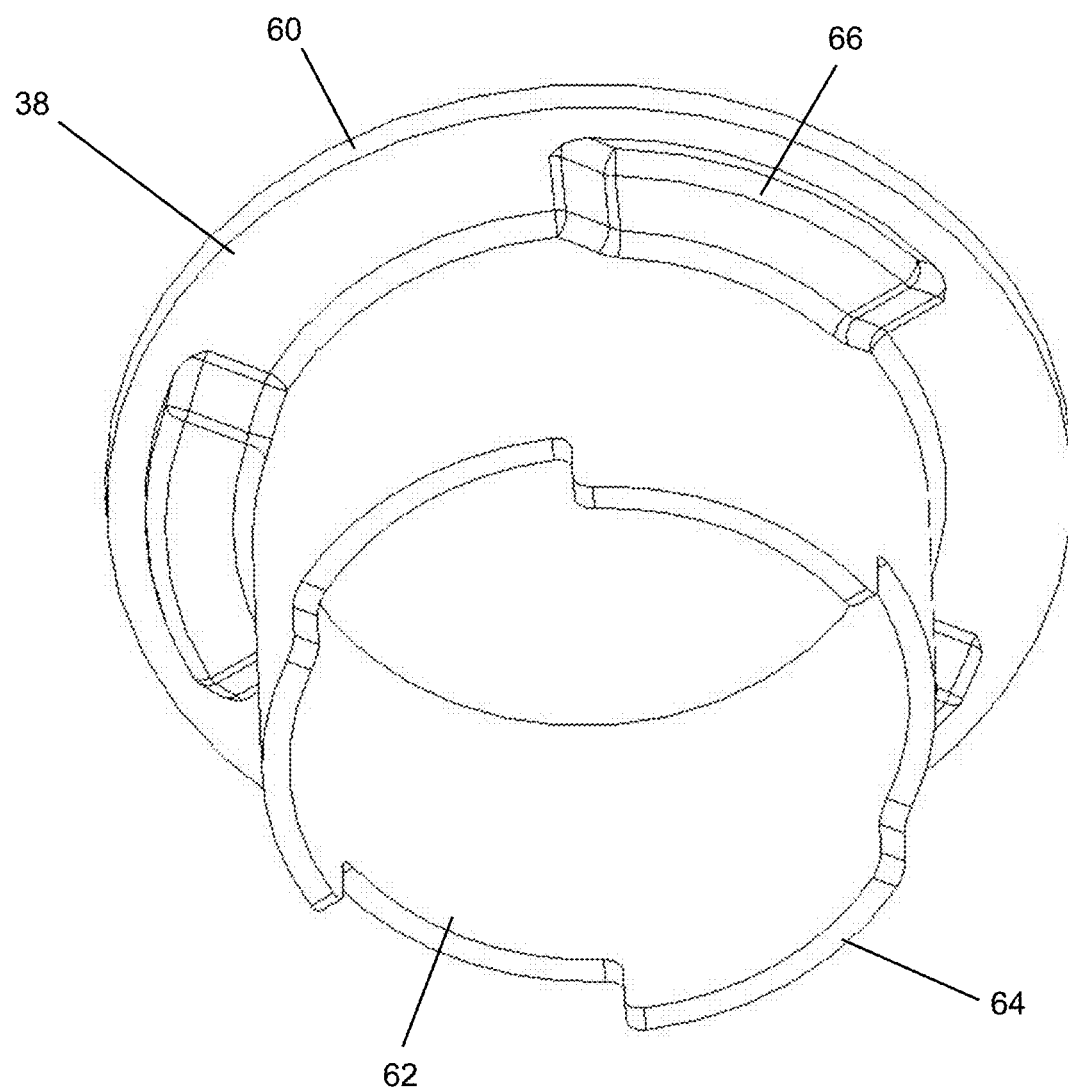
FIGS. 13 and 14 are perspective views of the upper detent element of the actuator.
Figure 14:
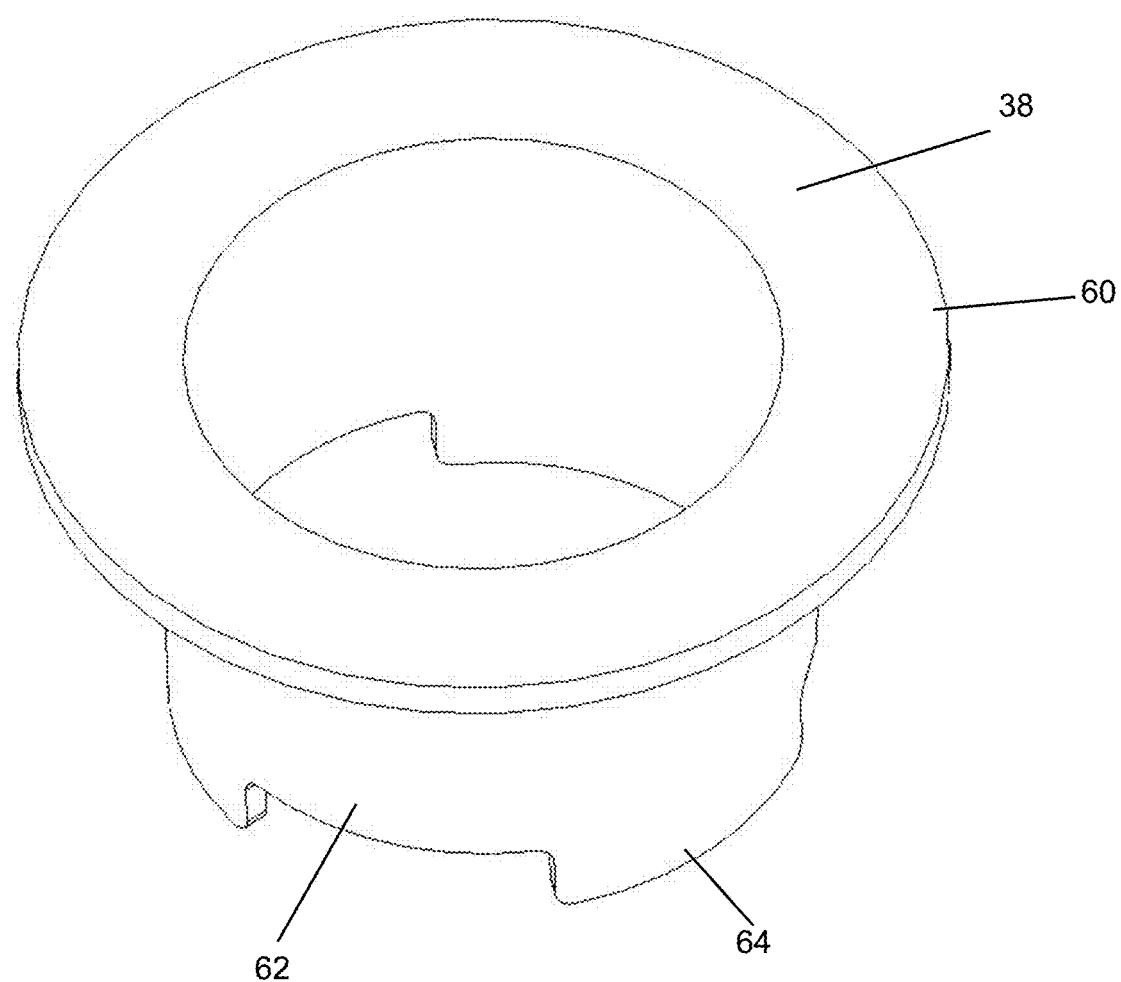

The pivot post 30 extends from the base portion 32 through a central through hole of the output gear 34. As shown in FIG. 8, protruding from the lower end or surface of the output gear and circumscribing the central through hole is a ramp structure 46 configured to engage the lift ramps 42 of the base structure (when the output gear is disposed at the pivot post) so that as the output gear 34 rotates about the pivot post 30, the ramp structure 46 engages the lift ramps 42, causing the output gear 34 to lift relative to the base portion 32 along the pivot post 30. When the output gear 34 is disposed at the pivot post 30, the ramp structure 46 protrudes through an opening in the lower housing 23 (through which the pivot post also extends) to engage the lift ramps 42 of the base structure. Optionally, the lift ramps 42 may protrude through the opening in the lower housing 23 to engage the ramp structure 46 of the output gear 34 within the housing. When a peak of the ramp structure 46 is engaged with a peak of the lift ramp 42, the output gear 34 is in a raised position along the pivot post 30 relative to the base structure 28 (FIG. 10). When the peak of the ramp structure is in a valley of the lift ramp, the output gear is in a lowered position along the pivot post relative to the base structure.

Figure 9:
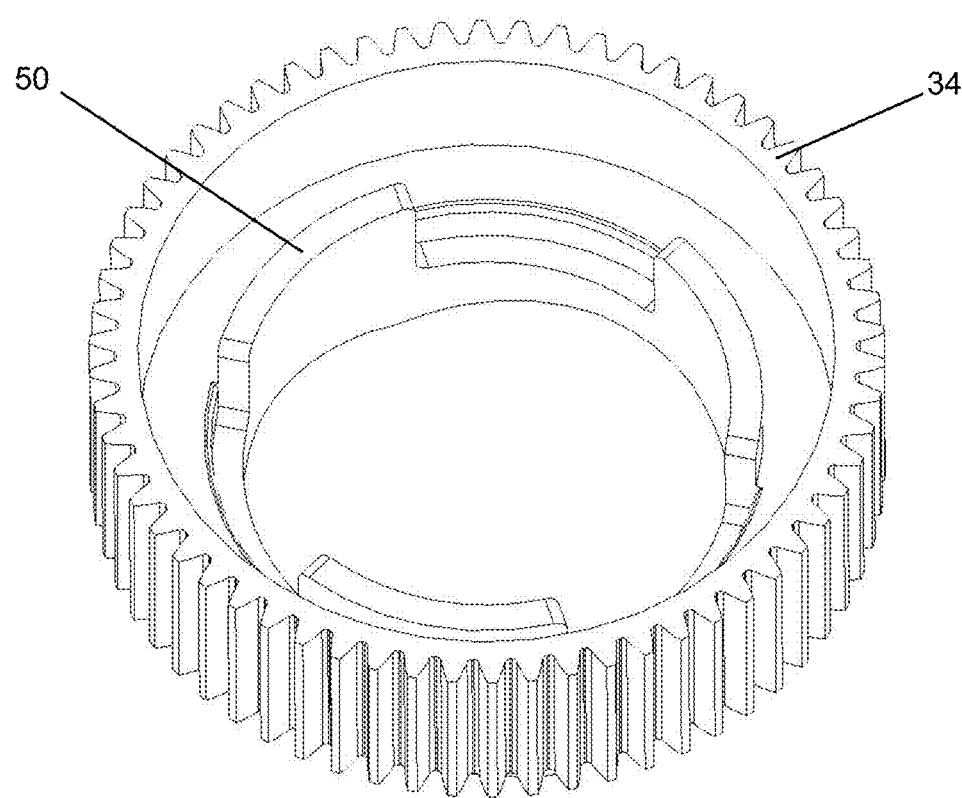

As shown in FIG. 9, a plurality of protrusions 48 (referred to as output gear stops) are also disposed at the bottom surface of the output gear 34 and are configured to engage the stops 27a at the upper or inner surface 27 of the lower housing 23 to guide rotation of the lower housing 23 relative to the output gear 34. When the lower housing 23 rotates about the output gear 34, the stops 27a of the lower housing 23 may engage the output gear stops 48 to provide the hard stop and stall the motor 24. The stops 27a are configured so that the output gear 34 is in a cinch position with the lower housing 23 when the camera wing 13 is in the drive position. Furthermore, the output gear stops 48 have a sloped surface so that during certain rotations, the output gear may rotate past engagement with the lower housing stops 27a.

The output gear 34 has a cavity that receives the wave spring 52 and at least a portion of the middle detent 36. The output gear 34 is keyed together with the middle detent 36 via a series of protrusions 50 (FIG. 9) circumscribing the through hole of the output gear and corresponding protrusions 56 from a bottom surface of a flange of the middle detent 36 so that the middle detent 36 is rotationally fixed relative to the output gear 34. The middle detent 36 and output gear 34 may travel independently in a longitudinal direction along the pivot post, but rotate together due to the keyed protrusions. The wave spring 52 engages the inner surface of the output gear cavity and the bottom surface of the flange of the middle detent 36 and is sandwiched therebetween to impart a separating biasing force between the two components. Thus, the wave spring 52 biases or urges the output gear 34 and the middle detent 36 in opposite, separating directions so that the output gear 34 is biased toward the lower housing 23 (for example, so that the ramp structure 46 of the output gear 34 engages the lift ramps 42 of the base structure) and the middle detent 36 is biased into engagement with the upper detent 38. Thus, the wave spring 52 provides an internal or integrated spring within the detent assembly to further reduce the profile of the actuator 20.

The middle detent 36 (FIGS. 11 and 12) comprises a flange 54 with a top and bottom surface and protrusions 56 extending from the bottom surface of the flange 54 to engage the corresponding protrusions 50 of the output gear. The top surface of the flange 54 includes a series of detents 58 (referred to as middle detents) configured to engage corresponding detents on the bottom surface of a flange of the upper detent element 38, thus forming the upper detent interface. Because at least a portion of the middle detent element 36 is disposed within the cavity of the output gear 34, the upper detent interface may also engage within or in close proximity to the cavity of the output gear 34. This further reduces the profile of the actuator 20.

The upper detent 38 (FIGS. 13 and 14) comprises a flange 60 with a top and bottom surface, a post structure 62 extending from the bottom surface of the upper detent flange 60 and protrusions 64 extending from the post structure 62 engaging corresponding structure at the base structure 28 to rotationally fix the upper detent 38 to the base structure 28. The post structure 62 of the upper detent 38 extends along the pivot post 30. The bottom surface of the flange 60 of the upper detent 38 includes detents 66 (referred to as upper detents) corresponding to the middle detents of the middle detent element 36. When the upper detent 38 engages the middle detent 36 to form the upper detent interface, an upper end or surface of the upper detent flange 60 effectively caps or retains the wave spring 52 and the middle detent 36 within the cavity of the output gear 34. For example, see FIG. 2 where the output gear assembly (with upper detent encasing the middle detent element and wave spring within the cavity of the output gear) provides a singular, low profile and compact construction to be disposed in the housing. Thus, the middle detent element, upper detent element, wave spring, and output gear contribute to the low profile nature of the actuator.

Figure 15:
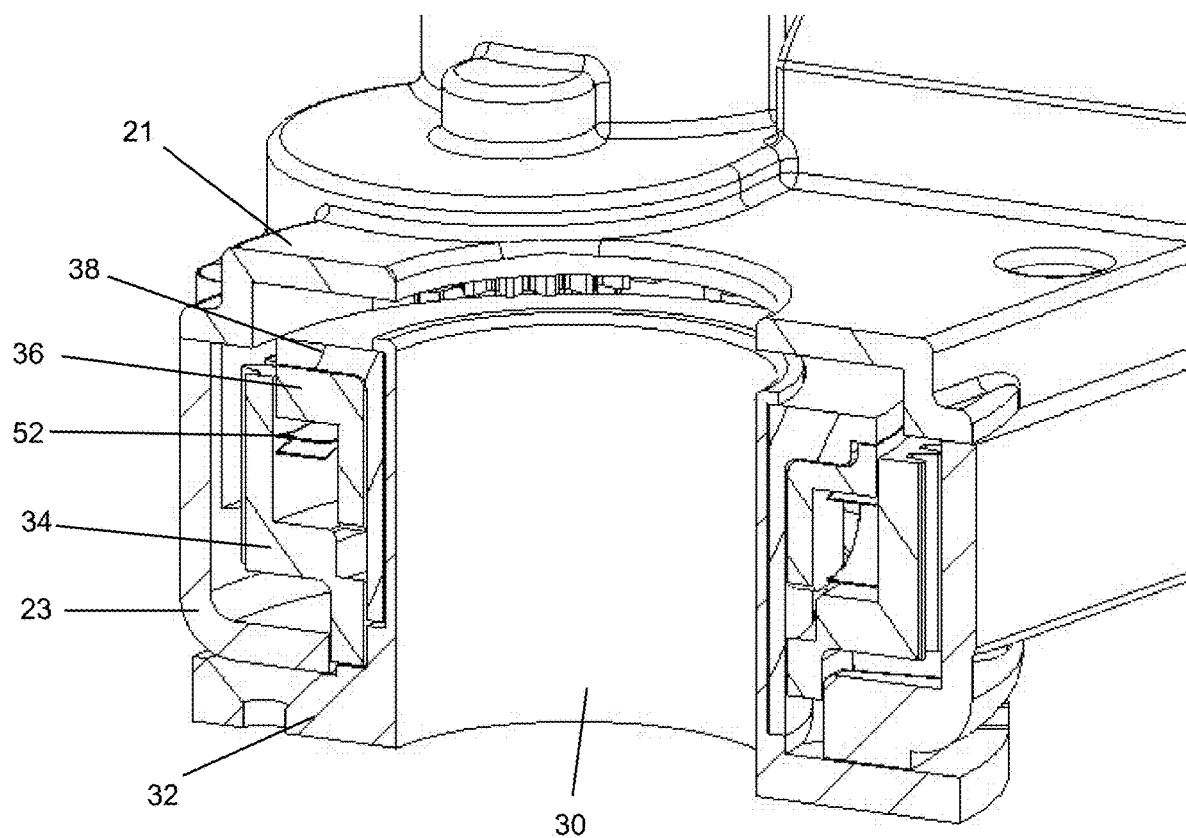
FIG. 15 is a sectional view of the actuator.

The upper housing 21 attaches to the lower housing 23 to house the pivot or detent assembly (collectively the output gear, wave spring, middle detent, and upper detent) and motor or drive assembly (collectively the motor and gear train) within a cavity defined by the upper and lower housing. The upper housing 21 is fixed to the lower housing 23 (such as via bolts, adhesive, or the like) and rotates with the lower housing 23. As shown in FIG. 15, the actuator provides a compact assembly to be disposed in a narrow or thin wing-mounted camera wing. The lower housing 23 provides a cavity that accommodates the detent assembly and the output gear 34 of the detent assembly provides a cavity that accommodates at least a portion of the middle detent, spring, and upper detent. The output gear 34 engages the base structure at a ramp interface, the lower housing 23 engages the base structure at a lower detent interface and the middle detent 36 engages the upper detent 38 at an upper detent interface. Collectively, the housing rotates about the pivot post 30, as discussed below, either via manual rotation or under power of the drive assembly through the detent assembly (which may be referred to as a power fold rotation or event). With the housing fixed relative to the camera wing 13, the camera wing 13 pivots about the pivot post 30 according to movement of the actuator housing.

Figure 16:
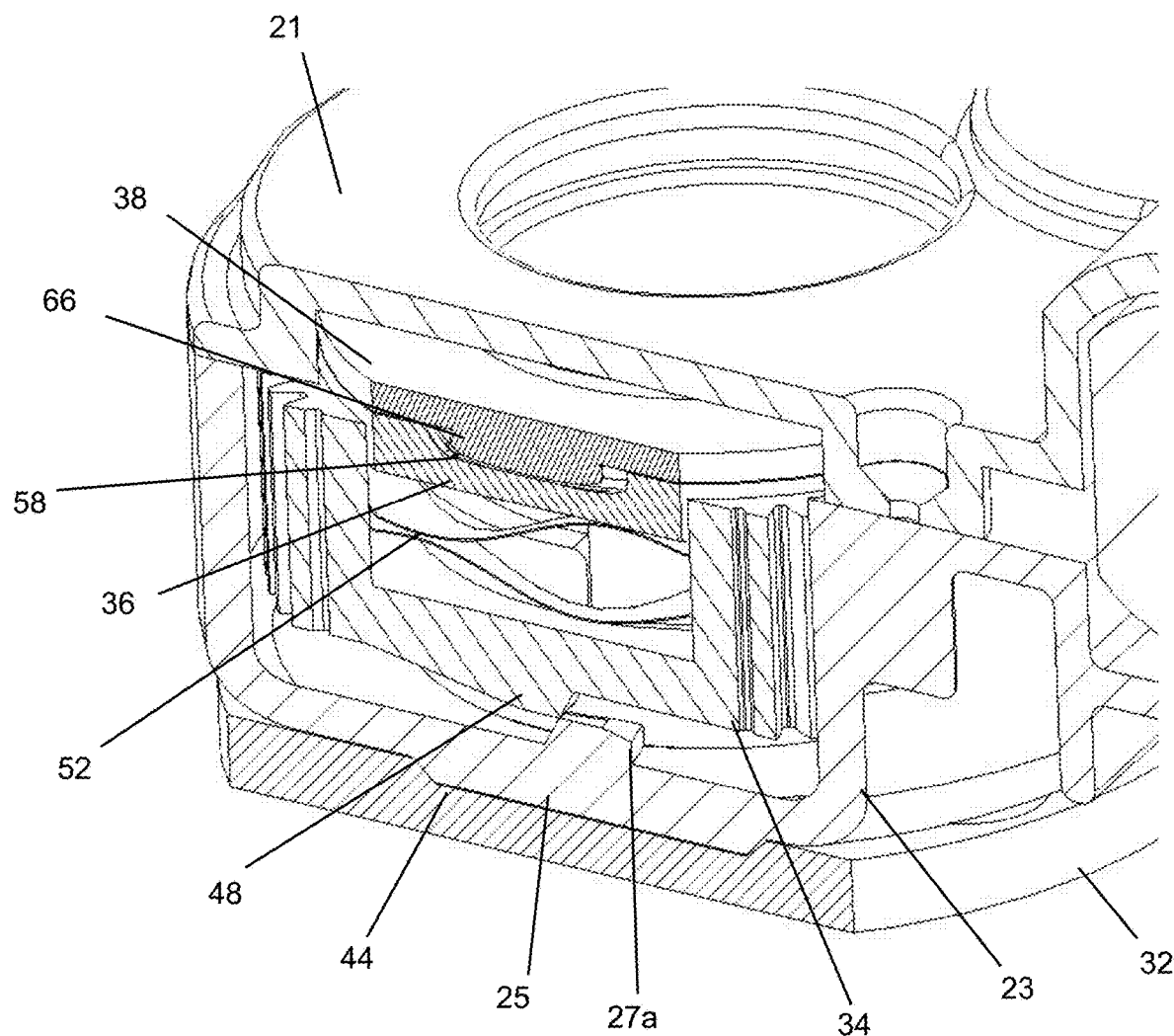
FIGS. 16-18 are sectional views of the actuator in different detent states.
Figure 17:
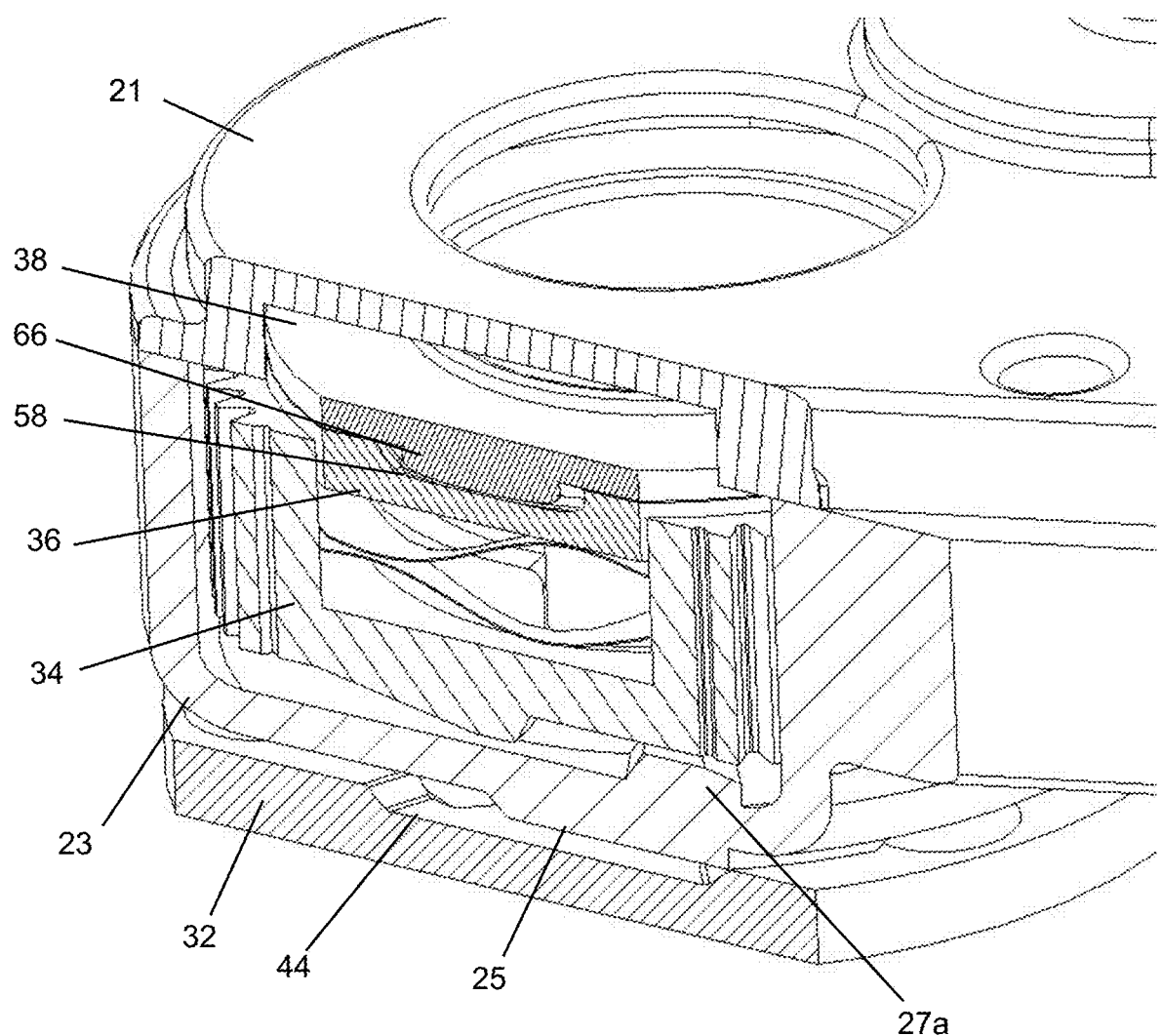

When the camera wing 13 is rotated between the drive and fold positions via operation of the motor 24, the output gear 34 is fixed relative to the pivot post 30. For example (as shown in FIG. 16), the actuator may be positioned in a drive position, where the housing (and therefore camera wing) is lowered along the pivot post relative to the base portion with the lower detent interface engaged. Thus, the lower or recessed portions of the base detents 44 are aligned or keyed with the raised portions of the lower housing detents 25 and vice versa. The wave spring 52 imparts a biasing force to push the middle detent 36 into engagement with the upper detent 38 (engaging the upper detent interface) and the bottom surface of the output gear 34 toward the upper or inner surface 27 of the lower housing 23. Engagement of the upper detent interface is the alignment of the raised portion of upper detents 66 with the lowered or recessed portions of the middle detents 58 and vice versa. Thus, due to the engagement of the upper detent interface, when the motor 24 provides rotational force via the gear train 26 to the output gear 34 (such as to power fold the camera wing to the park position), the output gear 34 is fixed relative to the pivot post 30 via the middle detent 38 being rotationally fixed to the output gear and engaged with the upper detent 38 and the gear train 26 travels around the fixed output gear 34 to rotate the housing about the pivot post 30. In other words, the operation of the motor 24 turns the gears of the gear train 26 engaging the output gear and, because the output gear 34 is rotationally fixed, the rotational force is imparted on the housing to pivot the housing and camera wing 13. Thus the load path is through the output gear and lower housing.

When in the drive position, before the actuator 20 is actuated and without any manual pivoting (FIG. 16), the output gear 34 is held up or in a raised position along the pivot post 30 relative to the base structure via the lift ramps and ramp structure and the stops 27*a* of the lower housing 23 are engaged with the output gear stops 48 to cinch the output gear 34 relative to the housing (the nominal or starting position). As the housing is rotated toward the folded or park position via operation of the motor 24, the housing 23 lifts in relation to the base 32 while turning due to the disengagement of the lower detent interface, and such lifting lifts the camera wing 13 and increases the gap between the camera wing 13 and the mounting base 15 and thus reduces or limits or avoids pressure at the cut line seal (the seal that is disposed between and at the interface of the wing and the mounting arm and that follows the contour and fills the gap between the camera wing and the mounting arm) during pivotal movement of the camera wing 13. The lower housing 23, as it lifts up, is provided clearance to rotate because the output gear 34 is in the raised position via the ramp interface and rotationally fixed relative to the pivot post 30 via the upper detent interface (and so does not lower while the housing rotates about the pivot post). The biasing force of the wave spring 52 maintains the engagement of the upper detent interface during rotation of the housing about the output gear 34. As can be seen with reference to FIG. 17, the lower housing 23 and base detents thus disengage and the lower housing 23 lifts up and rotates at a lifted position due to the raised surface of the lower housing detents 25 traveling along the raised surface of the base detents 42.

When in the park or powerfold position with the output gear 34 in the raised position via the lift ramps (such as after being rotated from the drive position to the powerfold position via the motor), the camera wing 13 is rotatable to the drive position either via activation of the motor 24 or via manual rotation. If rotated from the powerfold position to the drive position via activation of the motor 24, the output gear 34 remains fixed relative to the base portion 28 (via engagement of the upper detent interface) and the housing travels around the output gear 34 until the lower detent interface engages and the housing is in the cinch position relative to the output gear 34 via engagement of the stops 27*a*.

Thus the motor 24 operates to rotate the housing from the drive position to the park position and from the park position to the drive position. The motor 24 operates until it is stalled or stops, such as when a stop 27*a* of the lower housing 23 engages the corresponding protrusion on the underneath surface of the fixed output gear 34. After the motor 24 is stalled when the camera wing 13 reaches the drive or powerfold position, the next time the motor 24 is activated, it will automatically rotate in the opposite direction to return the camera wing 13 to the previous position. For example, the motor 24 may be operated to rotate from the drive position to the powerfold or park position and as the camera wing 13 approaches the park position, the lower detent surface moves to reengage and the motor 24 is stalled. The next time the motor 24 is actuated, if the housing has not been manually rotated between motor activations, the motor 24 will rotate in the opposite direction to rotate the camera wing 13 from the park to the drive position, at which point the motor 24 will be stalled when the stop 27*a* of the lower housing 23 engages the output gear stop 48. If the camera wing 13 is manually rotated and then the motor 24 is activated, the motor 24 may rotate the output gear 34 back to a nominal starting position where the output gear 34 is raised relative to the base portion 28 and the upper detent interface is engaged and the actuator 20 may then be operational to rotate from its current position to the next position. That is, after manual pivoting, the output gear 34 is not rotationally fixed relative to the pivot post 30 and operation of the motor 24 rotates the output gear about the pivot post 30.

For example, if the camera wing 13 is in the drive position, with the output gear 34 at the raised position, and the actuator 20 is manually pivoted from the drive position to the park position, the rotational force is transferred (via locked gears of the gear train 26 connected to the motor 24) from the lower housing 23 to the output gear 34. Thus, the output gear 34 begins to rotate and the upper detent interface disengages as the output gear ramp structure 46 travels down the lift ramps 42 to lower the output gear 34 along the pivot post 30 to provide clearance for the middle detent 36 to lower relative to the upper detent 38 against the biasing force of the wave spring 52. The housing (and thus camera wing) resist further rotation from the drive position beyond the park position when the lower detent interface reengages at the park position.

If rotated from the park position to the drive position manually (with the output gear 34 in a raised position), the housing and output gear 34 are fixed relative to one another (via the locked gear train 26) and rotate together about the pivot post 30. The output gear 34 lowers along the pivot post 30 as the ramp structure 46 travels down the lift ramp 42 while the output gear 34 rotates, thus providing clearance for the upper detent interface to disengage. The housing is precluded from rotating beyond the drive position when the lower detent interface reengages and the output gear 34 is in the lowered position relative to the base 28.

Figure 18:
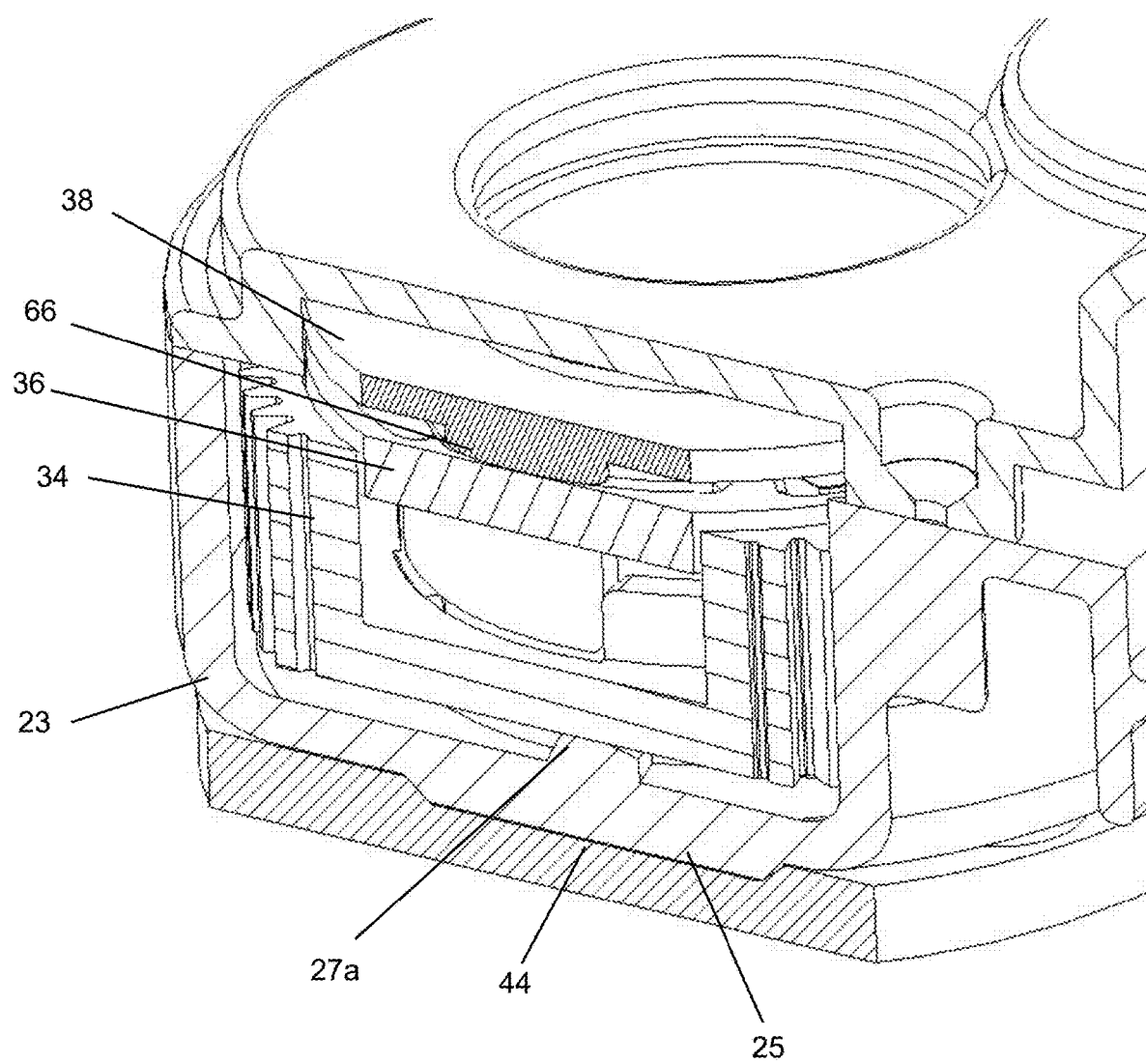
Figure 19:
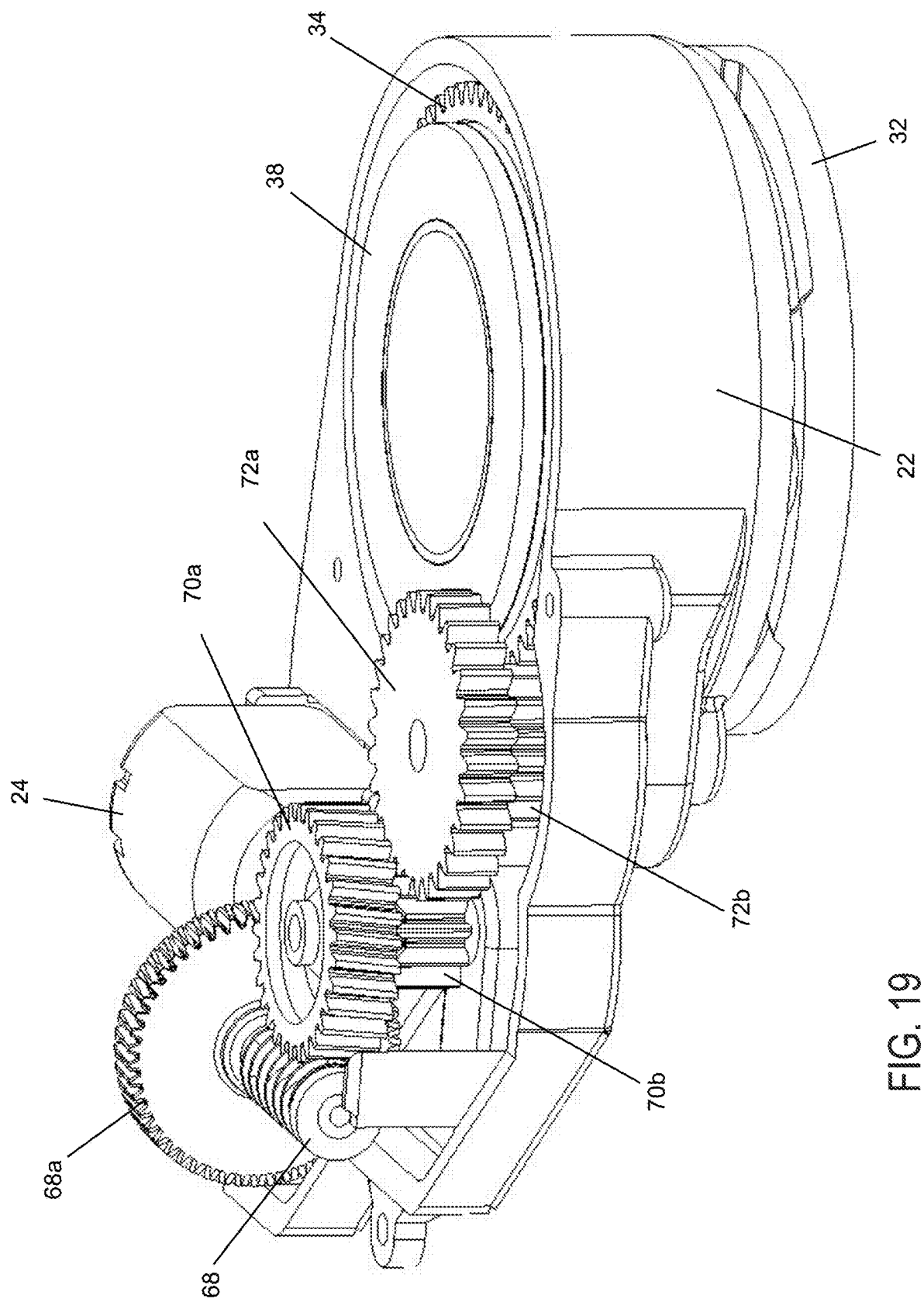
FIGS. 19 and 20 are perspective views of the actuator with the upper housing removed from the lower housing.
Figure 20:
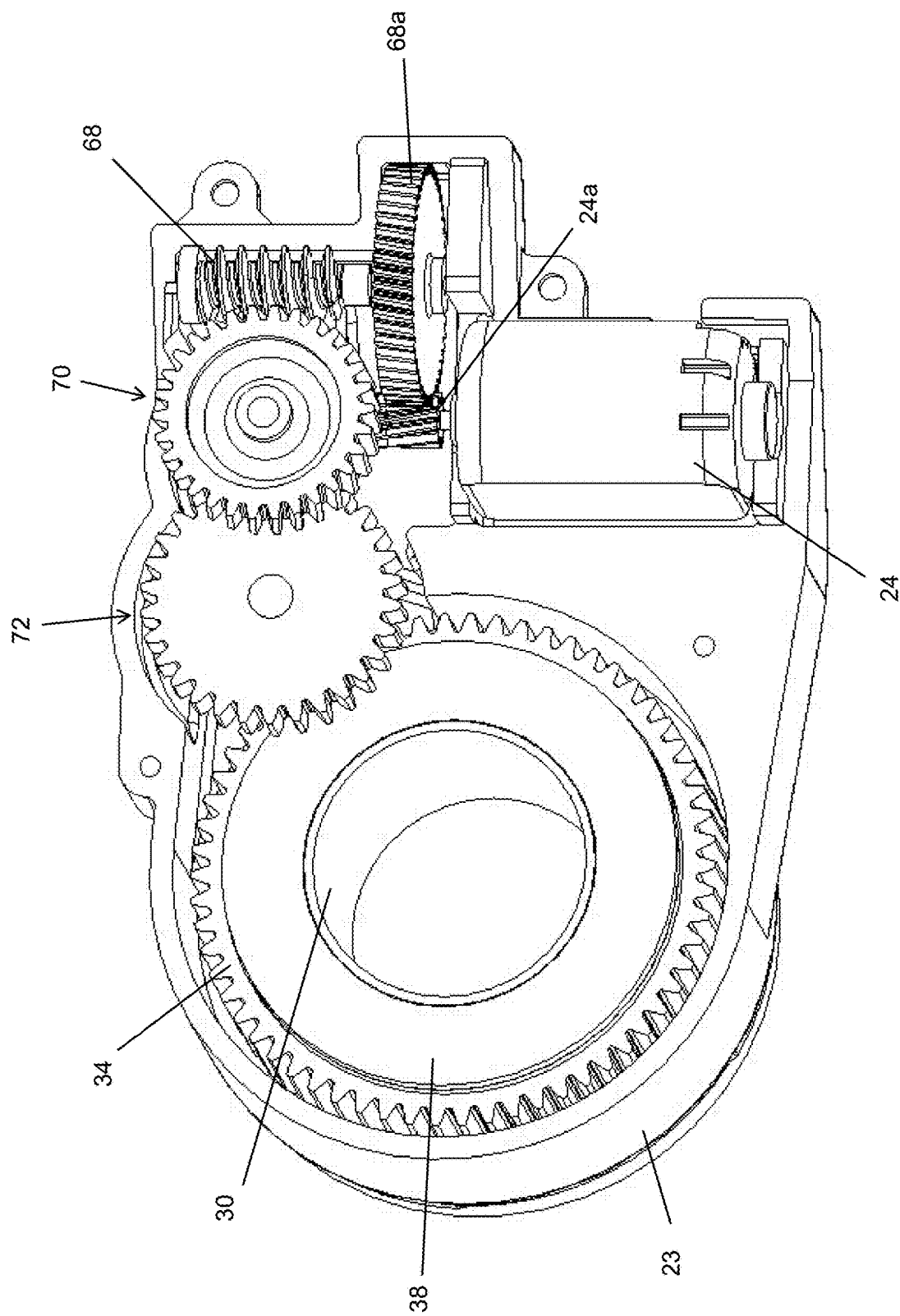
Figure 21:
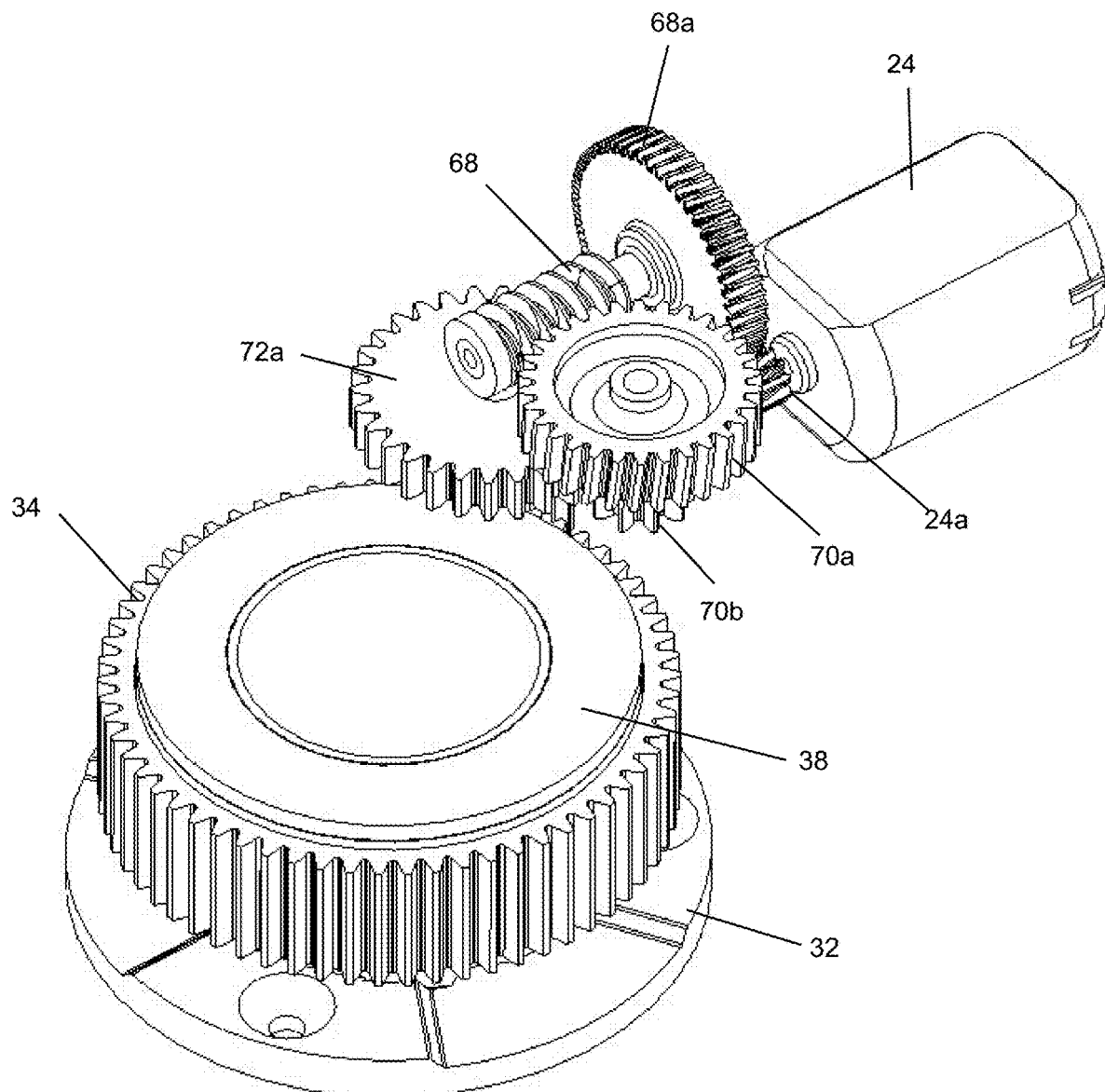
FIG. 21 is a perspective view of a gear train of the actuator.
Figure 22:
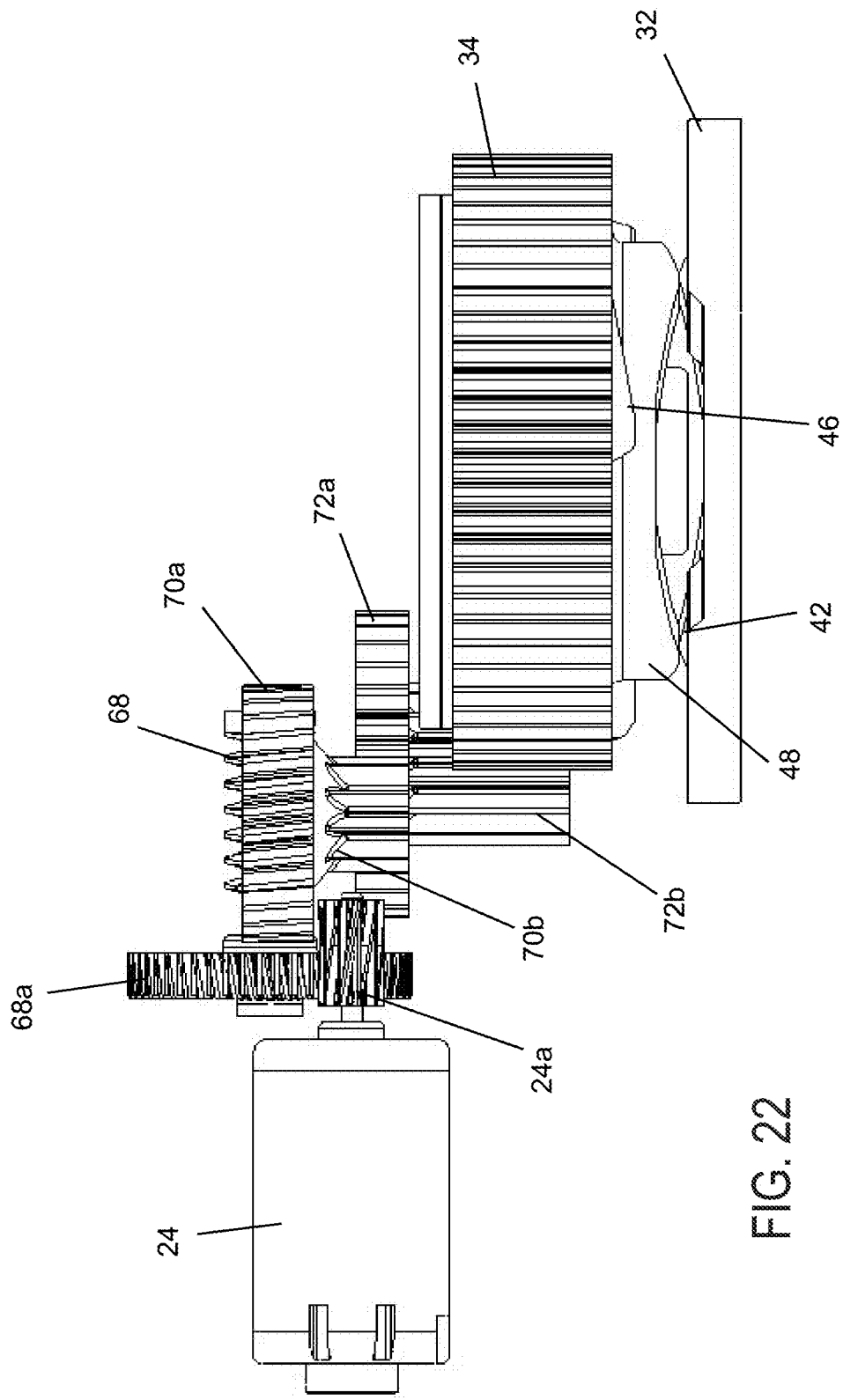
FIGS. 22 and 23 are side and top views, respectively, of the gear train of FIG. 21.
Figure 23:
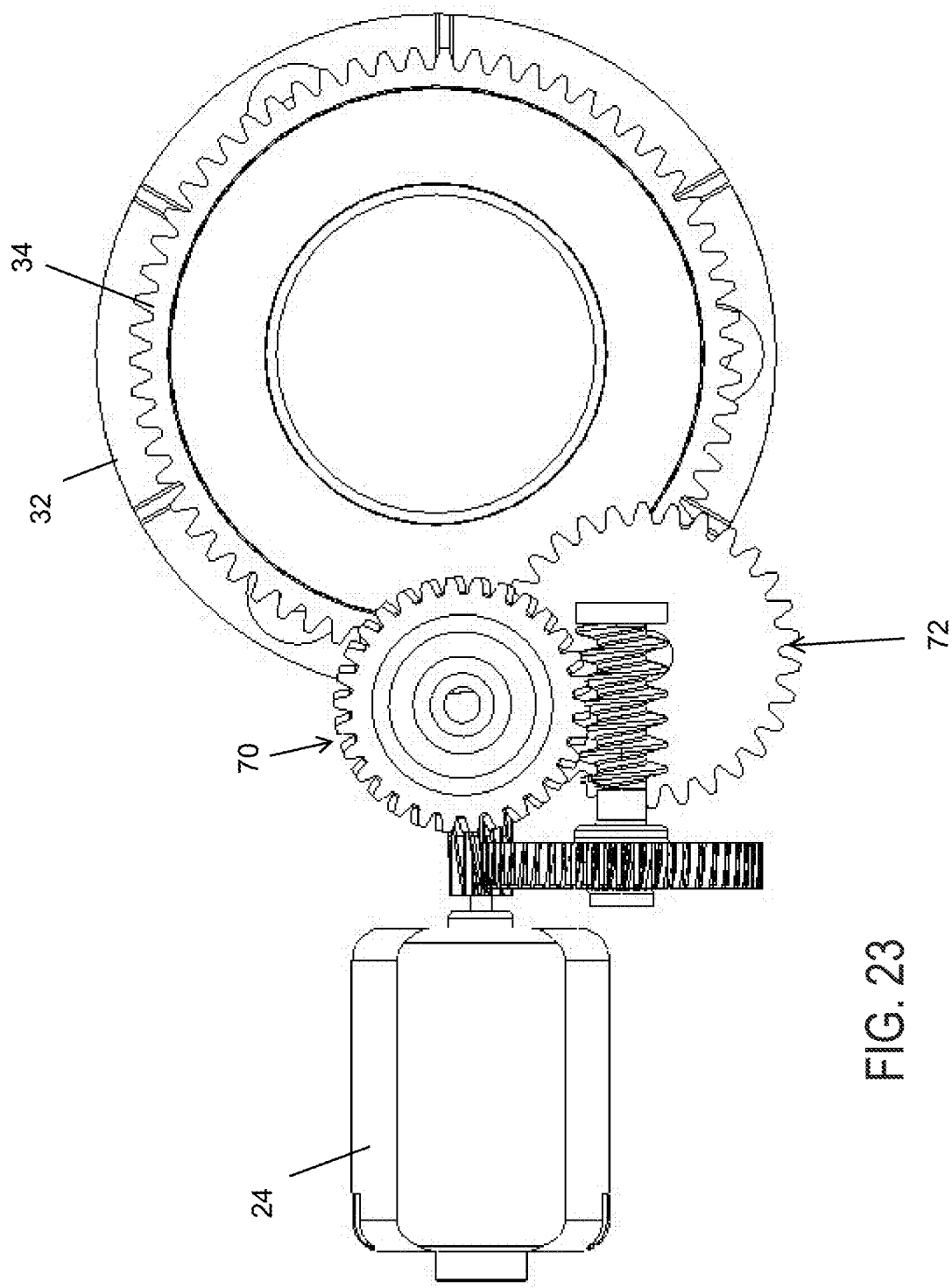
Figure 24:
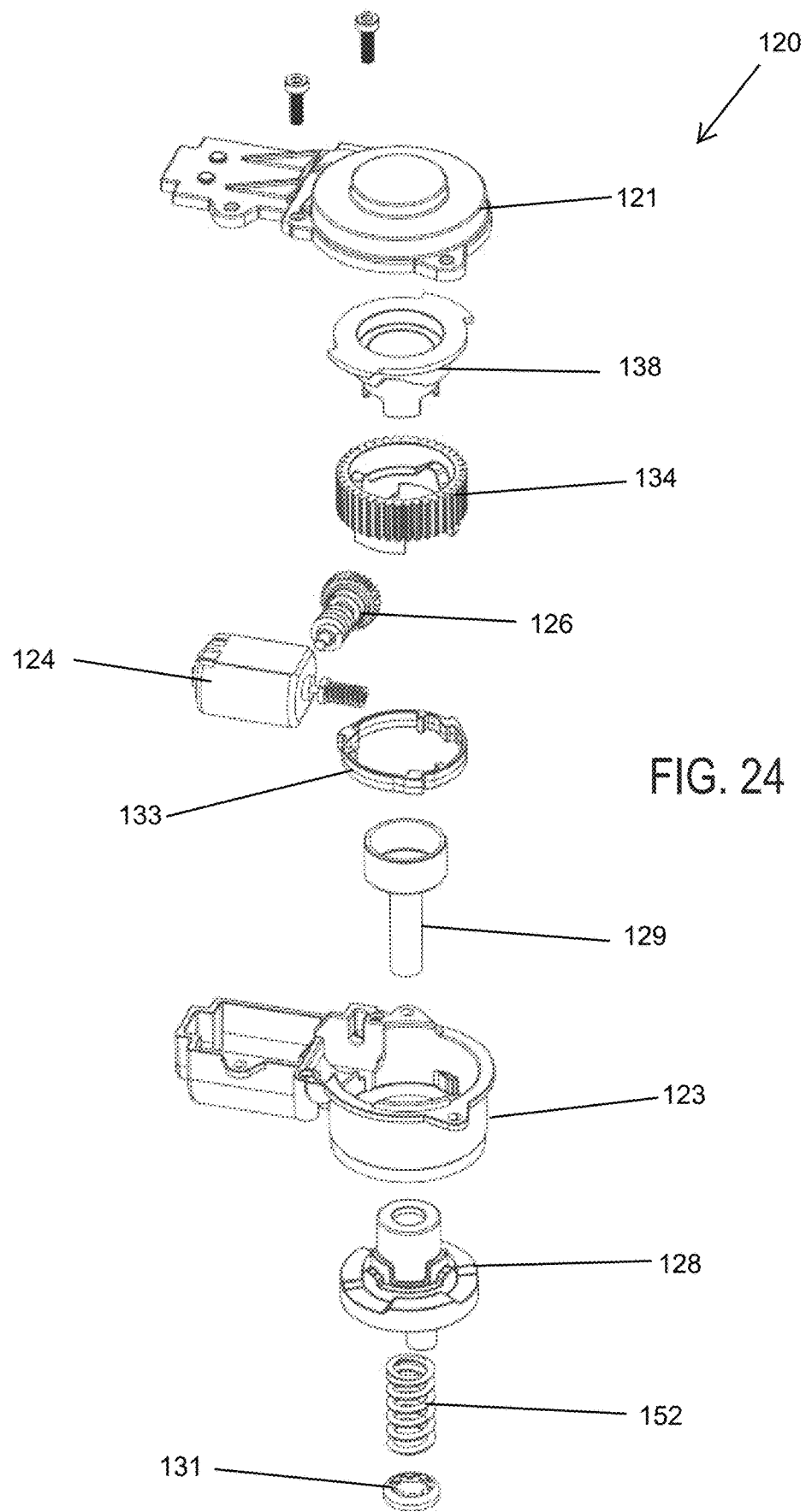

After being manually rotated from the park to drive position, however, the output gear 34 is not in the cinch position with the lower housing 23. As shown in FIG. 18, the stop 27*a* of the lower housing is not aligned with the output gear stop 48 and the output gear 34 has been moved down the lift ramp 42 so that the load path is again though the output gear 34 and lower housing 23. In this position, the upper detent interface is disengaged. When the motor 24 is next operated, the motor 24 rotates the output gear 34 (and not the housing) about the pivot post 30 because the upper detent interface is disengaged which enables movement of the output gear 34 via the motor 24. The output gear 34 climbs the lift ramp 42 to re-align the stop 48 of the output gear 34 with the stop 27*a* of the lower housing 23 and to reengage the upper detent interface so that the output gear 34 returns to a cinch position with the lower housing 23 and the lower and upper detent interfaces are engaged. Thus, the output gear 34 and middle detent 36 return to a nominal position and the actuator 20 may be operated to rotate from the drive position to the fold position.

The camera wing 13 may be rotated between the drive and park positions via the motor 24, which is operable to impart rotational forces on the output gear 34 via a gear train 26 (FIGS. 19-23). The gear train 26 is optimized for longer, narrower wing or mounting arm designs with different gear ratio combinations and alternative configurations possible. When the motor 24 is not powered, the gears 26 are effectively locked so that rotational force placed on the housing is imparted on the output gear 34 rather than winding or reversing the motor 24. In the illustrated embodiment, the motor 24 is actuated to rotatably drive a motor pinion 24a that rotatably drives a spur element 68a of a low pressure worm gear 68, which engages a first combo gear 70 which engages a second combo gear 72 which engages the output gear 34 and rotates the housing relative to the output gear until a hard stop is engaged, whereby the motor will stall or stop, with the camera wing retained at the extended or drive position via the detents. The actuator 20 is configured such that a hard stop is provided at the appropriate locations when the camera wing 13 is pivoted via driving of the motor to retain the camera wing 13 at the drive and/or park positions.

The spur element 68a of the low pressure worm gear 68 may have a gear ratio relative to the motor pinion 24a of 50 to 10 or 5 to 1. The first step 70a of the first combo gear 70 may have a gear ratio relative to the low pressure worm gear 68 of 30 to 1. The first step 72a of the second combo gear 72 may have a gear ratio relative to the second step 70b of the first combo gear 70 of 30 to 10 or 3 to 1. The output gear 34 may have a gear ratio relative to the second step 72b of the second combo gear 72 of 62 to 15 or 4.13 to 1. Thus, the gear train 26 may have a total gear ratio of 1858.5 to 1 from the motor pinion 24a to the output gear 34. The spur gear train may provide a reduced friction, rolling interface with a large contact are and reduced pressure on the gear elements. Thus, there is a reduced material hardness requirement which allows for use of all plastic gears. Other suitable hard and durable materials (such as steel or aluminum) may be used. The spur gear train allows for greater gearbox packaging flexibility and simplified gear tooling and molding. The tight packaging allows for improved constraint of gears within and by the upper and lower housings. Additionally, there is no thrust load on the output gear from the driving gear and reduced thrust on the motor shaft, improving longevity of the motor and recuing motor "click."

Thus, the actuator provides a low profile, double detent design that enables lift and turn rotation of a camera wing mounted at a vehicle. The actuator includes an integrated or internal spring, a primary or lower detent interface that maintains the camera wing at a lowered drive position and a secondary or upper detent interface that locks the output gear relative to the base portion so that the housing may travel around the output gear when the motor is activated. The output gear may travel vertically along the pivot post via engagement at the ramp interface to enable manual pivoting of the camera wing. The internal spring biases the upper detent interface into engagement and the output gear downward toward the base portion to enable easier disengagement of the upper detent interface when manually pivoting the camera wing. The internal spring may be accommodated entirely within a cavity of the output gear and at least a portion of the middle detent element (forming a portion of the upper detent interface) may also be accommodated within the cavity of the output gear.

When the motor is operated to rotate the camera wing, the upper detent interface is engaged to fix the output gear relative to the base post structure and the motor and housing travels around the fixed output gear. As the housing travels around the fixed output gear, the lower detent interface disengages, causing the housing (and therefore camera wing) to lift relative to the base post structure. When the camera wing is manually pivoted, the output gear rotates with the housing relative to the base post structure. The ramp structure of the output gear interfaces with the lift ramp of the base structure and the output gear is guided vertically along the pivot post via the lift ramps when the output gear rotates about the pivot post, thus disengaging the upper detent interface. The cavity of the output gear accommodates at least a portion of the middle detent element (which provides a surface of the upper detent interface) and may accommodate the entirety of the spring. The internal spring biases the upper detent interface into engagement and biases the output gear down the ramp structure to assist in downward travel of the output gear during manual rotation.

When the motor is activated to rotate the camera wing about the pivot post, the motor travels until it is stalled, such as via engagement of structure of the lower housing engaging the portion of the output gear to provide the hard stop when the actuator is at the drive or folded positions. After being stalled and upon the next activation of the motor, the motor rotates in the opposite direction to return the camera wing to its previous position. If the camera wing is manually pivoted between activations of the motor, the next activation of the motor rotates the output gear back to a nominal position and the next activation of the motor after that will rotate the actuator to its next position. The actuator uses a gear train to connect the motor and output gear to increase durability of the individual gear elements and reduce strain on the motor. When the motor is not powered to rotate the camera wing, the gear train is locked so that a rotational force manually rotating the camera wing may be directed from the housing to the output gear.

Figure 32:
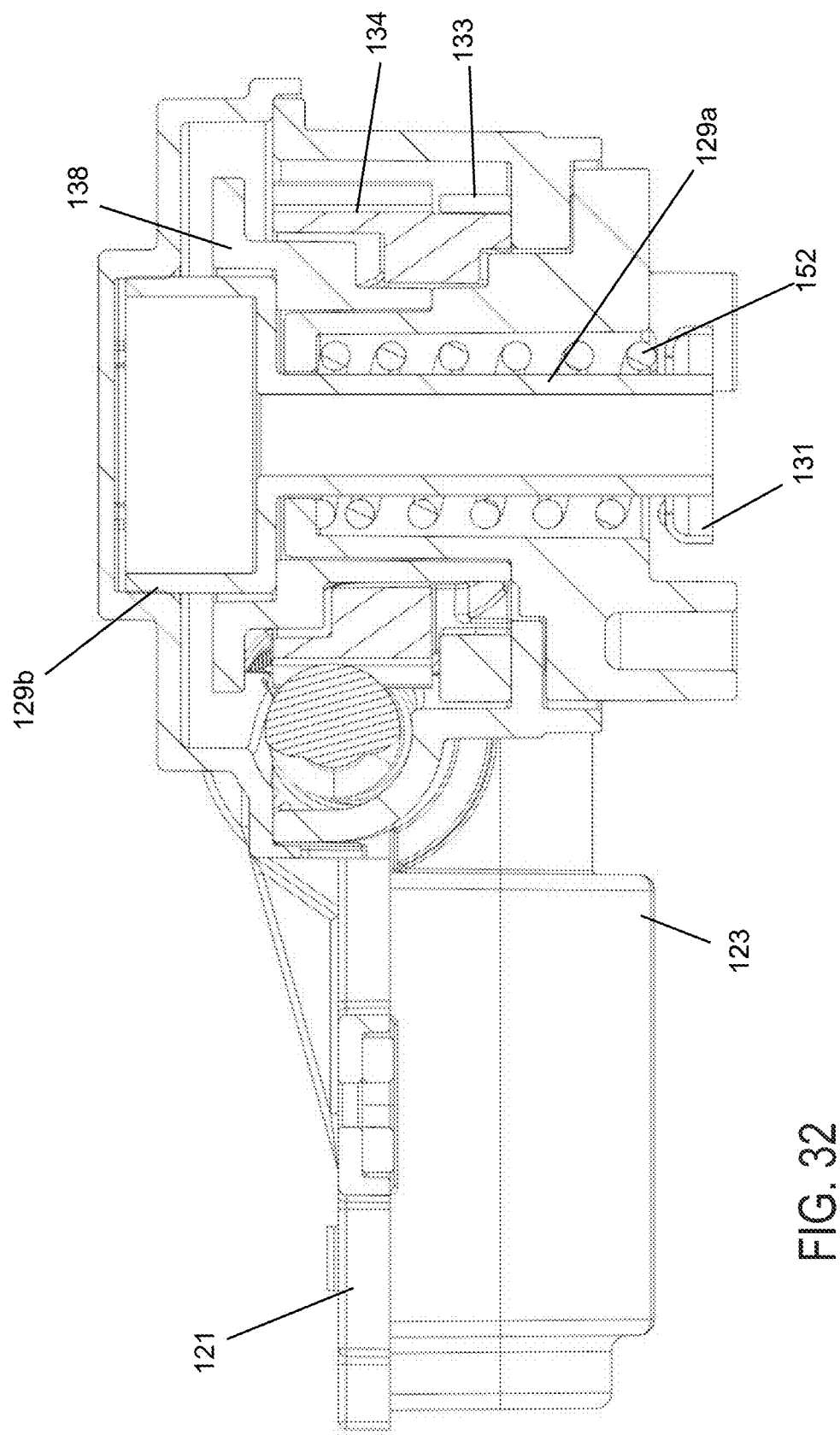
Figure 33:
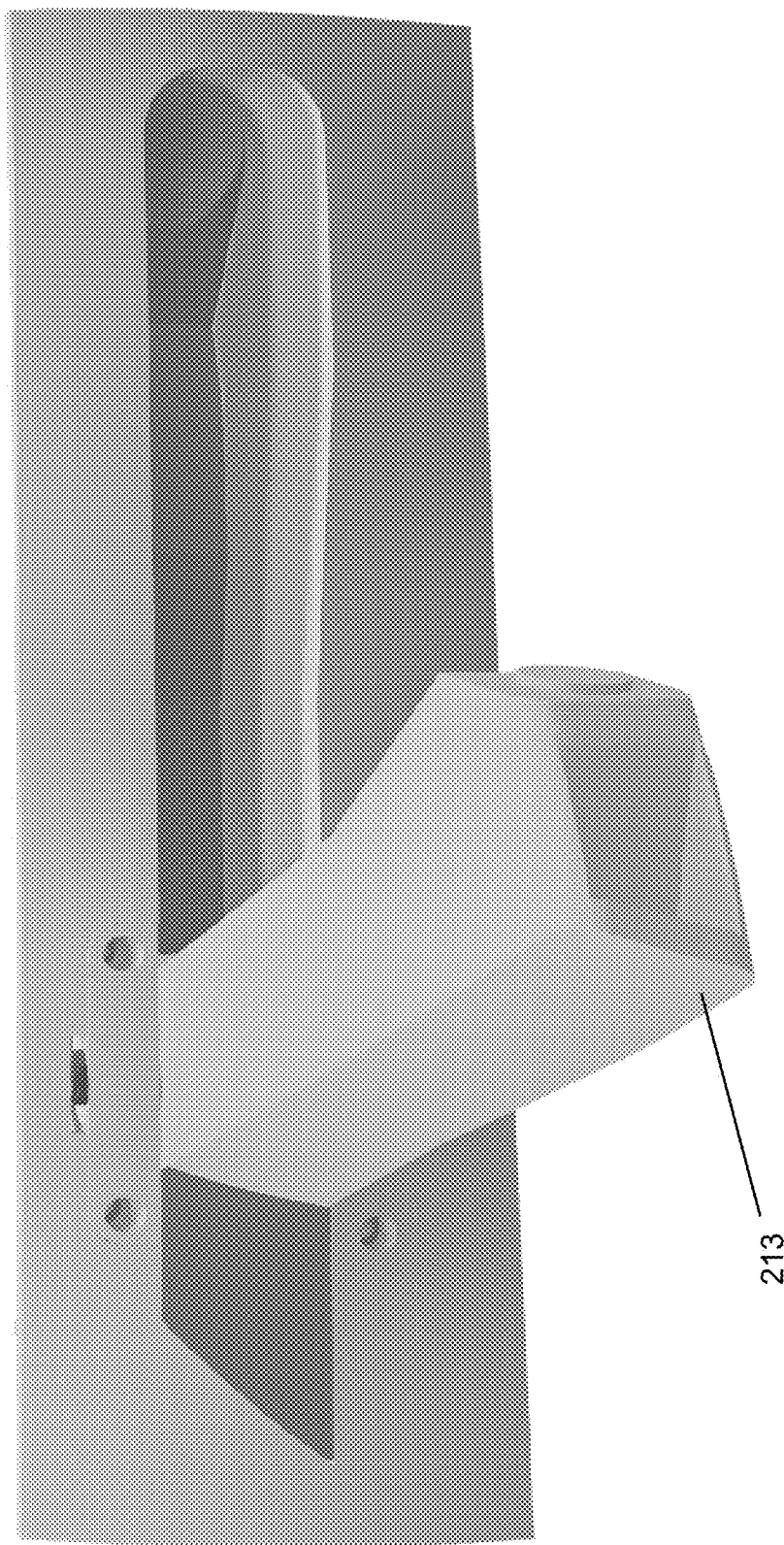
FIG. 33 is a perspective view of a camera wing in an extended position at the side of a vehicle.
Figure 34:
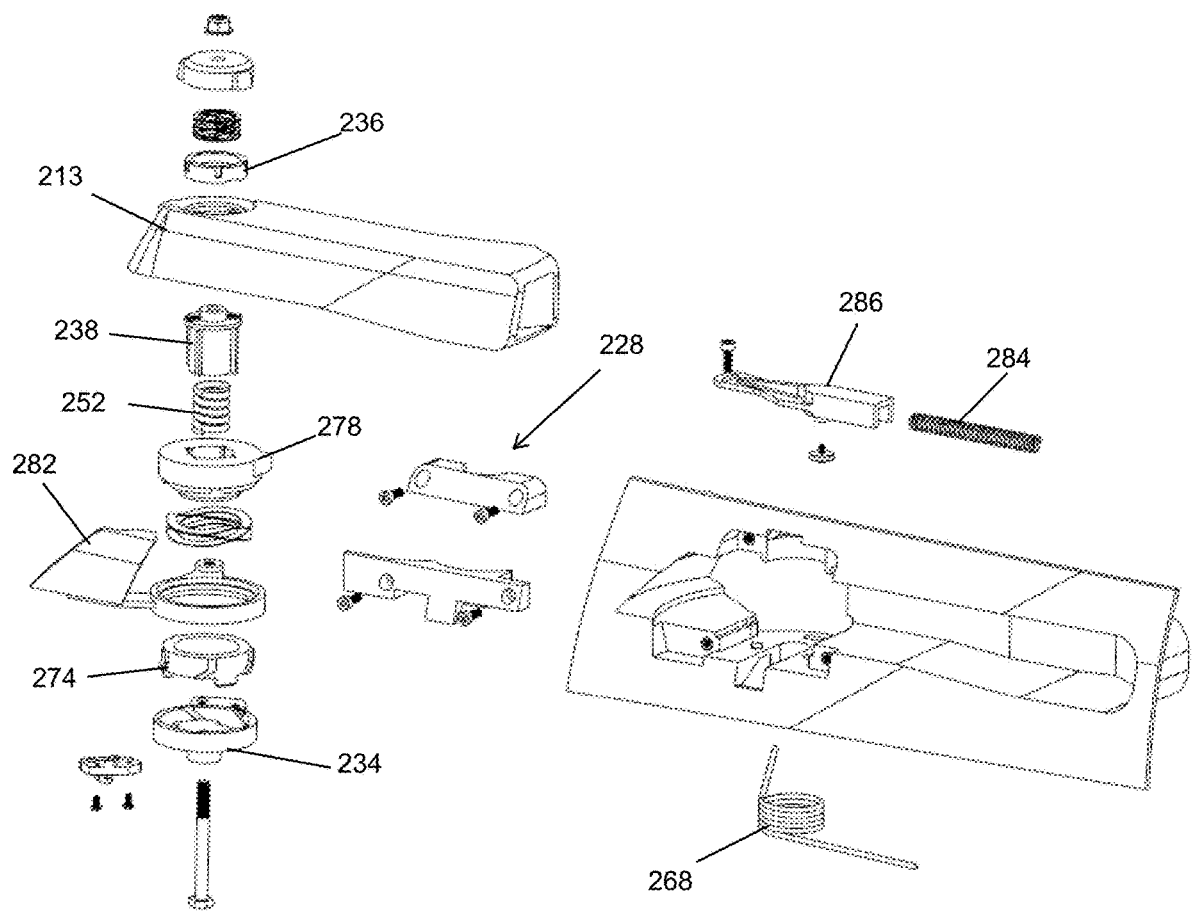
FIG. 34 is an exploded view of a camera wing with a detent assembly and a forward fold flap assembly.

Referring now to FIGS. 24-32, another actuator 120 with a detent assembly and an internal or integrated spring may include a resilient element and an internal coil spring 152. Similar to the actuator 20 described above, the actuator 120 may be equipped at the vehicle for pivoting the low profile camera wing 13, low profile exterior mirror, or the like. The actuator 120 provides a lightweight plastic actuator design. As shown in FIG. 32, the base post structure 128 is received in the lower housing 123 and includes a pivot post 130 and a base portion 132 that provides a lower outer surface of the lower housing. The base portion 132 includes a three fastener mounting method for improved stability when mounting at a vehicle. The base post structure 128 receives a pivot tube 129 and the coil spring 152 is disposed entirely within the pivot post 130 and receives a post portion 129a of the pivot tube 129 therein. A PALNUT™ or retaining element 131 is disposed at the bottom of the post portion of the pivot tube to compress and retain the coil spring entirely within the cavity of the pivot post 130.

The pivot post 130 is received in the output gear 134 (with the cam surfaces recessed into the gear) and the upper detent 138 with the coil spring 152 disposed at an interior portion of the pivot post 130. Thus, the internal coil spring 152 is disposed within the pivot post 130 and at least a portion of the output gear 134 and at least a portion of the upper detent 138 circumscribe the spring. The internal coil spring 152 enables a compact actuator design where the spring is retained within a component of the actuator 120. A resilient element 133 is disposed around a lower portion of the output gear 134 to provide a hard stop when the camera wing is rotated between the drive and fold positions. The biasing force of the coil spring presses against the internal surface of the pivot post 130 and the retaining element 131 to pull a base portion 129b of the pivot tube 129 downward toward the top of the pivot post 130, thus biasing the output gear 134 and upper detent 138 into engagement at an upper detent interface.

That is, the pivot tube 129 includes a post portion 129a that extends through a cavity of the pivot post 130 and includes the base portion 129b exterior and above the pivot post 130. The spring 152 is disposed within the cavity of the pivot post 130 and is disposed between an inner upper surface of the pivot post 130 and the retaining element 131 at the distal end of the post portion 129a. The spring 152 pushes the retaining element 131 away from the fixed surface of the pivot post 130 and thus biases the pivot tube 129 down along the longitudinal axis of the pivot post 130. This in turn biases the output gear 134 and upper detent 138 downward along the pivot post 130.

Figure 26:
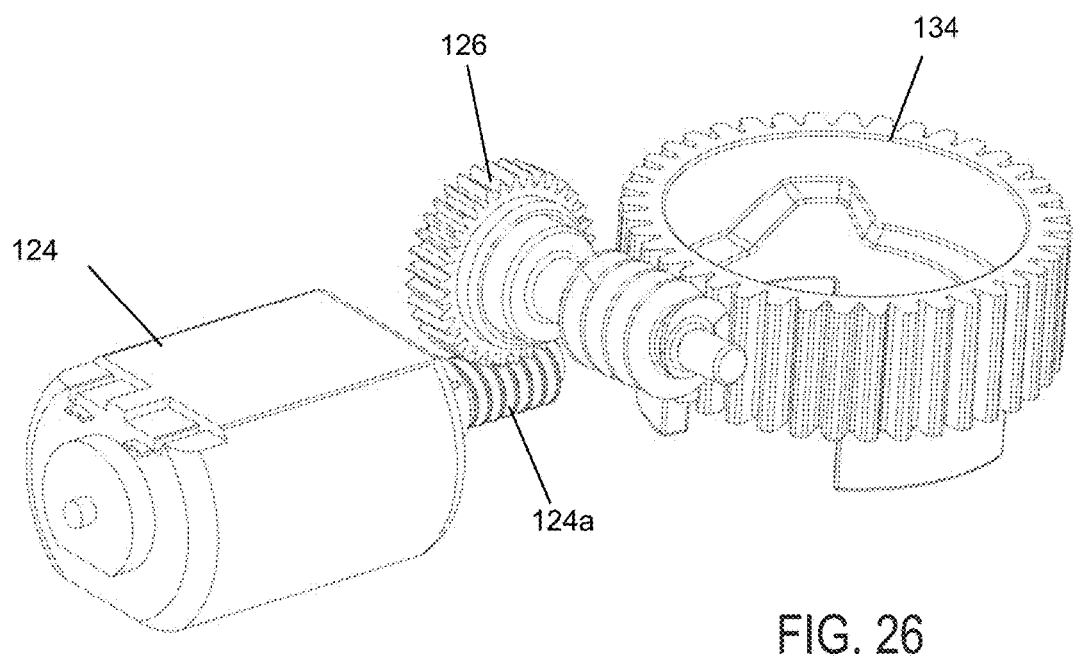
FIG. 26 is a perspective view of the gear train of the actuator of FIGS. 24 and 25.
Figure 27:
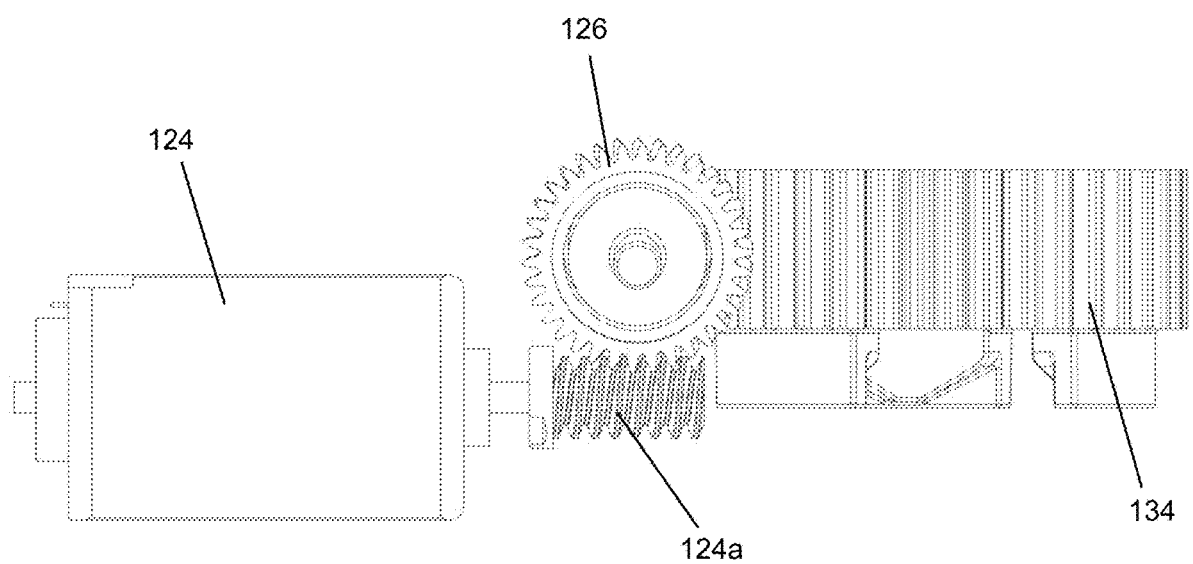
FIGS. 27 and 28 are side and top views, respectively, of the gear train of FIG. 26.
Figure 28:
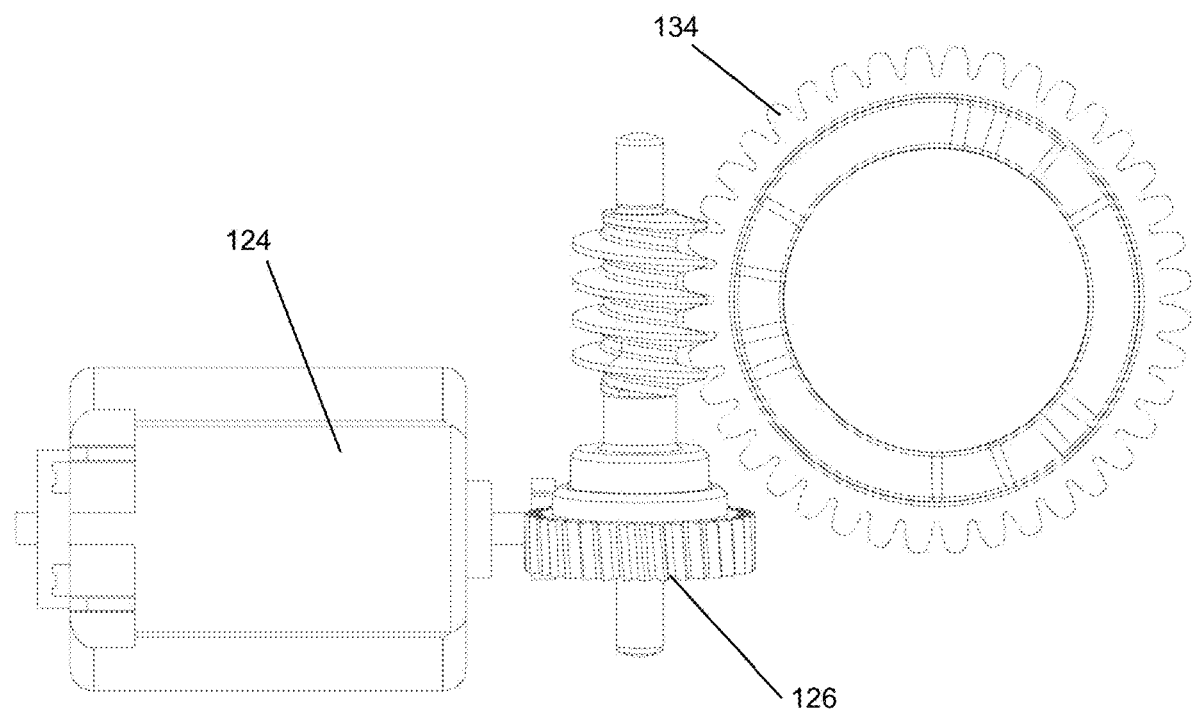
Figure 29:
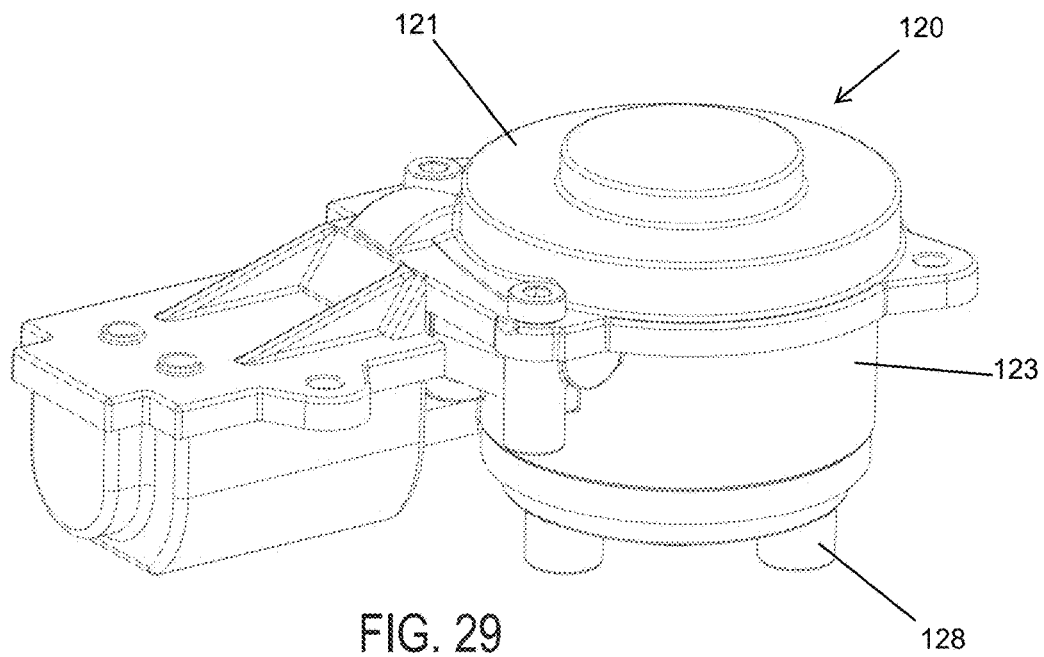
FIG. 29 is a perspective view of the actuator of FIGS. 24 and 25.
Figure 30:
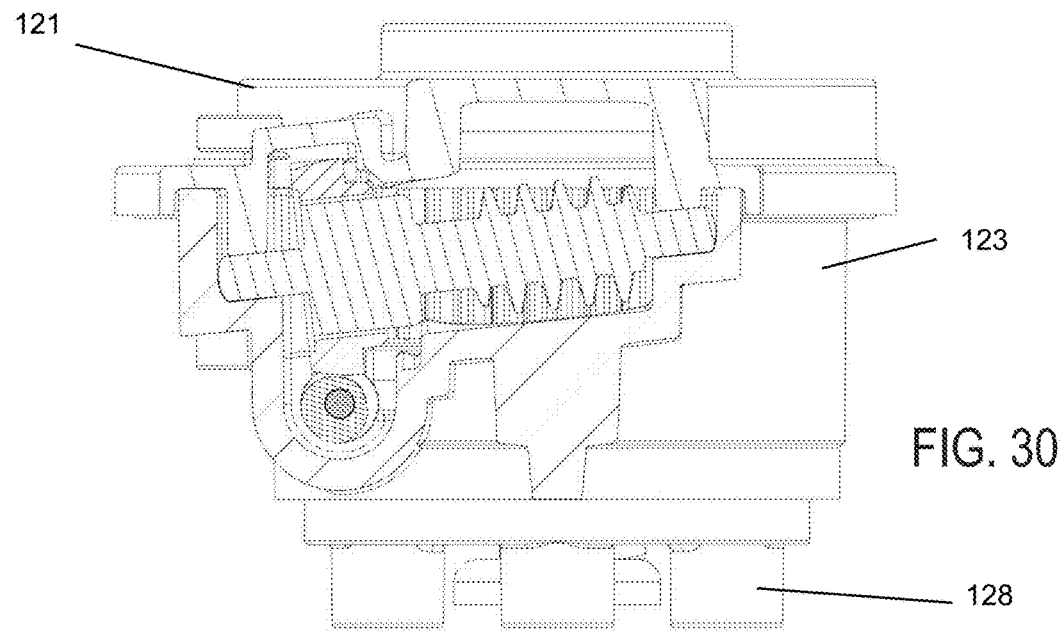
FIGS. 30-32 are sectional views of the actuator of FIGS. 24 and 25.
Figure 31:
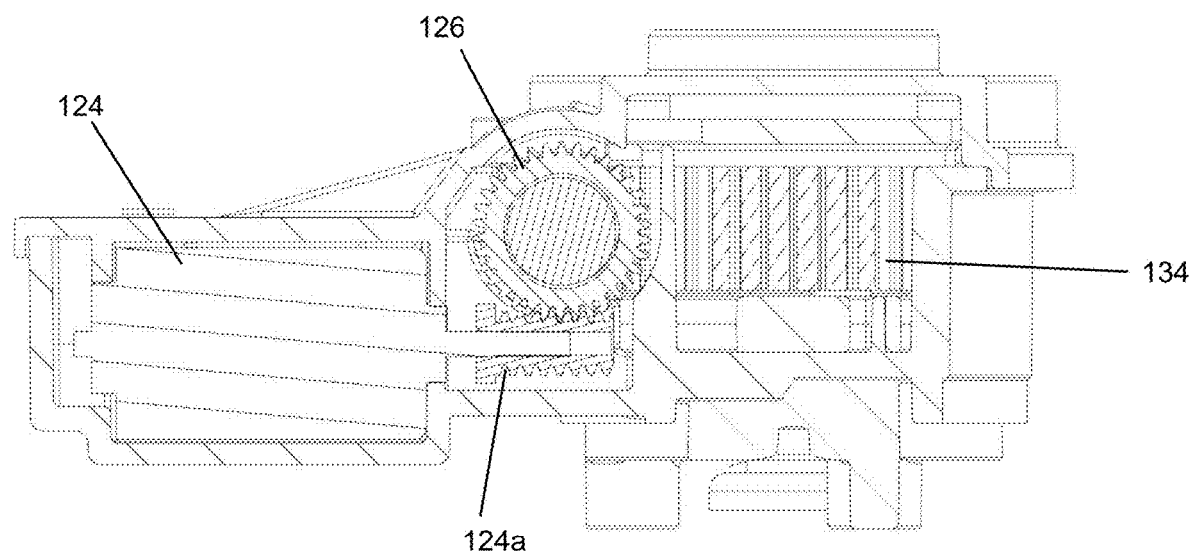

As shown in FIGS. 26-28, the output gear is engaged by a motor 124 via a main gear 126. The spur gear portion of the main gear 126 may have a gear ratio relative to the motor worm or pinion 126a of 34 to 1. The output gear 134 may have a gear ratio relative to the main gear of 40 to 1. Thus the output gear 134 may have a total gear ratio relative to the motor pinion 124a of 1360 to 1. The lower housing 123 attaches to the upper housing 121 (FIG. 29-32) and is fixed to the camera wing such that lift and rotation of the housing corresponds to lift and rotation of the camera wing.

Thus, the actuator provides a reduced profile actuator suitable for a camera wing application, with the spring and pivot tube being internal of and below the output gear. The spring biases or urges the pivot tube and the upper detent and the output gear downward toward the base portion. By providing the tube and spring within and below the output gear, the actuator provides a low profile actuator that is suitable for low profile camera wing applications and also suitable for pivoting an exterior mirror head relative to mounting structure.

Referring now to FIGS. 33-52, another actuator 220 suitable for a pivotable camera wing application and having a detent assembly with an internal or integrated spring may include a cable pull actuator 224, a locking lug component 274, a secondary detent 236 at the top of the camera wing, and a forward fold flap assembly 280. Instead of being driven directly by a cam or motor via a gear train, the actuator or detent assembly 220 is activated from a remote actuator, such as via a push/pull Bowden cable 226 attached to the cable pull actuator 224. The cable pull actuator 224 rotates the camera wing 213 by pulling on a cable pull arm 234 connected to the detent assembly. The locking lug component 274 selectively fixes or retains the cable pull arm 234 relative to a fixed bracket 228 at the vehicle to connect rotation of the camera wing with movement of the cable pull actuator 224 during electrical pivoting of the camera wing 213 and disconnect rotation of the camera wing from affecting movement of the cable pull actuator during manual rotation of the camera wing. The secondary detent 236 engages the camera wing 213 when the camera wing is manually pivoted to the extended position to retain the camera wing at the extended position. The forward fold flap assembly 280 allows the camera wing 213 to rotate beyond the extended position and provides a biasing force to return the camera wing to the extended position after being rotated beyond the extended position.

Figure 35A:
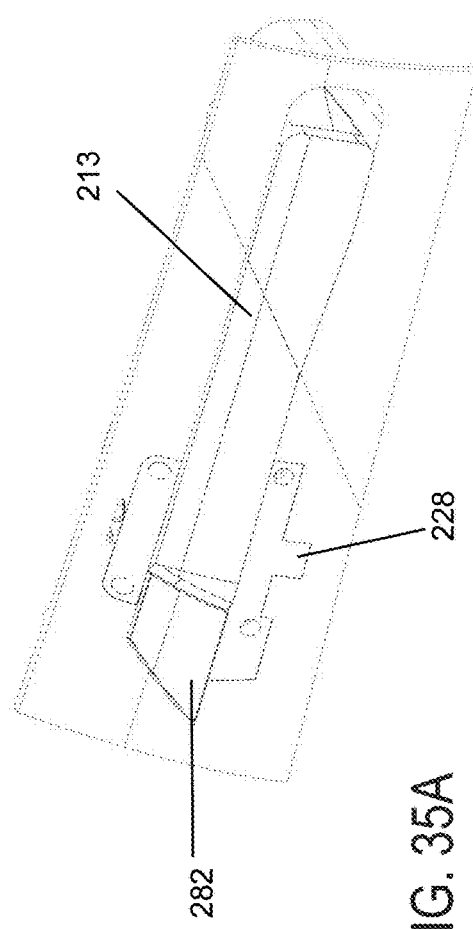
FIGS. 35A-C are perspective views of the camera wing of FIG. 34 in a flush position, an extended position, and a forward fold position, respectively.
Figure 35C:
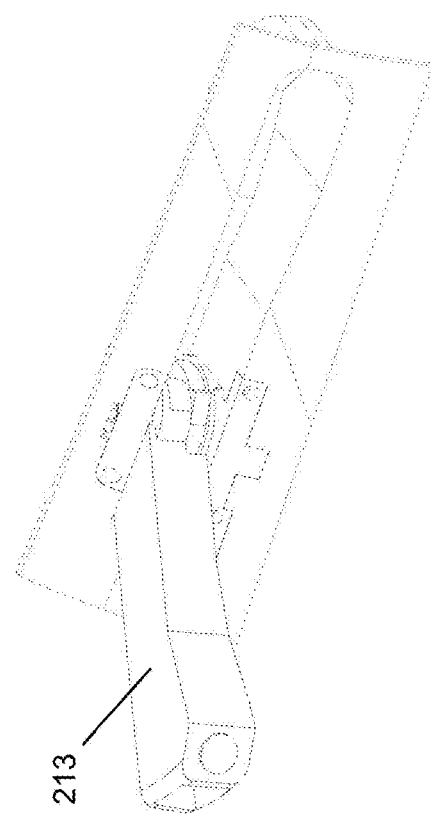
Figure 35B:
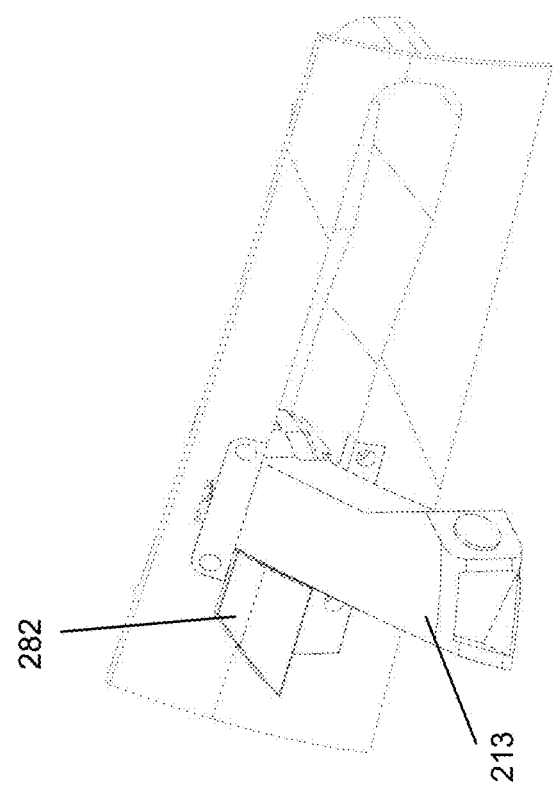

As shown in FIGS. 35A-C, the camera wing 213 is movable via the actuator 220 between at least a flush or park position (FIG. 35A), an extended or drive position (FIG. 35B) and a forward fold position (FIG. 35C). When in the extended or drive position 213b, the camera wing 213 is extended outward from the body of the vehicle at the side of the vehicle so that the camera has a field of view sideward and rearward of the vehicle at the respective side of the vehicle. When in the flush or park position 213a, the camera wing 213 is pivoted in toward the side of the vehicle so that the camera wing 213 is received in a recess at the side of the vehicle and an exterior surface of the camera wing 213 is generally flush or coplanar with an outer surface of the vehicle. When the camera wing 213 is in the respective park or drive positions, the actuator 220 is configured to lock or hold the camera wing 213 in place. As shown in FIG. 35C, the camera wing 213 is manually pivotable to the forward fold position 213c, where the camera wing 213 is rotated beyond the extended position, such as by an impact with an object, and is spring loaded to return to the extended position after being manually rotated beyond the extended position. The forward fold flap assembly 280 enables the camera wing 213 to rotate beyond the extended position and return to the extended position.

Figure 36:
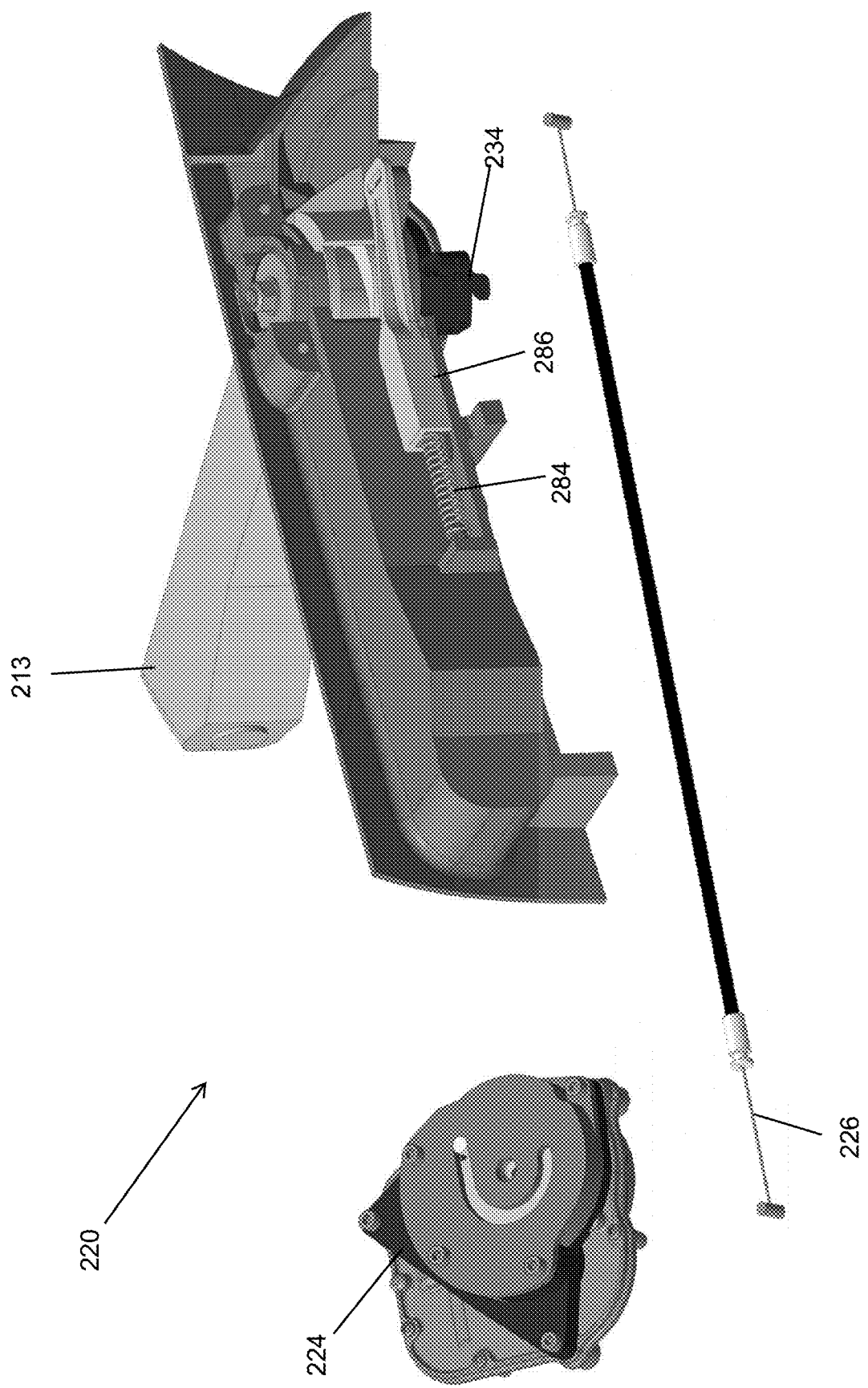
FIG. 36 is a perspective view of the camera wing of FIG. 34 with a cable pull actuator operable to pivot the camera wing via a cable.
Figure 38:
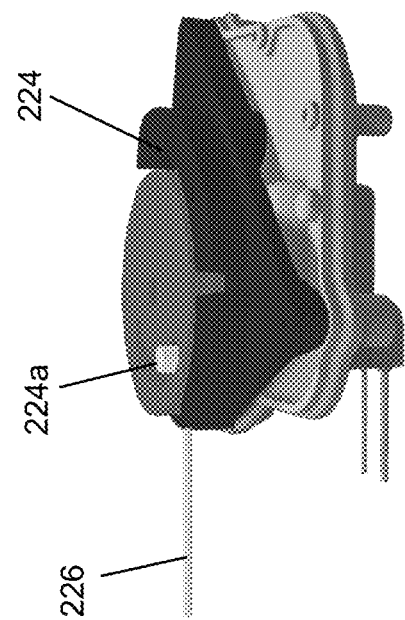
FIGS. 38-40 are perspective views of the cable pull actuator of FIG. 36.
Figure 37:
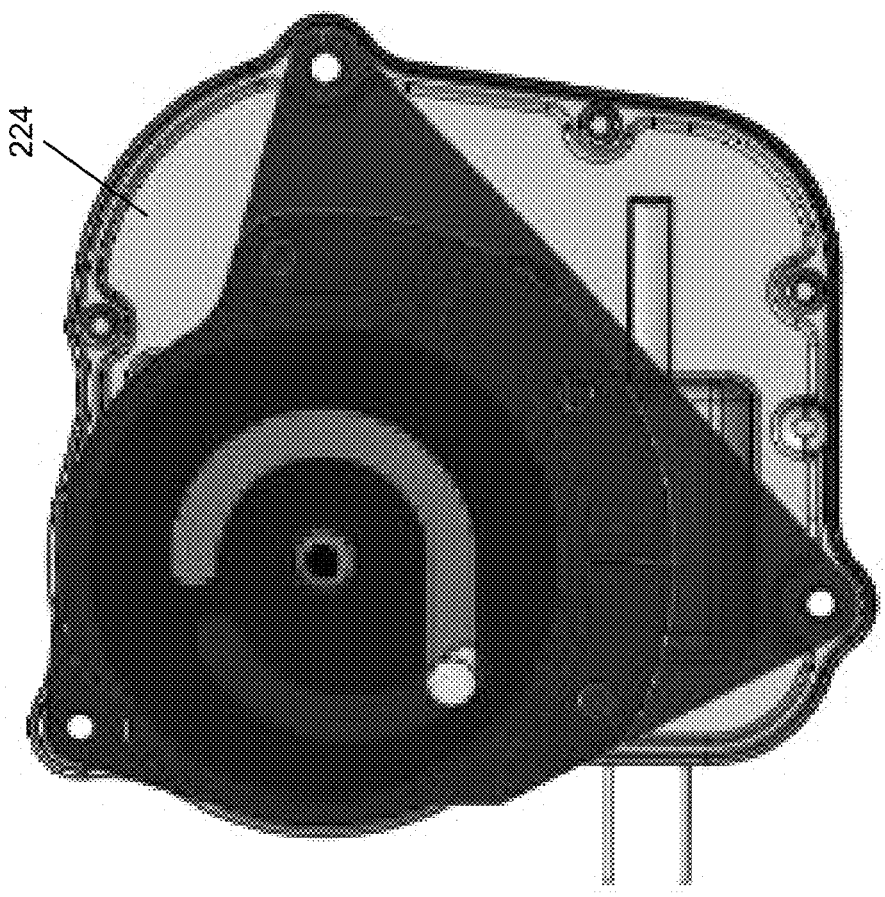
FIG. 37 is a side view of the cable pull actuator of FIG. 36.
Figure 40:
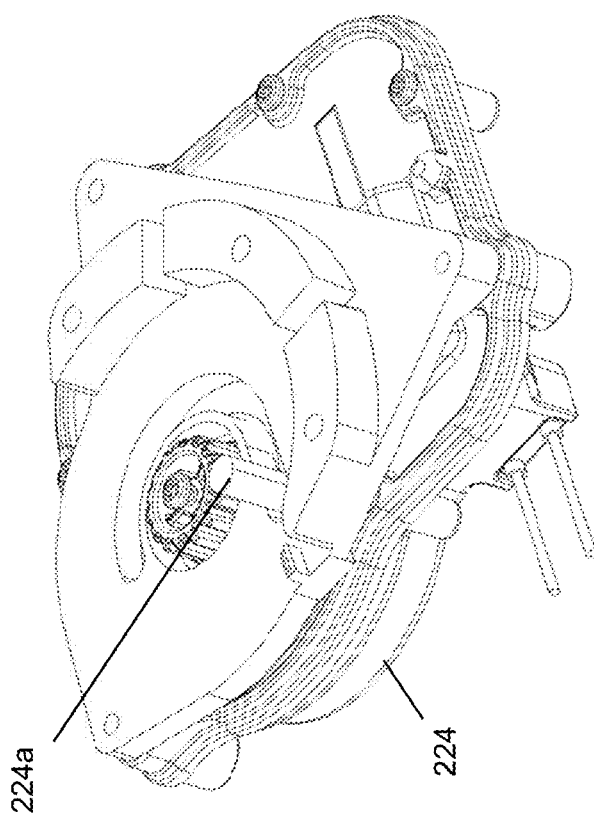
Figure 39:
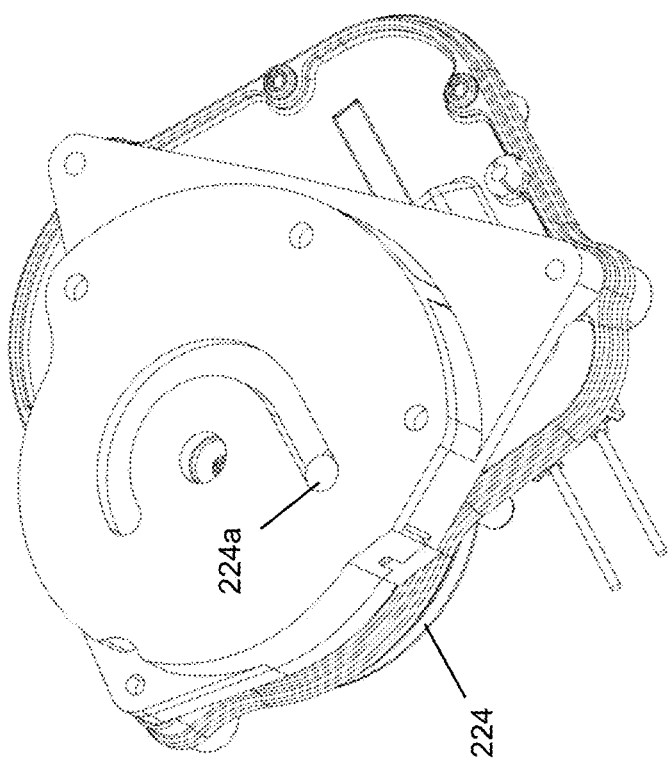

The camera wing 213 is movable between the flush position 213a and the extended position 213b via the cable pull actuator 224. As shown in FIG. 36, the cable pull actuator 224 is disposed remote from camera wing and detent assembly and provides rotational force at the detent assembly via a cable 226 attached at a cable pull arm element 234. As will be discussed below, the cable pull actuator 224 may only be electrically operated to pivot the camera wing 213 from the flush to the extended position. The camera wing 213 may be returned to the flush position from the extended position via a return torsion spring 268. For example, the cable 226 attached to the cable pull actuator 224 may comprise a metal cable (e.g., steel or other suitable flexible material with sufficient tensile strength) that is only capable of pulling, not pushing, as pushing the cable may result in bending, damaging or causing the cable to pull away from the cable pull arm element 234 at the actuator.

When operated to rotate the camera wing 213 from the flush position to the extended position, the cable pull actuator 224 has a high initial pull force, such as to break through ice that has accumulated at the outer surface of the camera wing 213. The cable pull actuator 224 has a variable torque ratio over the course of its travel with a high ratio at the start for a high pull force and lower ratio near the end of its rotation to increase the pull distance of the cable 226. The pull starts in a spiral region similar to a screw and transitions to a fully rotational movement.

As shown in FIGS. 37-40, the cable pull actuator 224 includes a cam or motor operable to rotate a pin 224a connected to the end of the cable 226. The pin 224a is connected to an end of the cable 226 so that as the pin 224a rotates at the cable pull actuator 224, the cable 226 wraps or unwraps around a pulley portion. The rotation of the pin 224a is guided by an arcuate slot of the cable pull actuator 224 and thus the torque provided by the actuator is variable based on the guidance of the slot at a given point in the rotation.

Figure 41A:
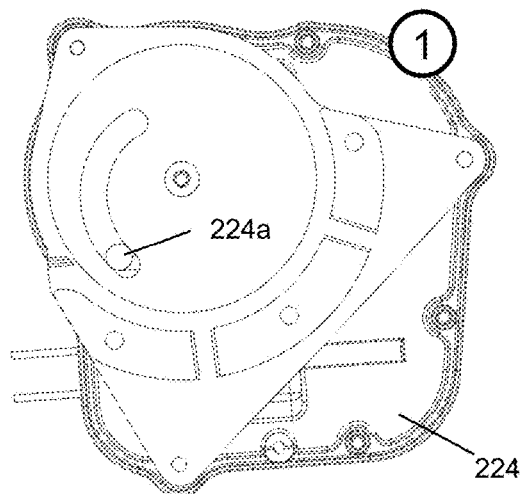
FIGS. 41A-D are side views of the cable pull actuator during different stages of its rotation.
Figure 41B:
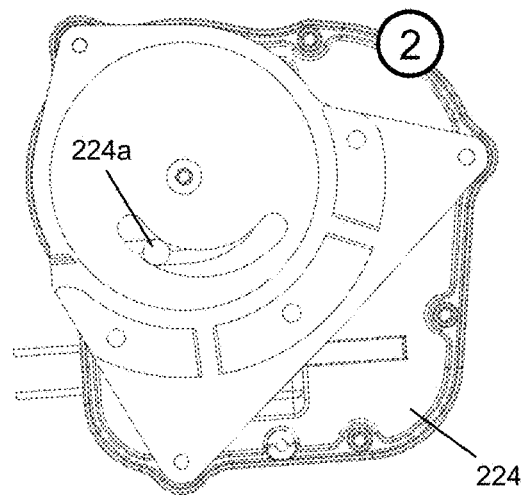
Figure 41C:
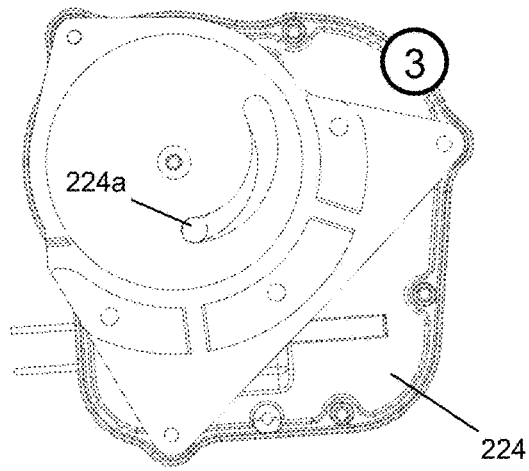
Figure 41D:
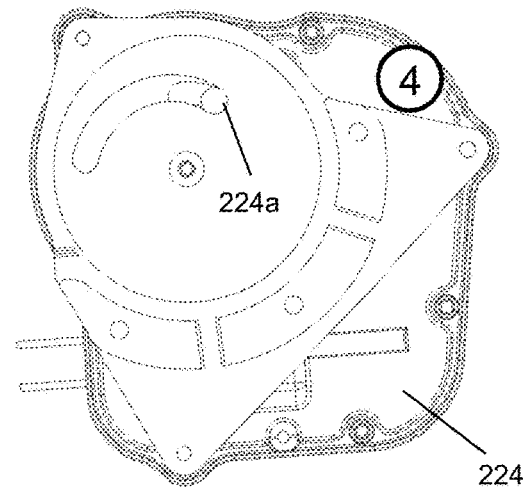

Positions 1-4 of FIGS. 41A-D depict the actuator 224 in various stages of its rotation when operated to pivot the camera wing 213 from the flush position to the extended position. When the actuator 224 is activated, the cam pulley rotates counterclockwise. At position 1 (FIG. 41A), the pin 224a starts in the spiral region of the cam and slides along the slot in the housing of the cable pull actuator 224 to arrive at position 2 (FIG. 41B). Roughly half of the total cam rotation happens in this region, yet the pin 224a moves a very small distance (high ratio, high force, low distance travelled) corresponding with a high initial opening force of the camera wing 213. Once the pin 224a hits the end of the spiral region of the cam at position 3 (FIG. 41C), the cable 226 starts to wind around the pulley portion of the cam. Roughly 80 percent of the total cable pull distance occurs here, where the cam only uses 50 percent of its rotation (low ratio, low force, high distance travelled). At position 4 (FIG. 41D), the camera wing 213 is at the extended position and the pin 224a has completed its travel about the pulley portion of the cam.

Tension in the cable 226 created when the actuator 224 pulls the camera wing 213 to the extended position helps to hold (along with the detent assembly) the camera wing 213 in the extended position. When the camera wing 213 is electrically rotated back to the folded position (i.e., when the actuator rotates in the opposite direction to allow slack in the cable), the actuator 224 begins releasing tension in the cable 226 (i.e., rotates the opposite direction as when extending the wing) and the torsion return spring 268 helps to unwrap the cable 226 from the pulley so that the camera wing 213 may pivot to the folded position. The torsion return spring 268 is used to return the wing to the flush position when the cable pull actuator 224 releases tension on the cable 226. In other words, the torsion return spring 268 works to rotate the camera wing 213 in a direction opposing the cable pull actuator (i.e., the torsion return spring pushes at the pivot of the camera wing and the cable pull actuator pulls at the pivot of the camera wing via the cable). The torsion return spring 268 may directly engage the cable pull arm 234.

When the camera wing 213 is manually rotated between the flush and extended position, the cable pull actuator 224 does not rotate and thus the cable pull arm 234 at the detent assembly remains stationary during manual rotation of the camera wing 213. If the camera wing 213 is manually rotated to a position without being manually rotated back to its original position, the next activation of the cable pull actuator 224 will resync the cable pull arm 234 according to the position of the camera wing 213 and the following operation of the cable pull actuator 224 will pivot the camera wing 213. For example, if the camera wing 213 is manually rotated from the flush to the extended position, the cable pull arm 234 (and cable pull actuator 224) will remain stationary. Upon the next activation of the cable pull actuator 224, the cable 226 will pull the cable pull arm 234 into alignment with the detent assembly and the cable pull arm 234 will resync with the camera wing 234 in the extended position and the following activation will release tension in the cable 226 to electrically rotate the camera wing 213 back to the flush position.

Figure 47:
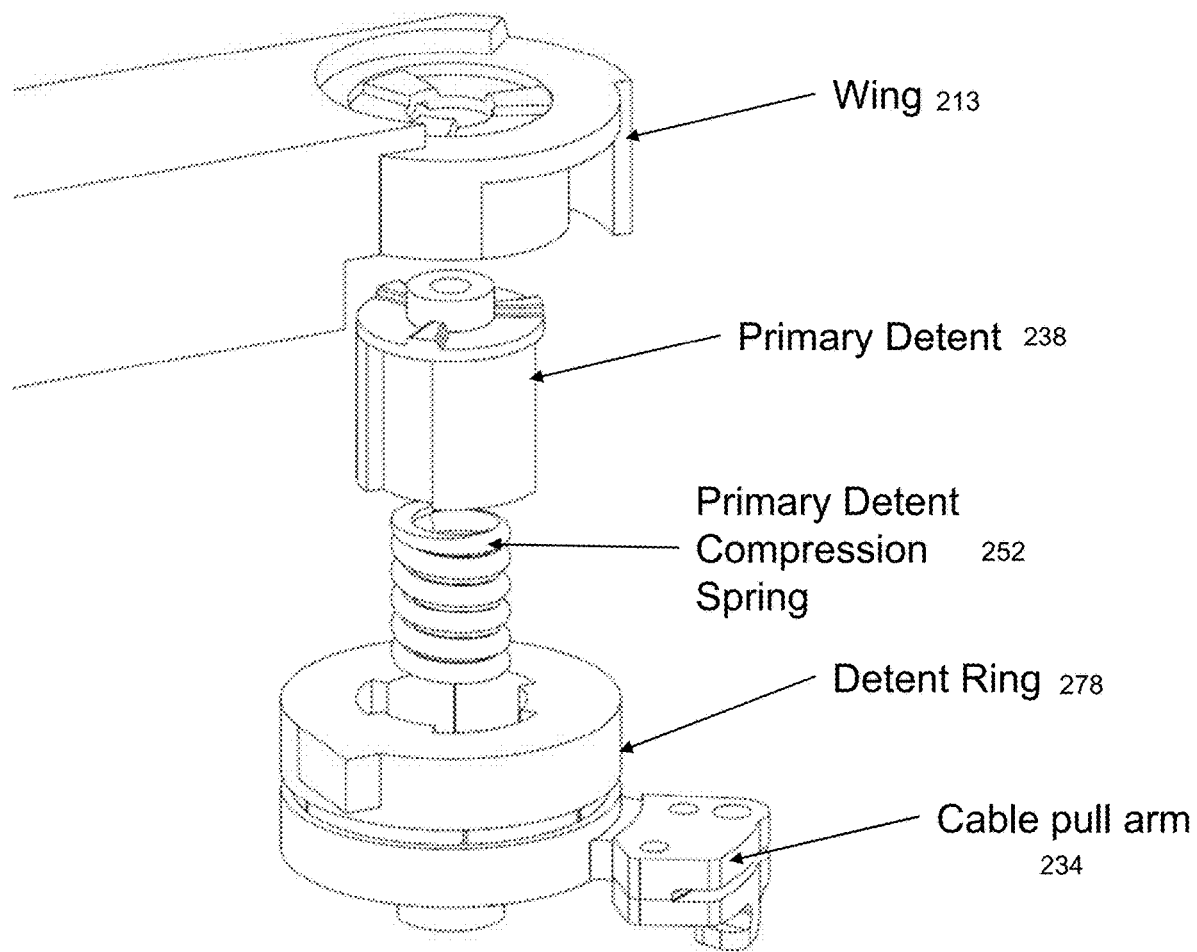
Figure 48:
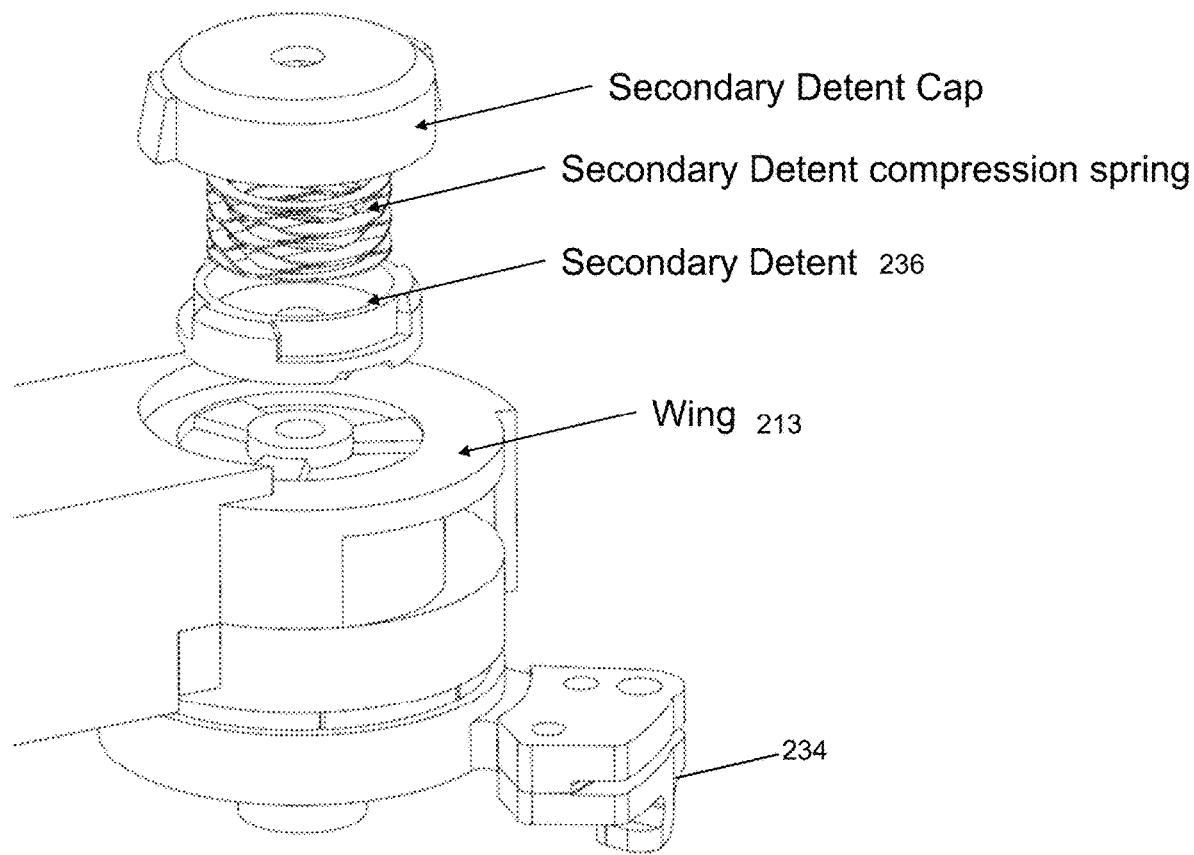
Figure 49:
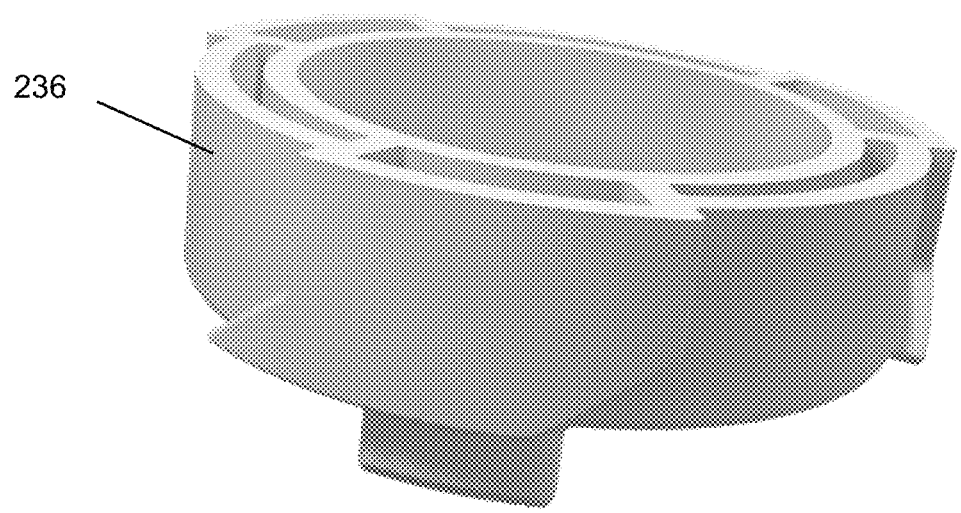
FIG. 49 is a perspective view of a locking lug component of the detent assembly.
Figure 50:
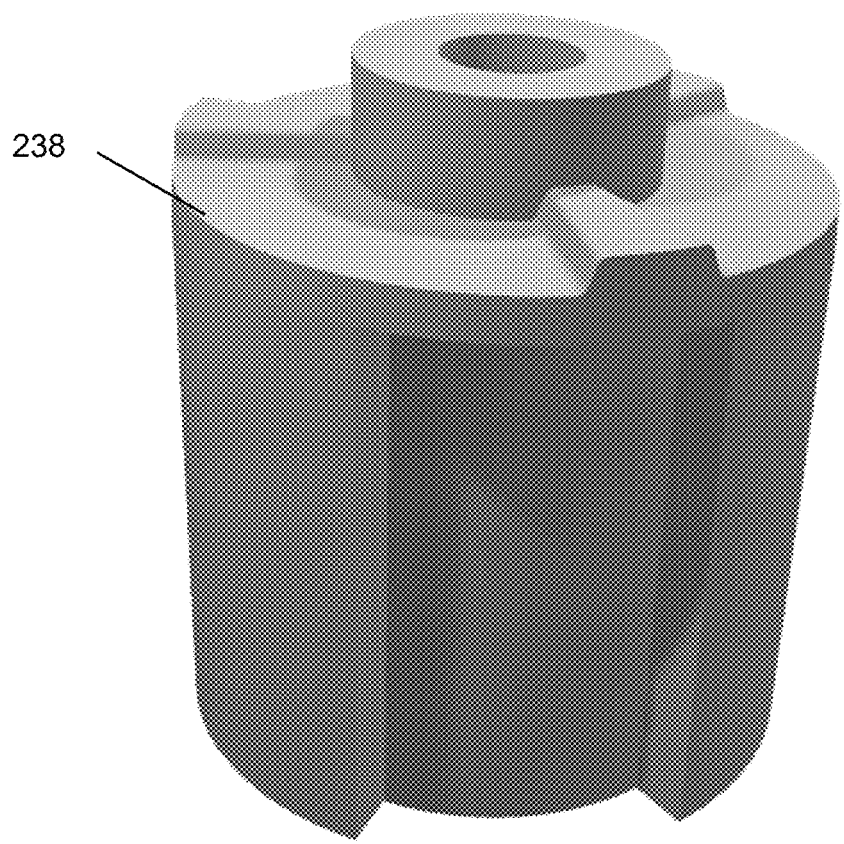
FIG. 50 is a perspective view of a primary detent component of the detent assembly.
Figure 51:
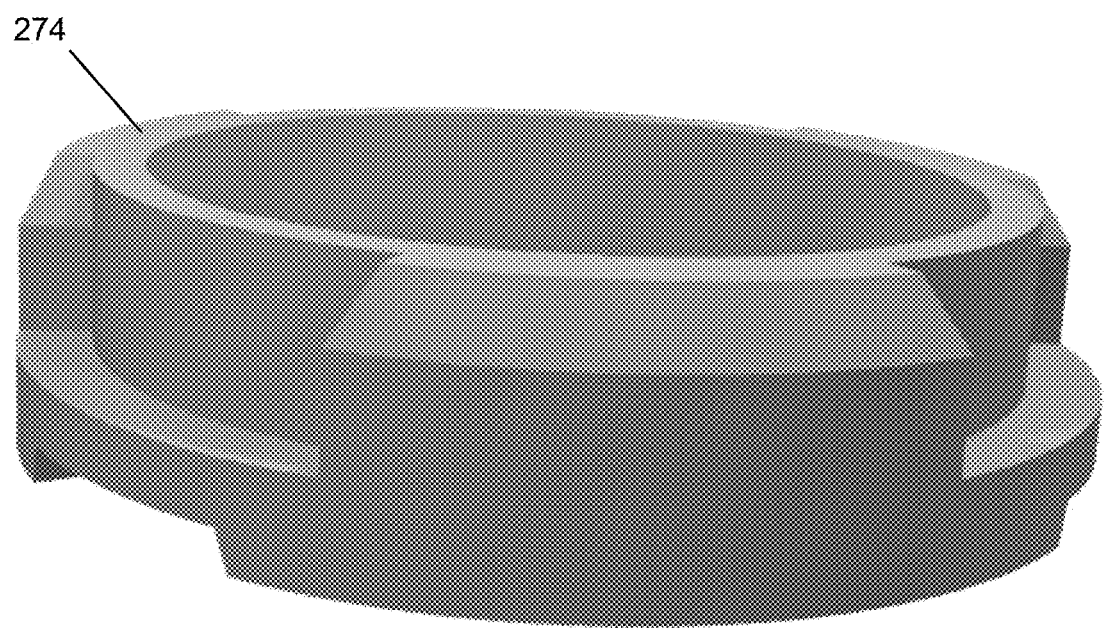
FIG. 51 is a perspective view of a secondary detent component of the detent assembly.

As shown in FIGS. 42-51, the rotational relationship between the cable pull arm 234 (and thus cable pull actuator) and the camera wing 213 is enabled via the detent assembly of the actuator 220, which includes a primary detent component 238 (FIG. 50), a secondary detent component 236 (FIG. 51), and a locking lug component 274 (FIG. 49). As the cable pull actuator 224 pulls on the cable pull arm 234 of the actuator 220 to pivot the camera wing 213 from the flush position to the extended position, the rotation of the cable pull arm 234 is translated to rotation of the camera wing 213 relative to the bracket 228 fixed to the vehicle at which the camera wing assembly 213 is attached.

Figure 45A:
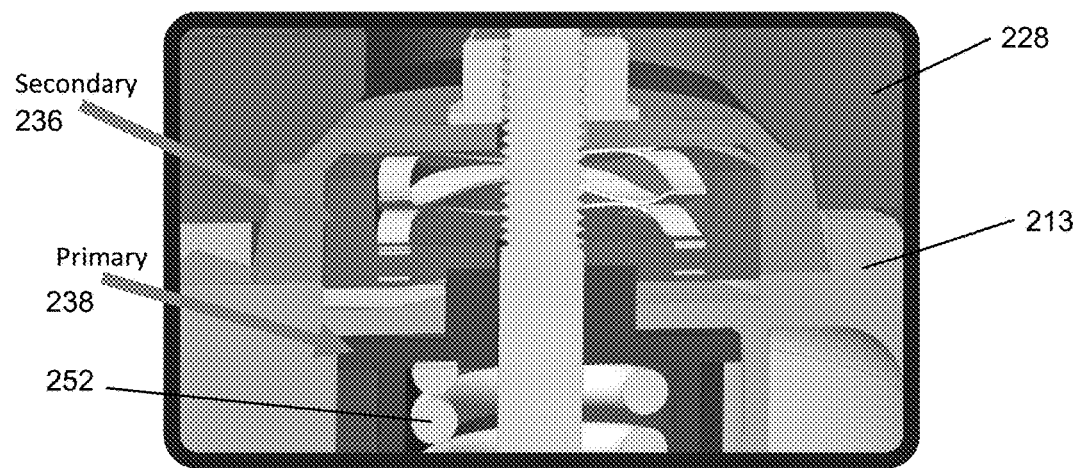
FIG. 45A is a sectional view of an upper portion of the detent assembly.
Figure 45B:
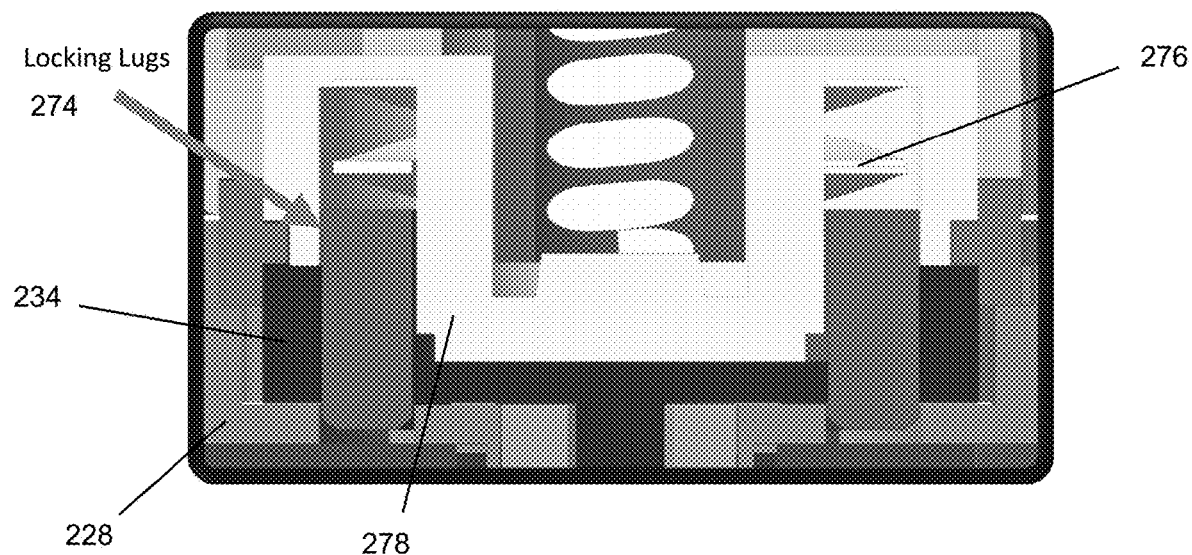
FIG. 45B is a sectional view of a lower portion of the detent assembly.

As shown in FIG. 45B, the locking lug 274 engages and is fixed rotationally to the cable pull arm 234 and also engages the bracket 228 through the cable pull arm 234 to, when in a lowered position, fix the cable pull arm 234 relative to the bracket 228 and prevent the cable pull arm 234 (and therefore camera wing) from rotating. The locking lug 274 component is engaged with the bracket 228 when the camera wing 213 is in the flush position until the cable 226 is pulled. The locking lug 274 is connected to the cable pull arm 234 via a screw interface and the locking lug 274 raises or lifts out of engagement with the bracket 228 as the arm 234 is rotated via the cable pull actuator 224 (i.e., the cable pulls the cable pull arm), compressing the locking lug compression spring 276 that pushes the locking lug 274 into engagement with the bracket 228. When the locking lug 274 is lifted, the detent ring 278 is able to rotate, with the wing 213 connected to the detent ring 278 via the primary detent 238.

The locking lug 274 prevents the lower portion of the camera wing pivot (the portion from which the cable pull arm extends) from rotating when the camera wing 213 is manually rotated. The lower portion of the camera wing pivot can only rotate if the cable 226 is pulled. Because the locking lug 274 provides connection between the cable pull arm 234 and the bracket 228, the locking lug holds the cable pull arm 234 in place when the camera wing 213 is manually extended and ensures that the wing rotates to the correct angle. In other words, the locking lug 274 prevents creation of slack in the cable 226 when the wing 213 is manually extended by resisting the outside force manually rotating the camera wing 213 from acting on the cable 226 and cable pull actuator 224, which could result in the cable 226 being pushed toward the cable pull actuator 224 and thus bent, damaged, or disconnected. Thus, when the camera wing 213 is manually pivoted, the locking lug 274 engages the cable pull arm 238 and the bracket 228 to fix the cable pull arm 234 relative to the bracket 228, preventing the movement of the camera wing 213 from causing movement of the camera pull arm 234, effectively disengaging the cable pull actuator 224 from the camera wing 213 during such manual pivoting of the camera wing.

The locking lug 278 also allows the return torsion spring force to be low and thus, a smaller torsion return spring 268 may be used. Use of a smaller torsion return spring 268 decreases the force load on the cable pull actuator 224 and on the cable 226 and also decreases the force loss from the cable pull, which aides in situations where more force than usual is needed to extend the wing from the flush position to the extended position (such as when ice builds up at the exterior surface of the vehicle).

Figure 46:
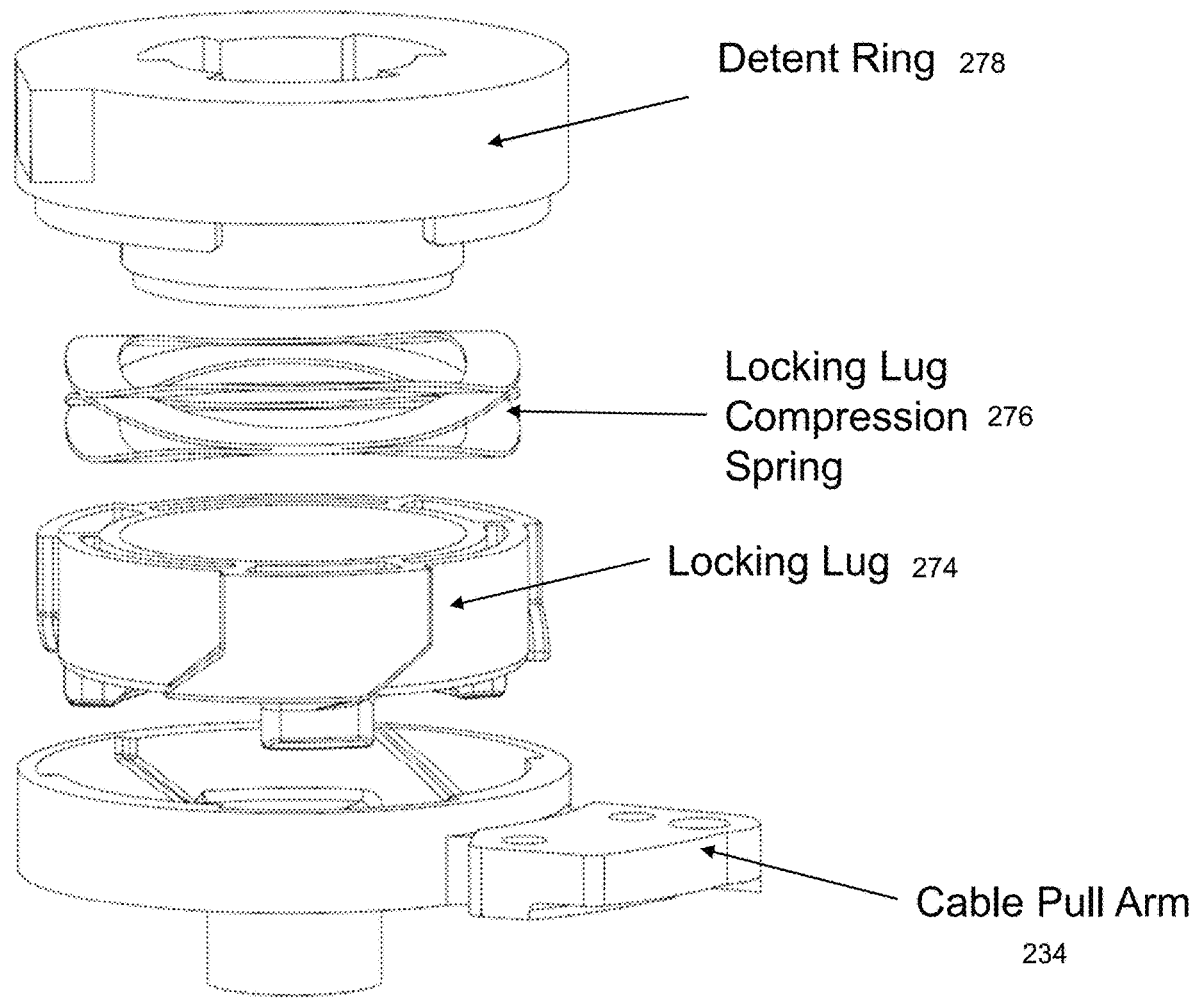
FIGS. 46-48 are exploded views of portions of the detent assembly.

As shown in FIG. 46, the locking lug 274 is keyed to the detent ring 278 with the locking lug compression spring 276 disposed between the locking lug and detent ring. As the cable pull arm 234 is pulled, the detent ring 278 is held in place by the locking lug's connection to the wing bracket 228. The cable pull causes the locking lug 274 to lift to release the locking lug from its engagement with the bracket 228. Once the locking lug lifts, the detent ring 278 and locking lug 274 are able to rotate. The camera wing 213 is connected to and rotates with the detent ring 278 via the primary detent 238.

As shown in FIG. 47, the primary detent component 238 connects the cable pull arm 234 and the camera wing 213 via the detent ring 278. The primary detent 238 separates or disengages from the camera wing 213 during manual extension or a forward fold (when the camera wing is rotated beyond the extended position such as upon impact with an object). When the primary detent 238 is engaged, it lifts the secondary detent 236 out of position. Thus, there is no position in which more than one of the primary or secondary detent is engaged, providing more control and more consistent detent forces in every position. The primary detent 238 is loaded with an internal compression spring 252 to provide necessary retention forces to retain the camera wing 213 in the detent positions.

As shown in FIGS. 45A and 48, the secondary detent 236 is disposed on top of the camera wing 213 and connects the camera wing 213 with an upper portion of the bracket 228 and only makes connection with the bracket 228 when the camera wing 213 is manually extended (i.e., manually rotated from the park position to the extended position). The secondary detent 236 may only engage the camera wing 213 with the bracket 228 once the camera wing 213 has reached the extended position (such as about 70 percent of the camera wing's total rotational spectrum). In other words, when the camera wing 213 is manually extended, the secondary detent 236 provides a stop point for the camera wing 213 and provides a detent force to retain the camera wing 213 in the extended position. The detent force of the secondary detent 236 is determined by the ramp angle of the detent surfaces in addition to the secondary detent compression spring positioned above the secondary detent 236 and retained by the secondary detent cap.

Additionally, the secondary detent 236 holds the camera wing 213 in place during an electric resync, allowing electric recovery from the manually extended position. In other words, when the wing 213 has been manually extended, the secondary detent 236 engages the camera wing 213 and the upper portion of the bracket 228 to hold the camera wing 213 in place and the cable pull actuator 224 can be activated to pull on the cable 226. The secondary detent 236 prevents the wing 213 from folding forward beyond the extended position as the cable is pulled and allows the primary detent 238 to re-engage. When the primary detent 238 re-engages, the secondary detent 236 is forced to release. Once the primary detent 238 is engaged, the wing 213 can be deployed and retracted via operation of the cable pull actuator 224, as normal.

Figure 52:
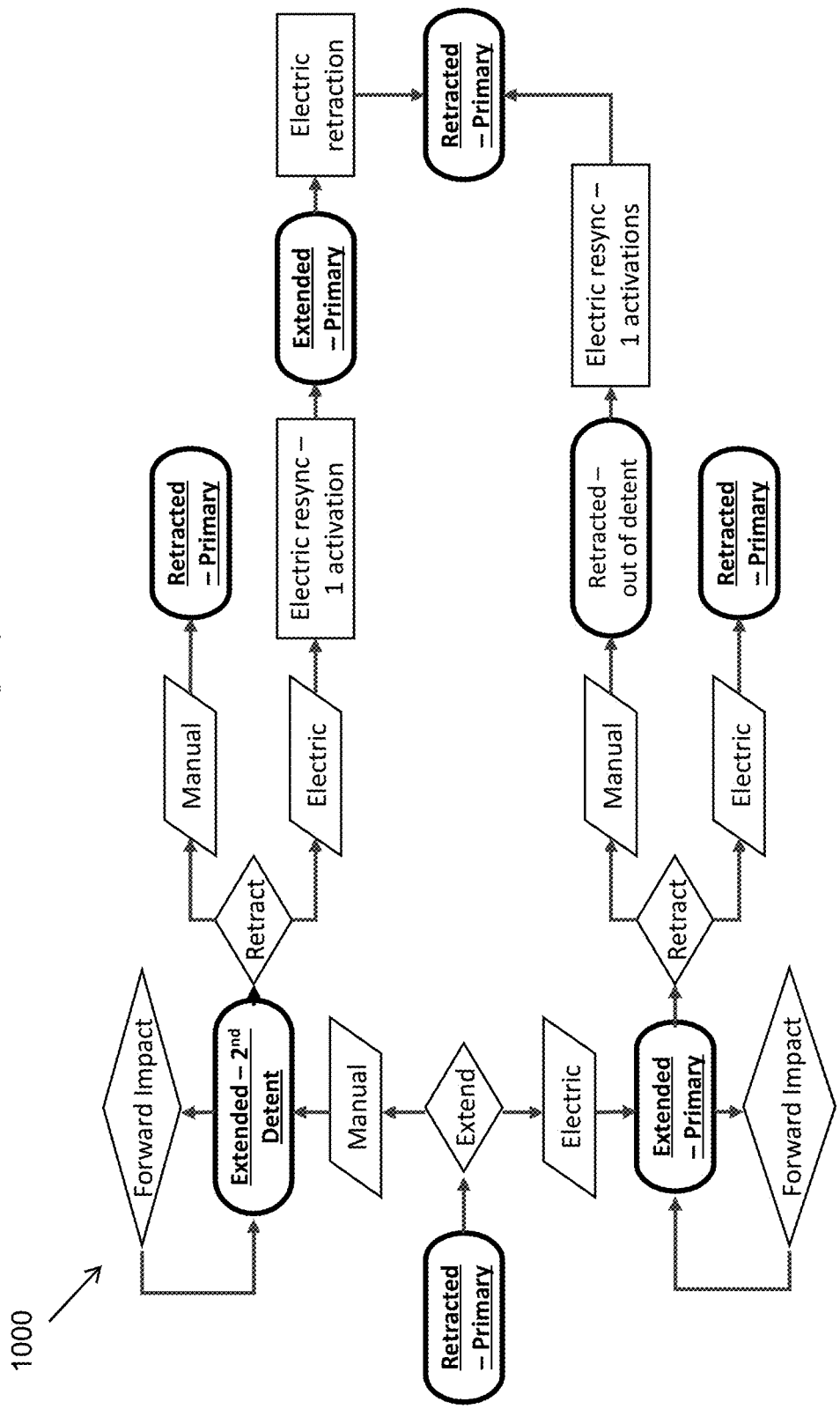
FIG. 52 is a flowchart showing the engagement of the detent assembly based on the position of the camera wing.
Figure 53:
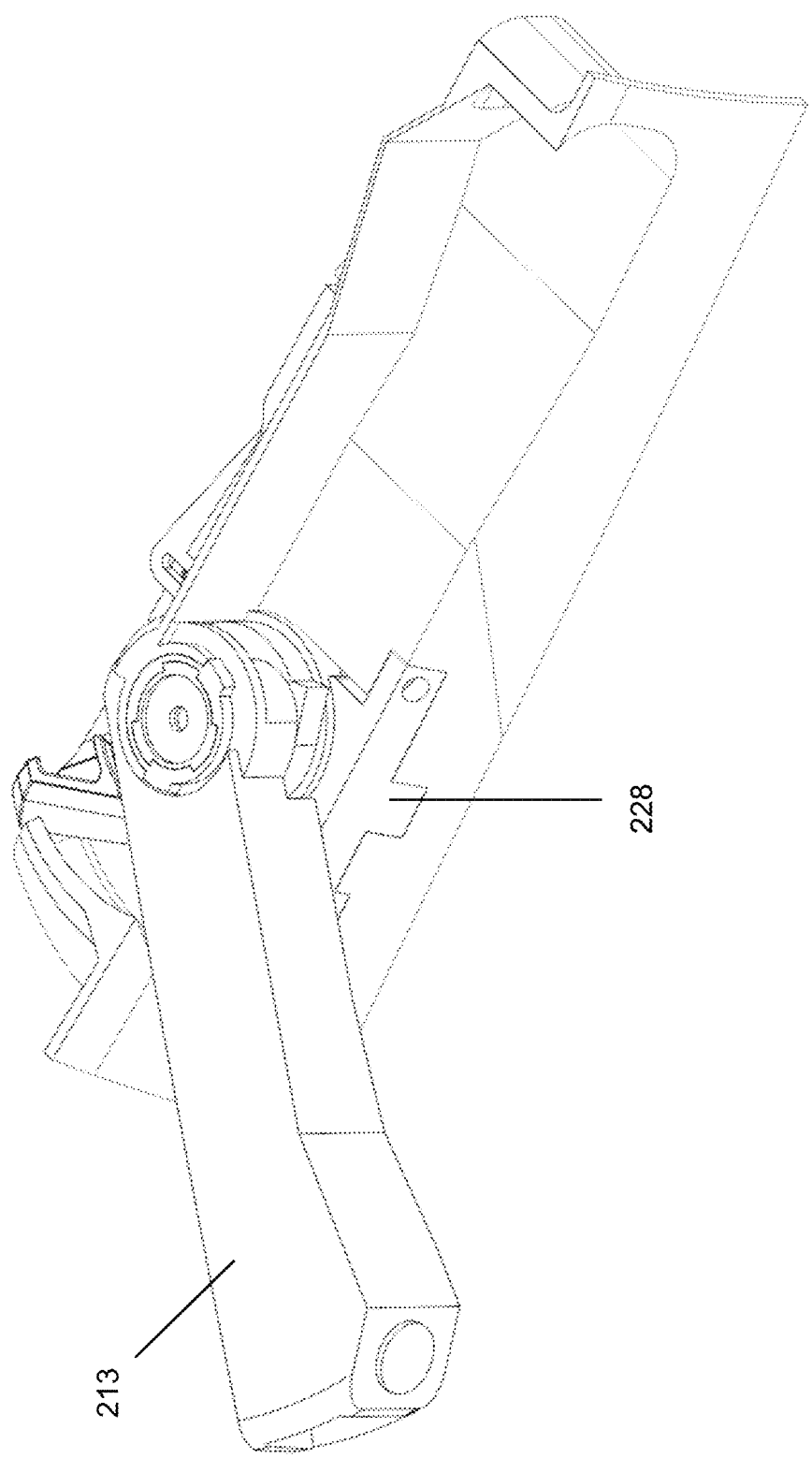
FIG. 53 is a perspective view of a camera wing in a forward fold position.

Thus, and as shown by the flowchart 1000 in FIG. 52, the camera wing is pivotable between the flush or retracted position and the extended position manually or via electric activation of the cable pull actuator. When in the retracted position, the primary detent is engaged with the camera wing. When electrically extended, the primary detent remains engaged and the camera wing is pivoted to the extended position with the primary detent engaged. If electrically retracted from extended position with the primary detent engaged, the primary detent remains engaged and the camera wing is pivoted to the retracted position. Thus, the primary detent does not release when the camera wing is operating electrically.

If, with the primary detent engaged at the extended position, the camera wing is retracted manually, the camera wing is retracted with both primary and secondary detents disengaged (a no-detent position). From the retracted, no-detent position, one activation of the electric cable pull actuator returns the cable pull arm into position via the torsion spring and brings the primary detent back into engagement and the camera wing remains retracted.

When the camera wing is extended manually, the primary detent is disengaged and the secondary detent is engaged. If the camera wing, in the extended position with the secondary detent engaged, is retracted manually, the primary detent re-engages and the camera wing is pivoted to the retracted position. If the camera wing, in the extended position with the secondary detent engaged, is retracted electrically, one electric activation of the cable pull actuator engages the primary detent in the extended position and a second electric activation of the cable pull actuator pivots the camera wing to the retracted position with the primary detent engaged.

If, when in the extended position (either with the primary or secondary detent engaged), the camera wing is manually pivoted beyond the extended position in a direction opposite the retracted position, the camera wing 213 will fold forward toward a forward fold position and then return to its original extended position via the forward fold flap assembly 280.

Figure 54:
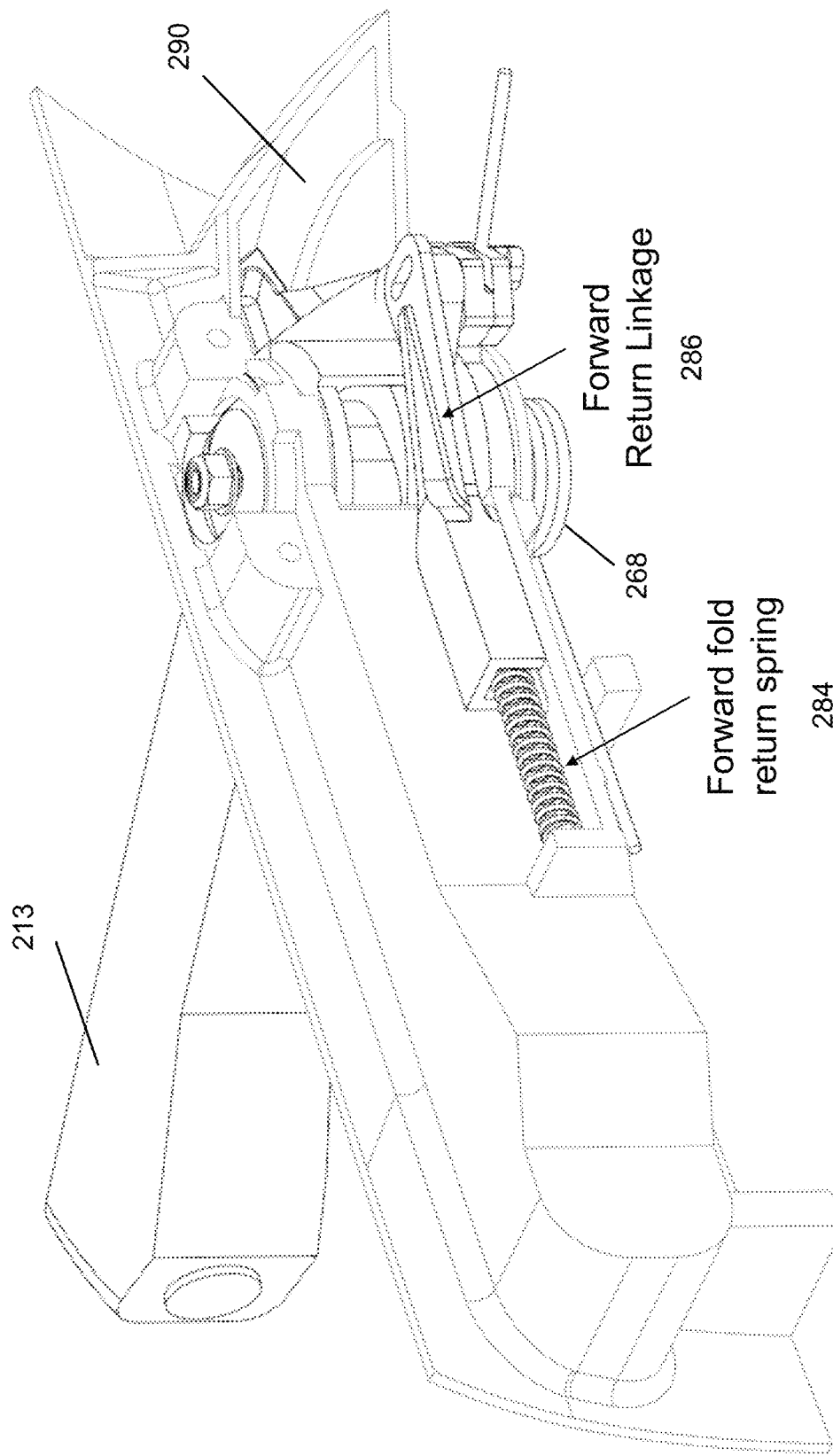
FIG. 54 is a perspective view of the camera wing of FIG. 53, showing a forward fold flap assembly.
Figure 55:
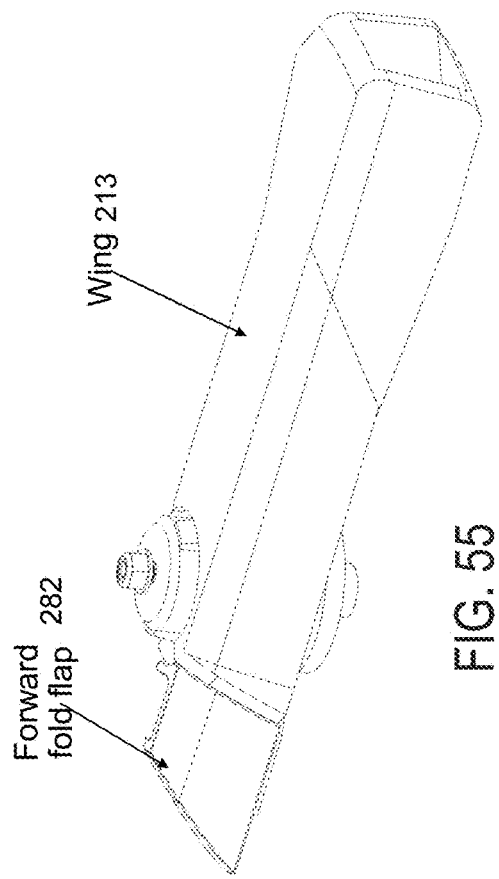
FIG. 55 is a perspective view of the camera wing and forward fold flap assembly, showing the camera wing in a flush position.
Figure 56:
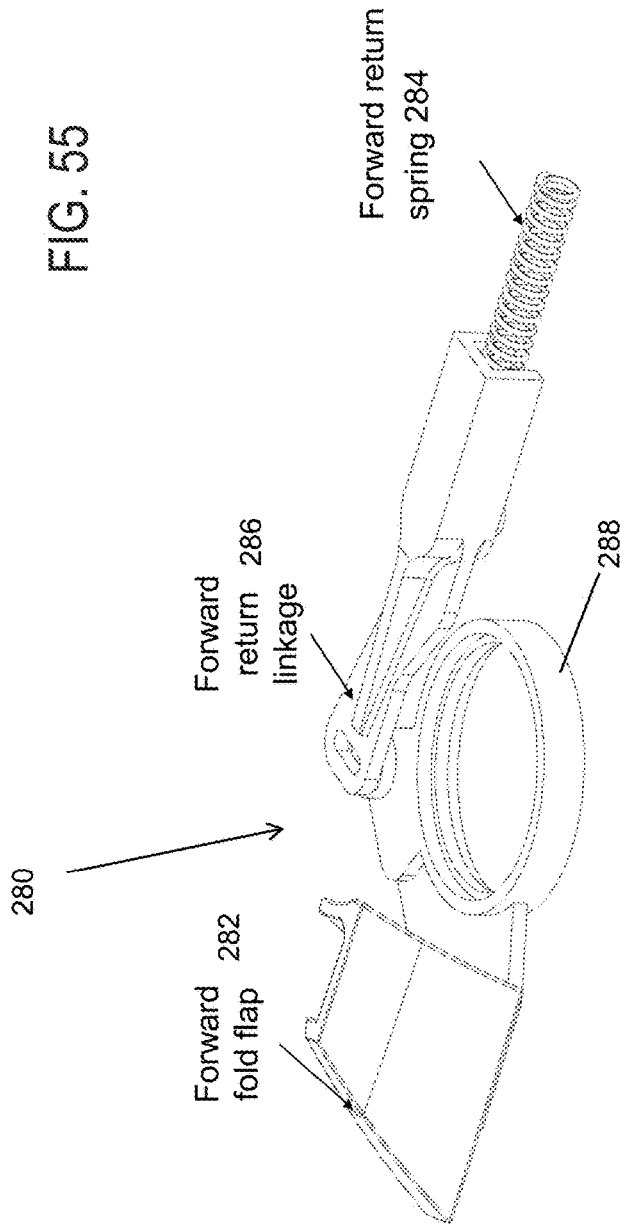
FIG. 56 is a perspective view of the forward fold flap assembly

As shown in FIG. 54, to enable the camera wing 213 to pivot beyond the extended position, there is a space or forward cavity 290 formed in the outer surface of the vehicle that at least partially receives the camera wing 213 when the wing is pivoted toward the forward fold position. The forward fold flap assembly 280 seals the forward cavity 290 when the camera wing 213 is pivoted between the retracted and extended positions and provides a biasing force that, when the camera wing 213 is pivoted beyond the extended position, urges the camera wing 213 toward the extended position. The forward fold flap assembly 280 includes a flap 282 that covers or fills the forward cavity 290 in the vehicle sheet metal that accommodates the forward rotation of the camera wing 213. A compression spring 284 and linkage 286 provide the force necessary to keep the flap 282 closed over the cavity 290 as well as bias the camera wing 213 back toward the extended position after the wing is rotated beyond the extended position. The forward fold flap assembly 280 includes a pivot element 288 that may be integrally formed with the flap 282, the pivot element 288 connecting the linkage 286 to the flap 282, whereby the flap 282 rotates responsive to lateral movement of the linkage and spring 284. The pivot element 288 pivots about the same pivot axis as the camera wing 213 and assembles to the rest of the camera wing 213 to form a singular assembly that can be installed into the bracket 228.

Because the forward fold flap assembly 280 only engages the camera wing 213 via engagement of the flap 282 at the wing 213, the forward fold flap assembly 280 only provides a biasing force on the wing when the wing is manually pivoted beyond the extended position toward the forward fold position. Additionally, because the cable pull actuator 224 is effectively disengaged from the rotation of the wing when the wing is manually pivoted (via the locking lug 274 engaging the cable pull arm 234 and bracket 228 to fix the cable pull arm 234 relative to the bracket 228), the forward fold flap assembly 280 may provide the only biasing force on the wing to return the wing from the forward fold position toward the extended position. In other words, pivoting of the camera wing 213 via the cable pull actuator 224 between the retracted and extended positions is performed independent of pivoting the camera wing from beyond the extended position toward the extended position.

Figures 57A, 57B:
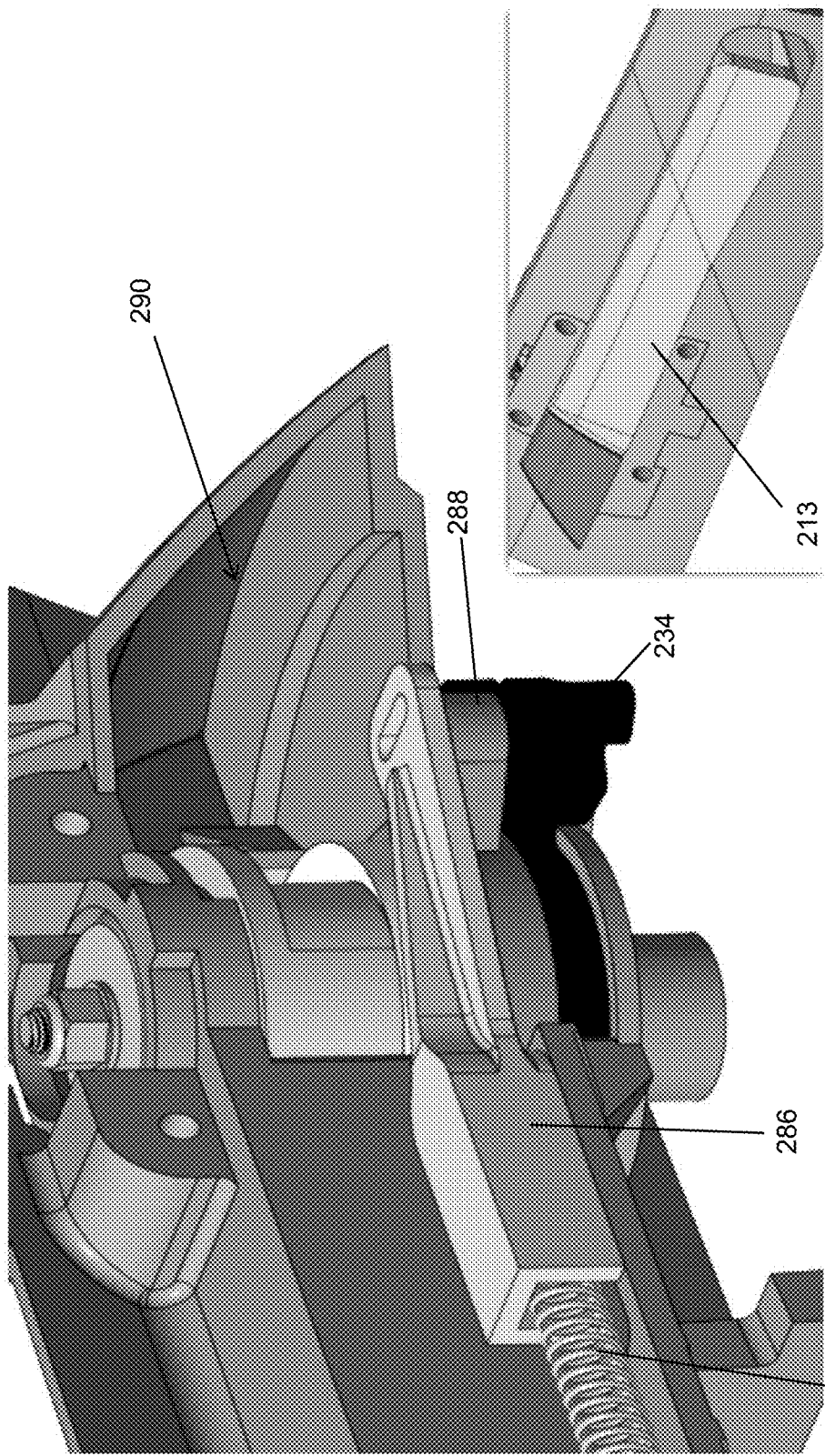
FIG. 57A is a perspective view of the camera wing of FIG. 53, shown in its retracted position.
FIG. 57B is a perspective view of the camera wing of FIG. 53, shown in its retracted position.

For example and as shown in FIGS. 57A-59B, the cable pull actuator 224 may pull the cable 226 to pivot the cable pull arm 234 toward the actuator and thus pivot the wing 213 from the retracted position (FIGS. 57A and 57B) to the extended position (FIGS. 58A and 58B). When the cable pull actuator 224 is operated to pivot the wing 213 from the extended position to the retracted position, the actuator may release the cable 226 or allow for the cable to move in the opposite direction, whereby the torsion spring 268 biases the wing toward the retracted position. The forward fold flap assembly 280 remains stationary (i.e., with the forward flap 282 in the sealed position) when the wing 213 is pivoted between the retracted and the extended positions. As shown in FIGS. 57A and 58A, the cable pull arm 234 of the wing pivot pivots when the wing 213 is pivoted between the retracted and extended position while the linkage 286 and pivot element 288 remain stationary.

When the wing 213 is manually pivoted beyond the extended position toward the forward fold position (FIGS. 59A and 59B), the locking lug 236 may engage the cable pull arm 234 and fix the cable pull arm 234 relative to the bracket 228 so that the cable pull arm, the cable, and the cable pull actuator are not subject to the force of the wing 213 manually pivoting toward the forward fold position. Thus, when the wing 213 is pivoted beyond the extended position toward the forward fold position, the cable pull actuator 224 and torsion spring 268 are effectively disengaged from the pivotable movement of the wing via the locking lug 274 fixing the cable pull arm 234 to the bracket 228. As shown in FIG. 59A, movement of the wing 213 toward the forward fold position pushes the flap 282 into the forward cavity 290 and the compressed forward return spring 284, via the forward return linkage 286 and flap 282, provides the biasing force to return the wing 213 to the extended position when the wing is released (i.e., when the force that moved it forward is removed). Additionally, because the forward return spring 284 may provide the biasing force on the wing 213 via engagement of the forward fold flap 282 and the wing, the forward return spring 284 only provides the biasing force when the wing 213 engages the forward fold flap 282 and pushes the forward fold flap 282 into the forward cavity 290.

Thus, when the camera wing 213 is manually pivoted beyond the extended position, the camera wing 213 may push against the flap 282 which, via the pivot element 288 and linkage 286, compresses the forward fold return spring 284. The primary detent 238 disengages when the wing 213 is manually rotated and the rotation of the camera wing 213 forward pushes or slides the flap 282 into the cavity 290 in the side of the vehicle. The camera wing 213 occupies at least a portion of the cavity 290 as it is rotated forward. After the impact, the return spring 284, via the forward return linkage 286, pushes the camera wing 213 back to the extended position and returns the flap 282 over or in the cavity 290. The compression spring 252 of the primary detent 238 pushes the primary detent 238 back into engagement with the camera wing as the camera wing 213 returns to the extended position following the impact.

Changes and modifications in the specifically described embodiments may be carried out without departing from the principles of the present invention, which is intended to be limited only by the scope of the appended claims as interpreted according to the principles of patent law.

The invention claimed is:

1. A vehicular imaging system, the vehicular imaging system comprising:

a camera device disposed at an exterior portion of a vehicle equipped with the vehicular imaging system, wherein the camera device comprises a pivotable arm that accommodates a camera;

wherein the pivotable arm is pivotally mounted at a mounting base and is pivotable relative to the mounting base between at least a drive position, where the pivotable arm and camera are extended outward from the exterior portion of the vehicle so that the camera is positioned for viewing rearward of the vehicle, and a folded position, where the pivotable arm and camera are pivoted inward from the drive position toward the vehicle;

an actuator comprising a pivot post structure attached to the mounting base and an output gear disposed at the pivot post structure;

wherein the actuator comprises an electrically operated motor operable to pivot the pivotable arm about the output gear;

wherein the actuator comprises a biasing element disposed within and circumscribed by the output gear, and wherein the biasing element (i) imparts a biasing force at the output gear to urge the output gear downward along the pivot post structure toward the mounting base and (ii) imparts a biasing force at a middle detent element to urge the middle detent element upward along the pivot post structure into engagement with a lower detent surface of the pivot post structure;

wherein the actuator comprises a primary detent interface that is engaged to maintain the pivotable arm at the drive position when the pivotable arm is pivoted to the drive position;

wherein the actuator comprises a secondary detent interface; and wherein the pivotable arm is manually pivotable relative to the mounting base, and wherein, when the pivotable arm is manually pivoted between the folded position and the drive position, the secondary detent interface is disengaged.

2. The vehicular imaging system of claim 1, wherein (i) a base portion of the pivot post structure comprises an upper detent surface, (ii) a lower housing portion comprises a lower detent surface, (iii) the middle detent element comprises an upper detent surface, (iv) an upper detent element comprises the lower detent surface of the pivot post structure, and (v) the biasing element is disposed between the output gear and the middle detent element.

3. The vehicular imaging system of claim 2, wherein the lower housing portion is disposed along the pivot post structure, and wherein the lower detent surface of the lower housing portion engages the upper detent surface of the base portion of the pivot post structure.

4. The vehicular imaging system of claim 3, wherein the output gear is rotatably disposed along the pivot post structure, and wherein ramp portions of the output gear engage lift ramps of the base portion of the pivot post structure, and wherein the output gear is movable between a raised position and a lowered position along the pivot post structure as the ramp portions engage and travel along the lift ramps.

5. The vehicular imaging system of claim 4, wherein the middle detent element is disposed along the pivot post structure, and wherein at least a portion of the middle detent element is disposed within a cavity of the output gear.

6. The vehicular imaging system of claim 5, wherein the middle detent element is rotatably fixed relative to the output gear.

7. The vehicular imaging system of claim 5, wherein the biasing element is disposed entirely within the cavity of the output gear.

8. The vehicular imaging system of claim 7, wherein the upper detent element receives the pivot post structure and is rotatably fixed relative to the pivot post structure.

9. The vehicular imaging system of claim 8, wherein the middle detent element, the biasing element, the output gear, and the lower housing portion are disposed along the pivot post structure between the lower detent surface of the upper detent element and the base portion of the pivot post structure.

10. The vehicular imaging system of claim 2, wherein the primary detent interface comprises part of the upper detent surface of the base portion and a correspondingly formed part of the lower detent surface of the lower housing portion, and wherein the secondary detent interface comprises part of the upper detent surface of the middle detent element and a correspondingly formed part of the lower detent surface of the pivot post structure.

11. The vehicular imaging system of claim 2, wherein the biasing element urges the middle detent element into engagement with the upper detent element.

12. The vehicular imaging system of claim 1, wherein the biasing element comprises a wave spring.

13. The vehicular imaging system of claim 1, comprising an electronic control unit (ECU) having electronic circuitry and associated software, wherein the camera, when the pivotable arm is in the drive position, captures image data and provides the captured image data to the ECU, and wherein the ECU processes the provided captured image data for at least one selected from the group consisting of (i) display of video images derived from video image data captured by the camera and provided to the ECU and (ii) detection of objects present in a field of view of the camera.

14. The vehicular imaging system of claim 1, wherein, when the pivotable arm is pivoted between the folded position and the drive position via the actuator, the secondary detent interface is engaged to fix the output gear relative to the pivot post structure and the primary detent interface is disengaged.

15. A vehicular imaging system, the vehicular imaging system comprising:
  a camera device disposed at an exterior portion of a vehicle equipped with the vehicular imaging system, wherein the camera device comprises a pivotable arm that accommodates a camera;
  wherein the pivotable arm is pivotally mounted at a mounting base and is pivotable relative to the mounting base between at least a drive position, where the pivotable arm and camera are extended outward from the exterior portion of the vehicle so that the camera is positioned for viewing rearward of the vehicle, and a folded position, where the pivotable arm and camera are pivoted inward from the drive position toward the vehicle;
  a detent assembly attached at the pivotable arm;
  a cable drive actuator operable to pivot the detent assembly to pivot the pivotable arm between the folded position and the drive position; and
  wherein the detent assembly comprises a (i) primary detent that is engaged when the pivotable arm is pivoted between the folded position and the drive position via operation of the cable drive actuator, (ii) a secondary detent that is engaged to maintain the pivotable arm at the drive position when the pivotable arm is manually pivoted to the drive position, and (iii) a locking component that is engaged when the pivotable arm is manually pivoted between the folded position and the drive position.

16. The vehicular imaging system of claim 15, wherein the cable drive actuator is positioned remote from the detent assembly and is operable to pivot the detent assembly by pulling a flexible cable connected at the cable drive actuator and the detent assembly.

17. The vehicular imaging system of claim 16, wherein pulling the flexible cable pivots a cable pull arm attached to the detent assembly to pivot the pivotable arm.

18. The vehicular imaging system of claim 17, wherein the locking component, when engaged, engages the cable pull arm and the mounting base to fix the cable pull arm to the mounting base when the pivotable arm is manually pivoted between the folded position and the drive position.

19. The vehicular imaging system of claim 17, wherein, when the cable drive actuator is operated to pivot the pivotable arm toward the drive position, the cable drive actuator pulls the flexible cable to pivot the cable pull arm in a first direction, and wherein, when the cable drive actuator is operated to pivot the pivotable arm toward the folded position, the cable drive actuator releases the flexible cable to pivot the cable pull arm in a second direction opposite the first direction.

20. The vehicular imaging system of claim 19, wherein the cable drive actuator comprises a torsion spring that biases the cable pull arm in the second direction.

21. The vehicular imaging system of claim 15, wherein the detent assembly comprises an internal biasing element that imparts a biasing force at the primary detent to urge the primary detent into engagement.

22. The vehicular imaging system of claim 15, wherein, when the pivotable arm is manually pivoted between the folded position and the drive position, the primary detent is not engaged.

23. The vehicular imaging system of claim 22, wherein, when the pivotable arm is manually pivoted to a position between the folded position and the drive position, the secondary detent is not engaged.

24. The vehicular imaging system of claim 15, wherein, when the pivotable arm is in the folded position, the pivotable arm is at least partially received in a recess at the exterior portion of the vehicle.

25. The vehicular imaging system of claim 15, wherein the pivotable arm is manually pivotable to a forward fold position, where the pivotable arm and camera are pivoted beyond the drive position in an opposite direction from the folded position.

26. The vehicular imaging system of claim 25, wherein, when the pivotable arm is pivoted from the drive position toward the forward fold position, the pivotable arm is at least partially received in a forward cavity at the exterior portion of the vehicle, and wherein the pivotable arm, when the pivotable arm is pivoted from the drive position toward the forward fold position, is biased toward the drive position.

27. The vehicular imaging system of claim 26, comprising a forward flap assembly that seals the forward cavity when the pivotable arm is between the folded position and the drive position.

28. The vehicular imaging system of claim 27, wherein the forward flap assembly, when the pivotable arm is pivoted from the drive position toward the forward fold position, engages the pivotable arm and biases the pivotable arm toward the drive position.

29. The vehicular imaging system of claim 15, comprising an electronic control unit (ECU) having electronic circuitry and associated software, wherein the camera, when the pivotable arm is in the drive position, captures image data and provides the captured image data to the ECU, and wherein the ECU processes the provided captured image data for at least one selected from the group consisting of (i) display of video images derived from video image data captured by the camera and provided to the ECU and (ii) detection of objects present in a field of view of the camera.

30. A vehicular imaging system, the vehicular imaging system comprising:
  a camera device disposed at an exterior portion of a vehicle equipped with the vehicular imaging system, wherein the camera device comprises a pivotable arm that accommodates a camera;

wherein the pivotable arm is pivotally mounted at a mounting base and is pivotable relative to the mounting base between at least a drive position, where the pivotable arm and camera are extended outward from the exterior portion of the vehicle so that the camera is positioned for viewing rearward of the vehicle, and a folded position, where the pivotable arm and camera are pivoted inward from the drive position toward the vehicle;

an electronic control unit (ECU) having electronic circuitry and associated software, wherein the camera, when the pivotable arm is in the drive position, captures image data and provides the captured image data to the ECU, and wherein the ECU processes the provided captured image data for at least one selected from the group consisting of (i) display of video images derived from video image data captured by the camera and provided to the ECU and (ii) detection of objects present in a field of view of the camera;

an actuator comprising a pivot post structure attached to the mounting base and an output gear disposed at the pivot post structure;

wherein the actuator comprises an electrically operated motor operable to pivot the pivotable arm about the output gear;

wherein the actuator comprises a biasing element disposed within and circumscribed by the output gear, and wherein the biasing element (i) imparts a biasing force at the output gear to urge the output gear downward along the pivot post structure toward the mounting base and (ii) imparts a biasing force at a middle detent element to urge the middle detent element upward along the pivot post structure into engagement with a lower detent surface of the pivot post structure;

wherein the actuator comprises a primary detent interface that is engaged to maintain the pivotable arm at the drive position when the pivotable arm is pivoted to the drive position;

wherein the actuator comprises a secondary detent interface;

wherein, when the pivotable arm is pivoted between the folded position and the drive position via the actuator, the secondary detent interface is engaged to fix the output gear relative to the pivot post structure and the primary detent interface is disengaged; and wherein the pivotable arm is manually pivotable relative to the mounting base, and wherein, when the pivotable arm is manually pivoted between the folded position and the drive position, the secondary detent interface is disengaged.

31. The vehicular imaging system of claim 30, wherein (i) a base portion of the pivot post structure comprises an upper detent surface, (ii) a lower housing portion comprises a lower detent surface, (iii) the middle detent element comprises an upper detent surface, (iv) an upper detent element comprises the lower detent surface of the pivot post structure, (v) the biasing element is disposed between the output gear and the middle detent element, (vi) the lower housing portion is disposed along the pivot post structure, and (vii) the lower detent surface of the lower housing portion engages the upper detent surface of the base portion of the pivot post structure.

32. The vehicular imaging system of claim 31, wherein the output gear is rotatably disposed along the pivot post structure, and wherein ramp portions of the output gear engage lift ramps of the base portion of the pivot post structure, and wherein the output gear is movable between a raised position and a lowered position along the pivot post structure as the ramp portions engage and travel along the lift ramps.

33. The vehicular imaging system of claim 31, wherein the middle detent element, the biasing element, the output gear, and the lower housing portion are disposed along the pivot post structure between the lower detent surface of the upper detent element and the base portion of the pivot post structure.

34. The vehicular imaging system of claim 31, wherein the primary detent interface comprises part of the upper detent surface of the base portion and a correspondingly formed part of the lower detent surface of the lower housing portion, and wherein the secondary detent interface comprises part of the upper detent surface of the middle detent element and a correspondingly formed part of the lower detent surface of the pivot post structure.

* * * * *